(12) United States Patent  (10) Patent No.: US 8,311,293 B2
Okada  (45) Date of Patent: Nov. 13, 2012

(54) IMAGE PROCESSING APPARATUS AND ASSOCIATED METHODOLOGY FOR FACIAL RECOGNITION

(75) Inventor: Miyuki Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/541,477

(22) Filed: Aug. 14, 2009

(65) Prior Publication Data

US 2010/0054550 A1  Mar. 4, 2010

(30) Foreign Application Priority Data

Sep. 4, 2008  (JP) ................................. 2008-227340

(51) Int. Cl.
*G06K 9/00* (2006.01)
(52) U.S. Cl. ..................................... 382/118
(58) Field of Classification Search .................. 382/118
See application file for complete search history.

(56) References Cited

U.S. PATENT DOCUMENTS

| | | | | |
|---|---|---|---|---|
| 5,982,912 | A | * | 11/1999 | Fukui et al. ................... 382/118 |
| 2006/0161588 | A1 | * | 7/2006 | Nomoto ...................... 707/104.1 |
| 2006/0285750 | A1 | | 12/2006 | Okada et al. |
| 2007/0110321 | A1 | | 5/2007 | Okada et al. |
| 2008/0037841 | A1 | | 2/2008 | Ogawa |
| 2008/0050022 | A1 | | 2/2008 | Okada et al. |
| 2008/0056580 | A1 | | 3/2008 | Okada et al. |
| 2008/0109397 | A1 | * | 5/2008 | Sharma et al. .................... 707/1 |
| 2008/0118156 | A1 | | 5/2008 | Okada et al. |
| 2008/0186386 | A1 | | 8/2008 | Okada et al. |
| 2009/0087038 | A1 | | 4/2009 | Okada et al. |
| 2009/0256926 | A1 | | 10/2009 | Okada et al. |

FOREIGN PATENT DOCUMENTS

| | | |
|---|---|---|
| CN | 101226591 A | 7/2008 |
| JP | 11-167632 | 6/1999 |
| JP | 2000-259833 | 9/2000 |
| JP | 2006-4003 | 1/2006 |
| JP | 2008-42319 | 2/2008 |

OTHER PUBLICATIONS

Office Action issued Dec. 15, 2011, in Chinese Patent Application No. 200910170503.2, filed Sep. 4, 2009 (with English-language Translation).

* cited by examiner

*Primary Examiner* — Vikkram Bali
(74) *Attorney, Agent, or Firm* — Oblon, Spivak, McClelland, Maier & Neustadt, L.L.P.

(57) ABSTRACT

An image processing apparatus includes: a subject information storage unit configured to store feature quantities and attributes relating to a plurality of subjects; a subject detecting unit configured to detect a subject included in an image; an attribute determining unit configured to determine the attributes of the detected subject; a feature quantity extracting unit configured to extract a feature quantity relating to the detected subject; and a similarity calculating unit configured to select one or a plurality of feature quantities from feature quantities relating to a plurality of subjects stored in the subject information storage unit based on the determined attributes to calculate similarity between a subject according to the selected feature quantities, and the detected subject, based on the selected feature quantities and the extracted feature quantity.

11 Claims, 33 Drawing Sheets

FIG. 6

| | COORDINATES 0 (x, y) OF NORMALIZED FACE IMAGE | | COORDINATES 1 (x, y) OF NORMALIZED FACE IMAGE | | THRESHOLD (θ) OF LEVEL DIFFERENCE BETWEEN COORDINATES 0 AND 1 | WEIGHT (α) OF REFERENCE DATA |
|---|---|---|---|---|---|---|
| | x | y | x | y | | |
| REFERENCE DATA 0 | ... | ... | ... | ... | ... | ... |
| REFERENCE DATA 1 | ... | ... | ... | ... | ... | ... |
| REFERENCE DATA 2 | ... | ... | ... | ... | ... | ... |
| ... | ... | ... | ... | ... | ... | ... |
| REFERENCE DATA n-1 | ... | ... | ... | ... | ... | ... |

FIG. 8

| ID NUMBER | SMILING FACE/ NON-SMILING FACE | | MALE/FEMALE (SEX) | | ADULT/CHILD (AGE) | | ... |
|---|---|---|---|---|---|---|---|
| 001 | NON-SMILING FACE | -110 | FEMALE | 335 | AMBIGUOUS | -4 | ... |
| 002 | SMILING FACE | 160 | MALE | -215 | ADULT | -258 | ... |
| 003 | AMBIGUOUS | 9 | AMBIGUOUS | 18 | AMBIGUOUS | 5 | ... |
| 004 | SMILING FACE | 235 | MALE | -195 | CHILD | 239 | ... |
| 005 | AMBIGUOUS | 19 | FEMALE | 355 | ADULT | -228 | ... |
| ... | ... | ... | ... | ... | ... | ... | ... |

FIG. 10
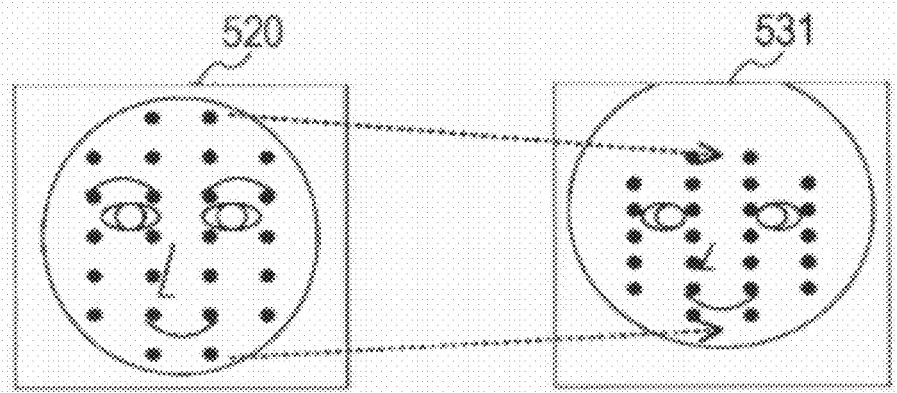
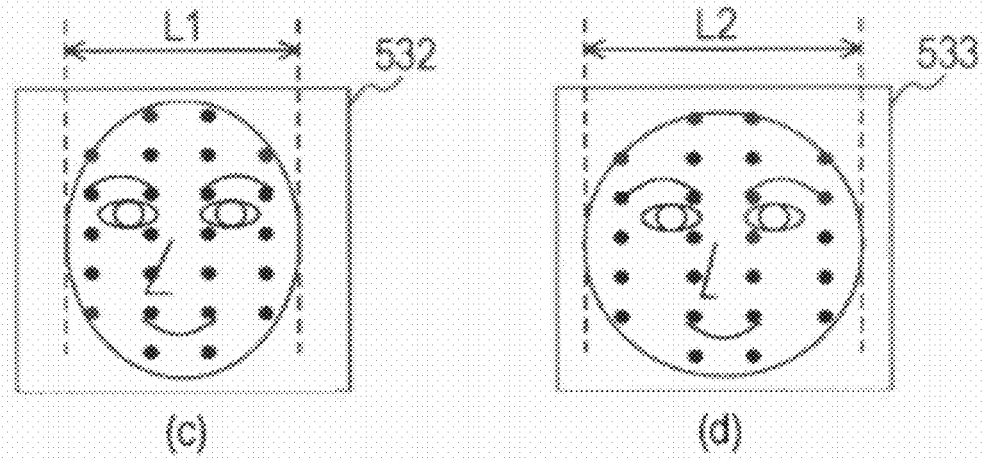
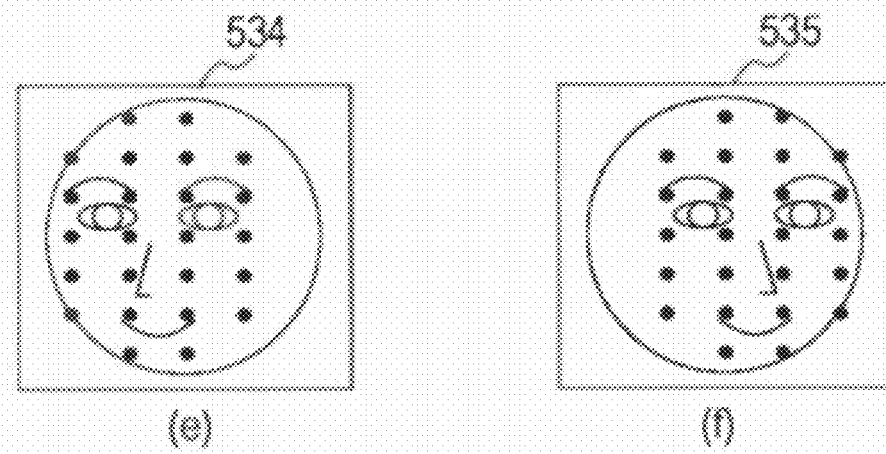

FIG. 15

| ID NUMBER | SMILING FACE/NON SMILING FACE | MALE/FEMALE (SEX) | ADULT/CHILD (AGE) | EYES OPEN/CLOSED | DIRECTION OF FACE | SHAKING/UN-SHAKEN | SPECTACLED/NON SPECTACLED | REGISTERED DATE AND TIME | REGISTERED PLACE | FACE FEATURE QUANTITY | REGISTERED FACE IMAGE |
|---|---|---|---|---|---|---|---|---|---|---|---|
| 101 | -78 (NON SMILING FACE) | +92 (MALE) | +49 (ADULT) | +80 (OPENING) | +28 (FRONT) | -49 (SHAKEN) | -99 (NON-SPECTACLED) | 10:00 July 6, 2008 | LOS ANGELES | | |
| 102 | -74 (SMILING FACE) | -59 (FEMALE) | +49 (ADULT) | +54 (THIN) | +34 (FRONT) | -57.5 (SHAKEN) | -91 (NON-SPECTACLED) | 18:00 May 8, 2008 | SAN DIEGO | | |
| 103 | -74 (SMILING FACE) | -45 (FEMALE) | +39 (ADULT) | +47.5 (OPENING) | -36 (LEFT) | -58 (NON SHAKEN) | -57 (NON-SPECTACLED) | 23:00 APRIL 3, 2008 | OAKLAND | | |
| 201 | -82 (NON SMILING FACE) | -49 (FEMALE) | -48 (CHILD) | -24 (THIN) | -24 (LEFT) | -40.1 (SHAKEN) | -55 (NON-SPECTACLED) | 08:00 August 1, 2008 | ANAHEIM | | |
| 202 | -79 (NON SMILING FACE) | -39.1 (MALE) | -59 (CHILD) | +37.2 (OPENING) | -58 (UPWARD) | -49 (SHAKEN) | +85 (SPECTACLED) | 15:00 Sept 8, 2008 | SACRAMENTO | | |
| 203 | -45 (NON SMILING FACE) | -50 (MALE) | -34 (CHILD) | +49.4 (OPENING) | -45 (FRONT) | +48 (SHAKEN) | -74 (NON-SPECTACLED) | 17:00 May 6, 2008 | SAN JOSE | | |
| 301 | -75 (NON SMILING FACE) | -98 (MALE) | -49 (ADULT) | +45.2 (OPENING) | -71 (FRONT) | +50.7 (SHAKEN) | -91 (NON-SPECTACLED) | 18:00 May 6, 2008 | ORANGE COUNTY | | |
| 302 | -49 (NON SMILING FACE) | -96 (MALE) | -49 (ADULT) | +46.4 (OPENING) | -44 (FRONT) | -59 (SHAKEN) | -80.1 (NON-SPECTACLED) | 10:50 August 5, 2008 | SAN FRANCISCO | | |
| 303 | -49 (NON SMILING FACE) | -94 (MALE) | -52 (ADULT) | +45 (OPENING) | -44 (FRONT) | +57.5 (UN-SHAKEN) | -77 (NON-SPECTACLED) | 11:00 August 19, 2008 | SANTA BARBARA | | |

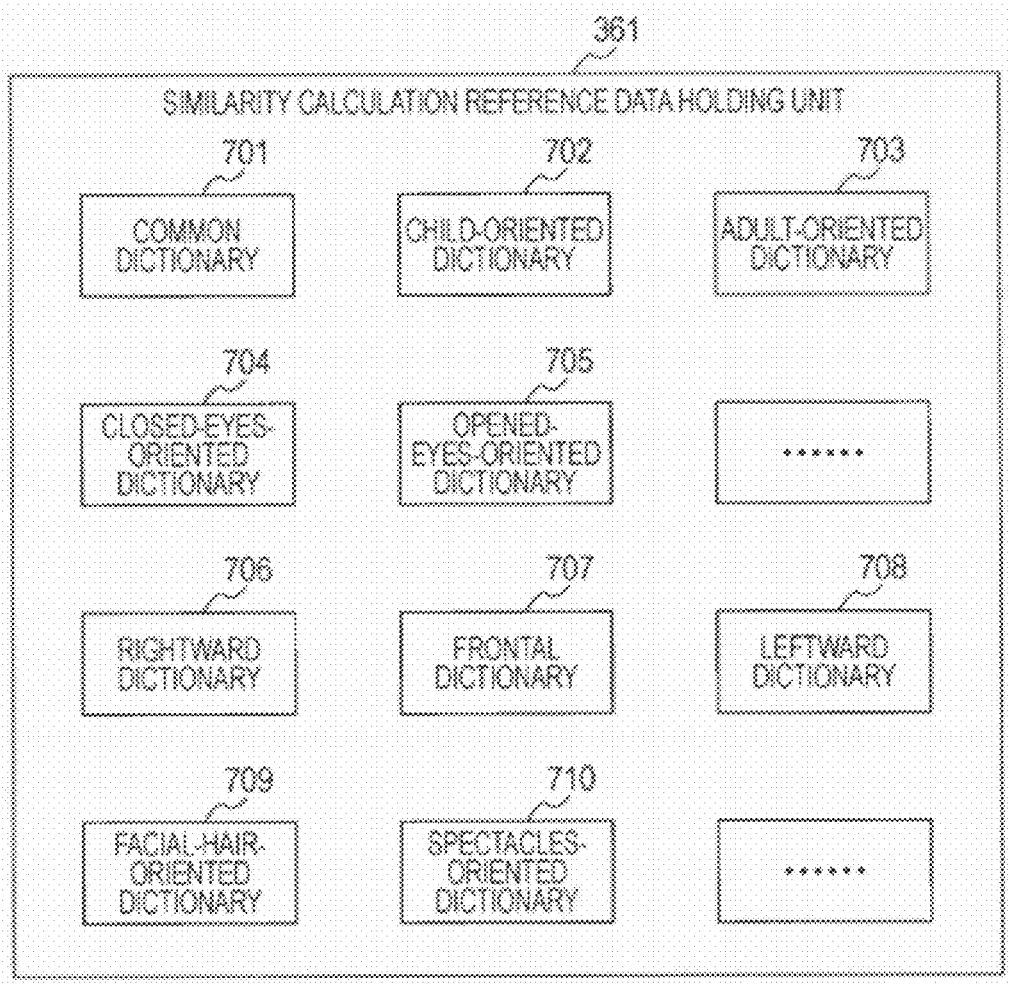

FIG. 17

| | COORDINATES 0 (x, y) OF FACE FEATURE QUANTITY | | COORDINATES 1 (x, y) OF FACE FEATURE QUANTITY | | THRESHOLD (θ) OF LEVEL DIFFERENCE BETWEEN COORDINATES 0 AND 1 | WEIGHT (α) OF REFERENCE DATA |
|---|---|---|---|---|---|---|
| | x | y | x | y | | |
| REFERENCE DATA 0 | ... | ... | ... | ... | ... | ... |
| REFERENCE DATA 1 | ... | ... | ... | ... | ... | ... |
| REFERENCE DATA 2 | ... | ... | ... | ... | ... | ... |
| ... | ... | ... | ... | ... | ... | ... |
| REFERENCE DATA n-1 | ... | ... | ... | ... | ... | ... |

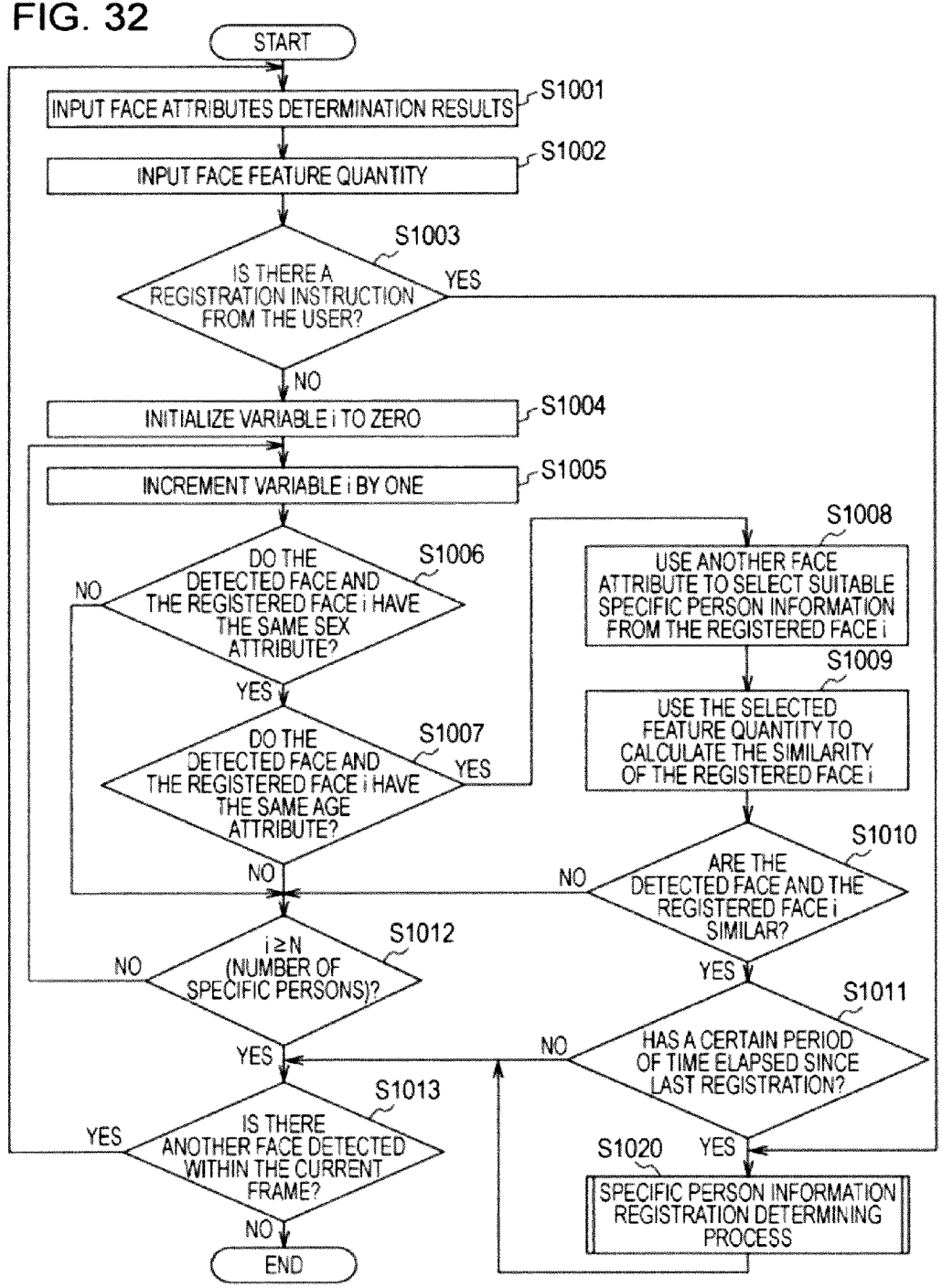

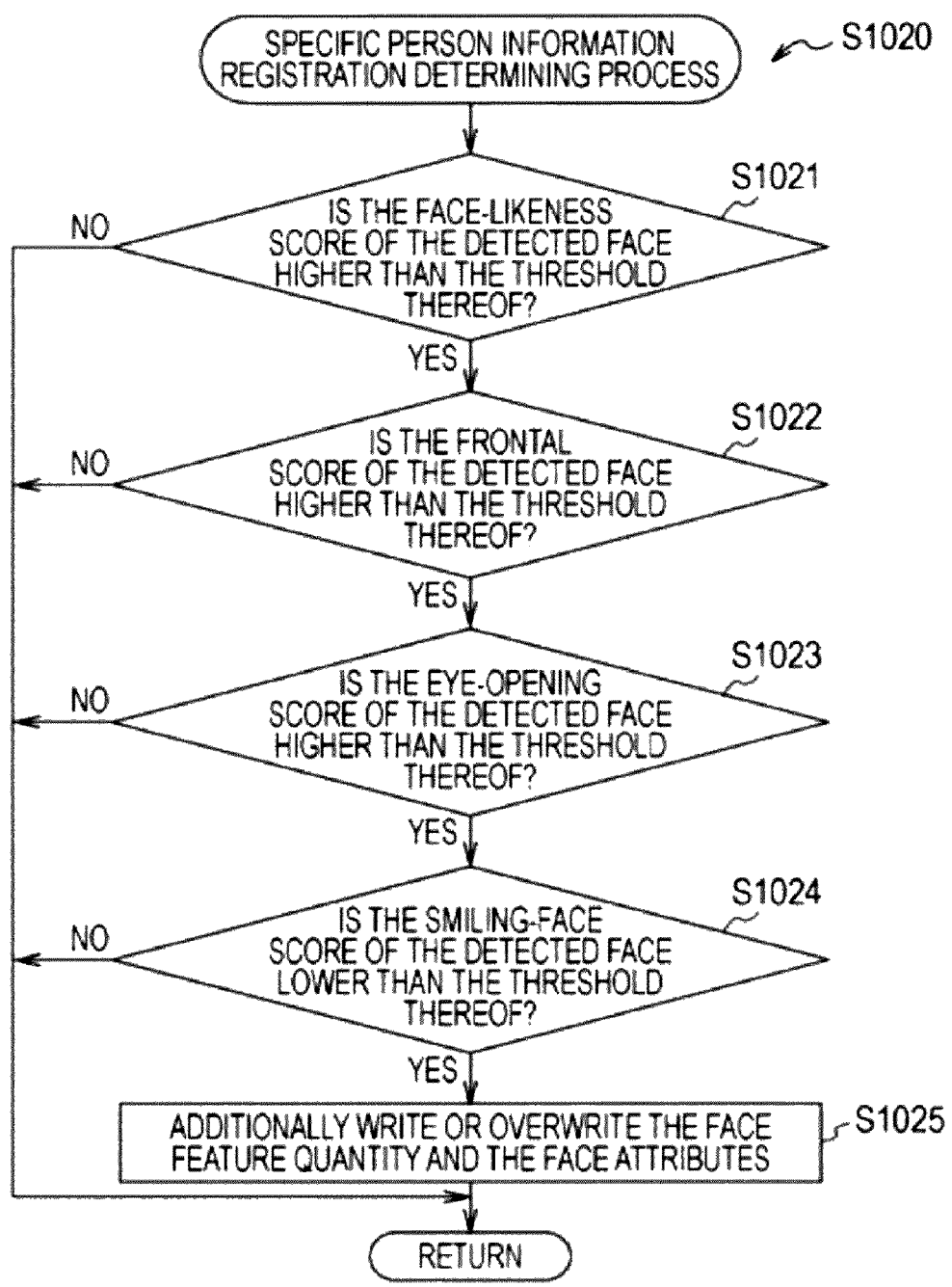

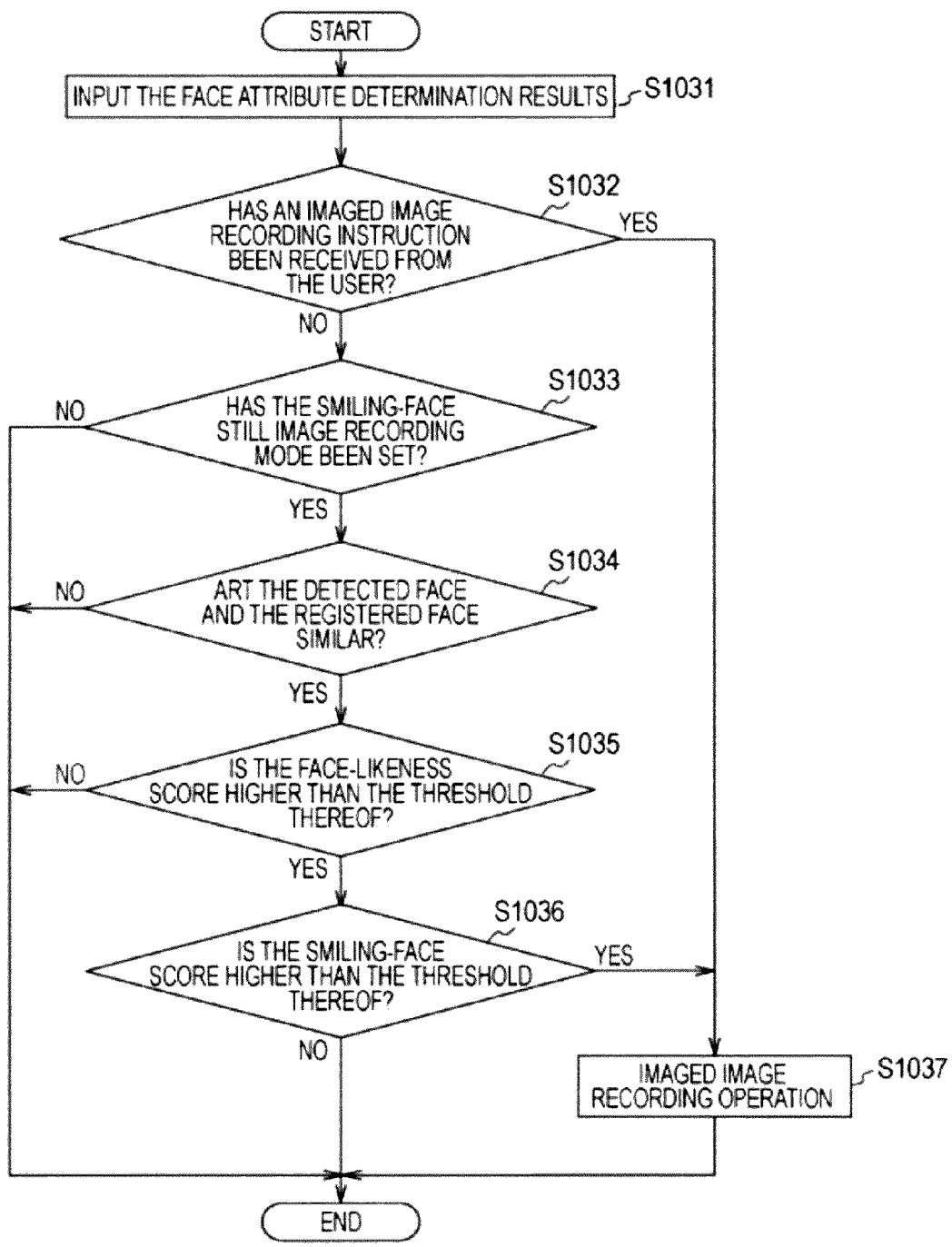

IMAGE PROCESSING APPARATUS AND ASSOCIATED METHODOLOGY FOR FACIAL RECOGNITION

BACKGROUND OF THE INVENTION

1. Field of the Invention

The present invention relates to an image processing apparatus, and specifically, relates to an image processing apparatus, and an imaging apparatus, which recognize a specific subject included in an image, and a processing method according thereto, and a program causing a computer to execute the method thereof.

2. Description of the Related Art

In recent years, improvement in performance has advanced regarding imaging apparatuses such as miniature cameras or the like implemented in digital still cameras, digital video cameras (e.g., integrated camera/recorder), and cellular phones. Recently, subject recognition technology that recognizes what a subject is, has gathered a great deal of attention. As this subject recognition technology, for example, face detection technology has been proposed wherein a person's face is detected from an imaged image by image processing.

Technology has been proposed wherein various types of face attributes such as facial expression, age, age group, and so forth are further determined by image processing regarding the face detected, using such face detection technology (so-called face attribute determination technology). For example, an imaging apparatus has been proposed wherewith, in a case where both adults and children are included in an imaged image as subjects, children are preferentially imaged so as to look better, as compared to adults, based on determined face attributes (e.g., the age and age group of a face). Also, for example, an imaging apparatus has been proposed wherein a facial expression evaluation value relating to a specific facial expression (e.g., the degree of smiling) is calculated regarding the face detected using the face detection technology, and in the case of this facial expression evaluation value exceeding a threshold, a recording operation of an imaged image is automatically executed (e.g., see Japanese Unexamined Patent Application Publication No. 2008-42319).

SUMMARY OF THE INVENTION

According to the above-mentioned related art, a recording operation of an imaged image can be executed using face attributes determined regarding a detected face. However, a situation wherein determination is made regarding whether or not a detected face is a specific person's face, and each recording operation is performed regarding the specific person's face thereof, is not taken into consideration.

Now, for example, individual identifying technology to identify a specific person's face has been proposed in the field of security. It can be conceived that control of focusing, exposure doubling, skin color adjustment, or the like can be performed upon a specific person in an optimized manner by applying this individual identifying technology to an imaging apparatus.

In order to perform such individual identification, for example, specific individual information used for identifying a specific person to be identified (e.g., feature quantities relating to a specific person's face) has to be registered in an imaging apparatus. Also, in order to perform individual identification with high precision, it is important to register suitable specific individual information. For example, variable factors such as the orientation of a specific person's face, closing/opening state of eyes, facial expression, and so forth are set to a standard state, and then specific individual information relating to such a face has to be registered. As a registration method of such specific individual information, for example, a registration method can be conceived wherein the specific individual information is registered in an imaging apparatus by a manual user operation while performing imaging operations of a person to be registered. However, there is a possibility that it may be difficult for a beginner to register suitable specific individual information by such a registration method.

Also, for example, there is a possibility that the specific individual information may change over time. Therefore, it is important to update suitable specific individual information at suitable timing, but in the case of registering the specific individual information by manual user operations, there is a possibility that the specific individual information may not be updated at a suitable timing. Therefore, it is important to register suitable specific individual information beforehand, and then perform individual identification suitably.

It has been found to be desirable to execute individual identification suitably.

According to an embodiment of the present invention, there are provided an image processing apparatus, a processing method thereof, and a program that causes a computer to execute the method thereof, the image processing apparatus including: a subject information storage unit configured to store feature quantities and attributes relating to a plurality of subjects; a subject detecting unit configured to detect a subject included in an image; an attribute determining unit configured to determine the attributes of the detected subject; a feature quantity extracting unit configured to extract a feature quantity relating to the detected subject; and a similarity calculating unit configured to select one or a plurality of feature quantities from feature quantities relating to a plurality of subjects stored in the subject information storage unit based on the determined attributes to calculate similarity between a subject according to the selected feature quantities, and the detected subject, based on the selected feature quantities and the extracted feature quantity. Thus, there is provided an operation wherein one or a plurality of feature quantities are selected from feature quantities relating to a plurality of subjects based on the determined attributes, and similarity between a subject according to the selected feature quantities, and the detected subject is calculated based on the selected feature quantities and the extracted feature quantity.

The subject detecting unit may detect a person's face included in the image as the subject; with the attribute determining unit determining at least either age or sex as the attribute of the detected person's face; and with the similarity calculating unit selecting a face having the same age and sex as the determined age and sex from a plurality of faces stored in the subject information storage unit, and selecting one or a plurality of feature quantities from feature quantities according to the selected face. Thus, there is provided an operation wherein a face having the same age and sex as the determined age and sex is selected from a plurality of faces stored in the subject information storage unit, and one or a plurality of feature quantities are selected from feature quantities according to the selected face.

The image processing apparatus may further include a subject information registration unit configured to determine whether the calculated similarity and the determined attributes satisfy registration conditions, and in a case where determination is made that the registration conditions are satisfied, store the extracted feature quantity and the determined attributes in the subject information storage unit. Thus, there is provided an operation wherein in a case where determination is made that the calculated similarity and the determined attributes satisfy registration conditions, the extracted feature quantity and the determined attributes are stored.

The subject detecting unit may detect a person's face included in the image as the subject; with the attribute determining unit determining at least one of the degree of face likeness, the frontal degree of facial orientation, the degree to which the eyes are open, and the degree of smiling as the detected face's attributes; and with the subject information registration unit taking conditions as the registration conditions where the calculated similarity exceeds a threshold, and at least one of the degree of face likeness, the frontal degree of facial orientation, and the degree to which the are eyes open exceeds a threshold, and the determined degree of smiling does not exceed a threshold, and in a case where determination is made that the registration conditions are satisfied, storing the extracted feature quantity and the determined attributes in the subject information storage unit. Thus, there is provided an operation wherein in a case where determination is made that the registration conditions are satisfied where the calculated similarity exceeds a threshold, and at least one of the degree of face likeness, the frontal degree of facial orientation, and the degree to which the eyes are open exceeds a threshold, and the determined degree of smiling does not exceed a threshold, the extracted feature quantity and the determined attributes are stored.

The subject information storage unit may store date and time when the feature quantities and attributes relating to the subject were stored, for each of the subjects; with the subject information registration unit determining whether or not date and time according to the selected feature quantities stored in the subject information storage unit have elapsed for a certain period of time or more in a case where determination is made that the registration conditions are satisfied, and in a case where determination is made that the date and time according to the selected feature quantities has elapsed for a certain period of time or more, storing the extracted feature quantity and the determined attributes in the subject information storage unit. Thus, there is provided an operation wherein determination is made whether or not date and time according to the selected feature quantities stored in the subject information storage unit have elapsed for a certain period of time or more in a case where determination is made that the registration conditions are satisfied, and in a case where determination is made that the date and time according to the selected feature quantities has elapsed for a certain period of time or more, the extracted feature quantity and the determined attributes are stored.

The subject information registration unit may write and store the extracted feature quantity and the determined attributes over the feature quantities store in the subject information storage unit, serving as a similarity calculation target regarding which determination has been made that the registration conditions have been satisfied, and the attributes according thereto. Thus, there is provided an operation wherein the extracted feature quantity and the determined attributes are written and stored over the feature quantities stored in the subject information storage unit, serving as a similarity calculation target regarding which determination has been made that the registration conditions have been satisfied, and the attributes according thereto.

According to an embodiment of the present invention, there are provided an imaging apparatus, a processing method thereof, and a program that causes a computer to execute the method thereof, the imaging apparatus including: a subject information storage unit configured to store feature quantities and attributes relating to a plurality of subjects; an imaging unit configured to image a subject to generate an imaged image; a subject detecting unit configured to detect a subject included in the imaged image; an attribute determining unit configured to determine the attributes of the detected subject; a feature quantity extracting unit configured to extract a feature quantity relating to the detected subject; a recording instructing unit configured to determine whether or not the determined attributes satisfy recording operation conditions used for recording operations of the imaged image, and in a case where determination is made that the recording operation conditions are satisfied, instructs recording of the imaged image; a similarity calculating unit configured to select one or a plurality of feature quantities from feature quantities relating to a plurality of subjects stored in the subject information storage unit based on the determined attributes to calculate similarity between a subject according to the selected feature quantities, and the detected subject, based on the selected feature quantities and the extracted feature quantity; and a subject information registration unit configured to determine whether the calculated similarity and the determined attributes satisfy registration conditions, and in a case where determination is made that the registration conditions are satisfied, store the extracted feature quantity and the determined attributes in the subject information storage unit. Thus, there is provided an operation wherein in a case where determination is made that the determined attribute satisfy the recording operation conditions, recording of the imaged image is instructed, one or a plurality of feature quantities are selected from feature quantities relating to a plurality of subjects based on the determined attributes to calculate similarity between a subject according to the selected feature quantities, and the detected subject, based on the selected feature quantities and the extracted feature quantity, and in a case where determination is made that the calculated similarity and the determined attributes satisfy the registration conditions, the extracted feature quantity and the determined attributes are stored.

The recording operation conditions relating to the determined attributes and the setting content of the registration conditions may differ. Thus, there is provided an operation wherein recording instruction of an imaged image, and storage of the extracted feature quantity and the determined attributes are carried out assuming that The recording operation conditions relating to the determined attributes and the setting content of the registration conditions differ.

The subject detecting unit may detect a person's face included in the image as the subject; with the attribute determining unit determining at least one of the degree of face likeness, and the degree of smiling as the attribute of the detected person's face; and with the recording instructing unit taking conditions as the recording operation conditions where the calculated similarity exceeds a threshold, and the determined degree of face likeness, and degree of smiling exceed a threshold, and in a case where the recording operation conditions are satisfied, instructing recording of the imaged image. Thus, there is provided an operation wherein in a case where determination is made that the recording operation conditions are satisfied wherein the calculated similarity exceeds a threshold, and the determined degree of face likeness, and degree of smiling exceed thresholds, recording of the imaged image is instructed.

According to the above configurations, there is provided an excellent advantage in that individual identification can be performed suitably.

BRIEF DESCRIPTION OF THE DRAWINGS

FIG. 6 is a diagram illustrating a configuration example of an attribute determining dictionary used at the time of the attribute determining unit according to an embodiment of the present invention executing attribute determination;

FIG. 8 is a diagram illustrating an example of the determination result and integration result value relating to each attribute output from the attribute determining unit according to an embodiment of the present invention;

FIG. 10 is a diagram illustrating a layout example in the case of setting feature points on a normalized face image generated by the normalizing unit according to an embodiment of the present invention;

FIG. 15 is a diagram schematically illustrating each piece of information stored in a specific individual information storage unit according to an embodiment of the present invention;

FIG. 16 is a diagram schematically illustrating a similarity calculating dictionary held at a similarity calculation reference data holding unit according to an embodiment of the present invention;

FIG. 17 is a diagram illustrating a configuration example of the similarity calculating dictionary used at the time of calculating the similarity of the face to be determined by a similarity calculating unit according to an embodiment of the present invention;

FIG. 32 is a flowchart illustrating the procedures of a specific individual information registration process by the imaging apparatus according to an embodiment of the present invention;

FIG. 33 is a flowchart illustrating a specific individual information registration determining procedure of the procedures of the specific individual information registration process by the imaging apparatus according to an embodiment of the present invention; and FIG. 34 is a flowchart illustrating the procedure of a still image recording process by the imaging apparatus according to an embodiment of the present invention.

DESCRIPTION OF THE PREFERRED EMBODIMENTS

Figure 1:
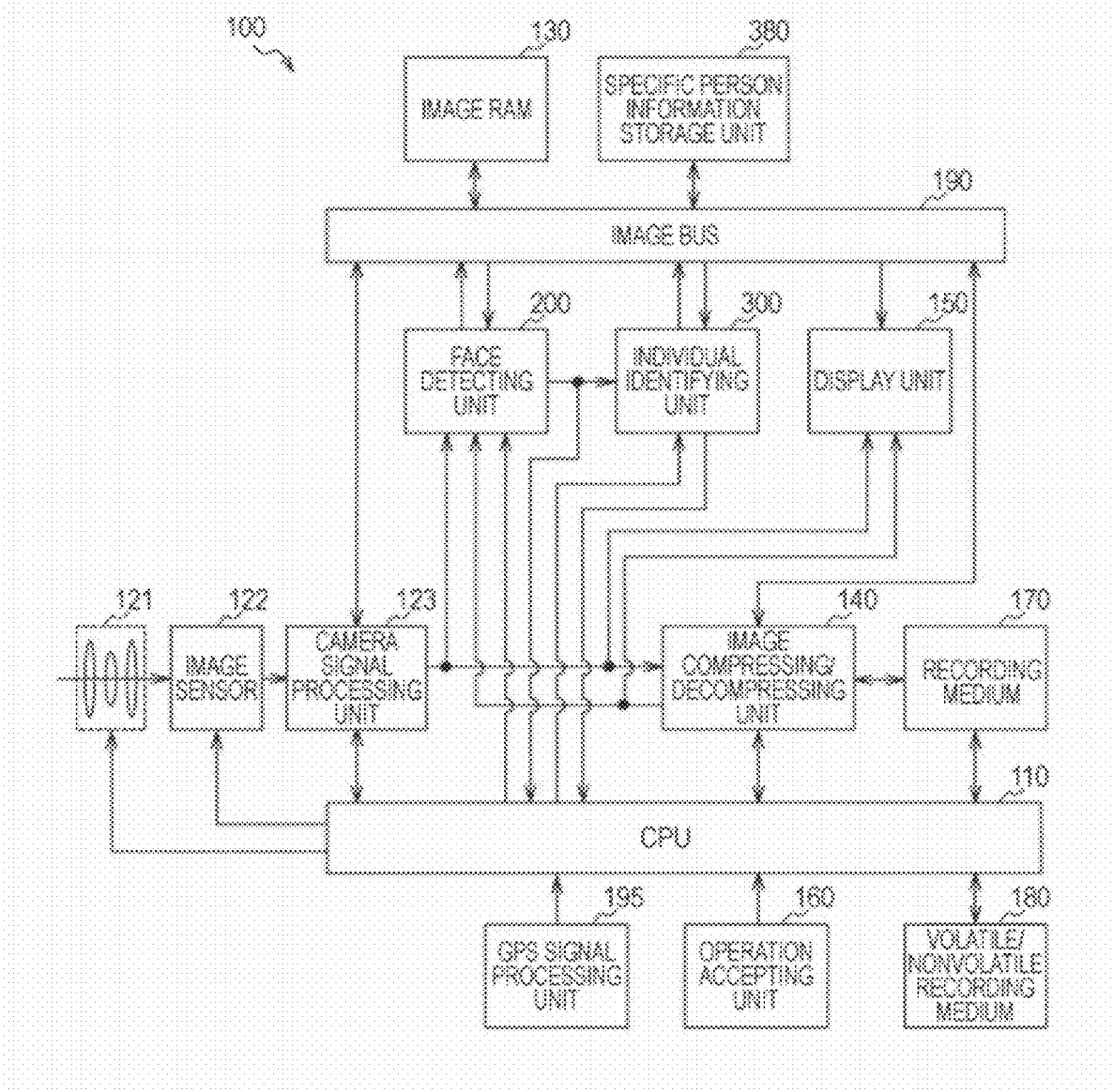
FIG. 1 is a block diagram illustrating a functional configuration example of an imaging apparatus according to an embodiment of the present invention.

Next, an embodiment of the present invention will be described in detail with reference to the drawings. FIG. 1 is a block diagram illustrating a functional configuration example of an imaging apparatus 100 according to en embodiment of the present invention. Examples of the imaging apparatus 100 include an imaging apparatus such as a digital still camera, a digital video camera, or the like, or an imaging apparatus such as a camera belonging to a terminal device such as a cellular phone, a personal computer, or the like.

The imaging apparatus 100 includes a CPU (Central Processing Unit) 110, a lens unit 121, an image sensor 122, a camera signal processing unit 123, and image RAM (Random Access Memory) 130. Also, the imaging apparatus 100 includes an image compressing/decompressing unit 140, a display unit 150, an operation accepting unit 160, a storage medium 170, a volatile/nonvolatile storage medium 180, an image bus 190, and a GPS signal processing unit 195. Also, the imaging apparatus 100 includes a face detecting unit 200, an individual identifying unit 300, and a specific individual information storage unit 380. Note that transmission/reception of an image signal between blocks of the imaging apparatus 100 is performed with direct exchange or exchange via the image RAM 130 that is shared memory, or the image bus 190.

The CPU 110 is a CPU that controls each unit of the imaging apparatus 100 based on various types of control programs stored in memory (not shown). Note that the CPU 110 is an example of the recording instructing unit referred to in the Summary of the Invention.

The lens unit 121 is made up of multiple lenses such as a focus lens, a zoom lens, and so forth, and outputs incident light from a subject input via these lenses to the image sensor 122. Also, diaphragm control and focus control at the lens unit 121 are executed by the CPU 110.

The image sensor 122 subjects the incident light passed through the lens unit 121 to photoelectric conversion to generate an electric signal, and outputs the generated electric signal to the camera signal processing unit 123.

The camera signal processing unit 123 subjects the electric signal output from the image sensor 122 to various types of signal processes, and outputs the image data subjected to the signal process to the image RAM 130, image compressing/decompressing unit 140, display unit 150, and face detecting unit 200. Examples of the signal process with the camera signal processing unit 123 include white balance adjustment, noise reduction process, level correction process, A/D conversion process, and color correction process. Note that the image sensor 122 and the camera signal processing unit 123 are examples of the imaging unit referred to in the Summary of the Invention.

The image RAM 130 stores image data serving as a processing target at the imaging apparatus 100.

The image compressing/decompressing unit 140 compresses or decompresses input various types of image data according to each image process. For example, the image data subjected to a compressing process by the image compressing/decompressing unit 140 is output to the storage medium 170 and recorded. Also, the image data subjected to a decompressing process by the image compressing/decompressing unit 140 is output to the image RAM 130, display unit 150, and face detecting unit 200. Note that as a compressed format, for example, a JPEG (Joint Photographic Experts Group) format may be employed.

The display unit 150 is a display unit which displays the image corresponding to the image data output by the camera signal processing unit 123 or the image compressing/decompressing unit 140.

The operation accepting unit 160 is an operation accepting unit which accepts various types of operations performed by the user, and outputs the accepted operation content to the CPU 110. As the operation accepting unit 160, for example, various types of operating members are included in the imaging apparatus 100. Examples of this operating member include a specific individual information registration button, a specific individual information automatic updating mode setting/releasing button, a still image recording mode setting/releasing button, a shutter button, a smiling face still image recording mode setting/releasing button, a moving image recording mode setting/releasing button, and a recording button. The specific individual information registration button is a button to be pressed at the time of registering specific individual information relating to a face included in an image being imaged now. This specific individual information is information relating to a specific person, and an example thereof is information such as feature quantities relating to a specific person's face, the attribute of the face thereof (face attribute), and so forth. The specific individual information automatic updating mode setting/releasing button is, when a face included in an image being imaged now is a specific person, and satisfies a certain condition, a button used for setting or releasing an updating mode wherein the specific individual information relating to the face thereof is updated or additionally registered automatically. The still image recording mode setting/releasing button is a button used for setting or releasing a still image recording mode wherein recording of a still image is set to a recordable state. The shutter button is a button to be pressed at the time of recording an image being imaged now in a case where the still image recording mode or the moving image recording mode has been set. The smiling face still image recording mode setting/releasing button is a button used for setting or releasing a smiling face still image recording mode wherein at the time of determining that a face included in an image being imaged now is a smiling face, the still image thereof is automatically recorded. The moving image recording mode setting/releasing button is a button used for setting or releasing a moving image recording mode wherein recording of a moving image is set to a recordable state. The recording button is a button to be pressed at the time of starting or ending recording of a moving image in the case of the moving image recording mode being set. Note that the display unit 150 and the operation accepting unit 160 may be configured integrally as a touch panel, or may be configured separately with the display unit 150 as a liquid crystal display (LCD), and with the operation accepting unit 160 as a hardware key such as a D-pad or the like.

The storage medium 170 is a storage medium which stores the image data output from the image compressing/decompressing unit 140. Also, the storage medium 170 outputs the stored image data to the image compressing/decompressing unit 140. Note that examples of an image storage medium include a magnetic disk, an optical disc, semiconductor storage medium, and a magnetic tape. Also, an image storage medium may be an externally detachable storage medium, or a built-in storage medium.

The volatile/nonvolatile storage medium 180 is a volatile/nonvolatile storage medium which stores various types of information.

The image bus 190 is a shared bus used for propagating image data.

The GPS signal processing unit 195 calculates position information based on the GPS signal received from a GPS signal reception antenna (not shown), and outputs the calculated position information to the CPU 110. Note that the calculated position information includes numeric value data such as latitude, longitude, altitude, direction, point-in-time, and so forth.

The face detecting unit 200 detects a person's face included in an image corresponding to input image data, and outputs a face image including a detected face that is a peripheral image thereof to the image RAM 130 via the image bus 190. Also, the face detecting unit 200 outputs information relating to the detected face to the individual identifying unit 300. Note that the face detecting unit 200 will be described in detail with reference to FIG. 2. Also, the face detecting unit 200 is an example of the subject detecting unit referred to in the Summary of the Invention.

The individual identifying unit 300 calculates similarity that indicates whether or not the face detected by the face detecting unit 200 is the same face as a person (registered person) whose specific individual information is stored in the specific individual information storage unit 380, and outputs the calculated similarity to the CPU 110. That is to say, the individual identifying unit 300 determines whether or not the face detected by the face detecting unit 200 is the same face as a registered face. The CPU 110 can perform various control based on the calculated similarity. For example, with an imaged image, a marker may be added to the face determined to be the same person's face as a registered person. Also, for example, with an imaged image, imaging control used for optimizing the face determined to be the same face as a registered person (e.g., imaging control such as focusing, exposure adjustment, skin color adjustment, or the like) can be performed. Also, in a case where determination is made that a face included in an image being imaged now is a specific person, and also satisfies a certain condition, the individual identifying unit 300 updates or additionally registers the specific individual information relating to the face thereof automatically. Note that the individual identifying unit 300 will be described in detail with reference to FIG. 3.

The specific individual information storage unit 380 stores specific individual information, and supplies the stored specific individual information to the individual identifying unit 300 via the image bus 190. Also, the specific individual information storage unit 380 overwrites or additionally records the specific individual information output from the individual identifying unit 300 for each person. Note that the specific individual information 380 will be described in detail with reference to FIGS. 3 and 15. Also, the specific individual information storage unit 380 is an example of the subject information storage unit referred to in the Summary of the Invention.

Now, in a case where the pressing operation of the shutter button has been accepted by the operation accepting unit 160, the CPU 110 controls the image sensor 122, the camera signal processing unit 123, the image compressing/decompressing unit 140, and so forth to execute a recording operation for a still image. For example, when the shutter button is pressed, one frame worth of image data processed by the camera signal processing unit 123 is supplied to the image compressing/decompressing unit 140, and is compressed and encoded by the image compressing/decompressing unit 140 in accordance with a predetermined encoding method. Subsequently, the image data subjected to a compression process is output to the storage medium 170 and recorded. Also, in the case of the moving image recording mode being set, and in the case of the pressing operation of the recording button being accepted by the operation accepting unit 160, the CPU 110 controls the image sensor 122, the camera signal processing unit 123, the image compressing/decompressing unit 140, and so forth to execute a recording operation of a moving image. For example, when the recording button is pressed, the image data processed by the camera signal processing unit 123 is consecutively supplied to the image compressing/decompressing unit 140, and is compressed and encoded by the image compressing/decompressing unit 140 in accordance with a predetermined encoding method.

Note that an input/output terminal may be provided to the imaging apparatus 100 in order to, under control of the CPU 110, output the image data output by the image compressing/decompressing unit 140 to an external apparatus such as an external storage medium, and output the image data input from the external storage medium to the image compressing/decompressing unit 140.

Figure 2:
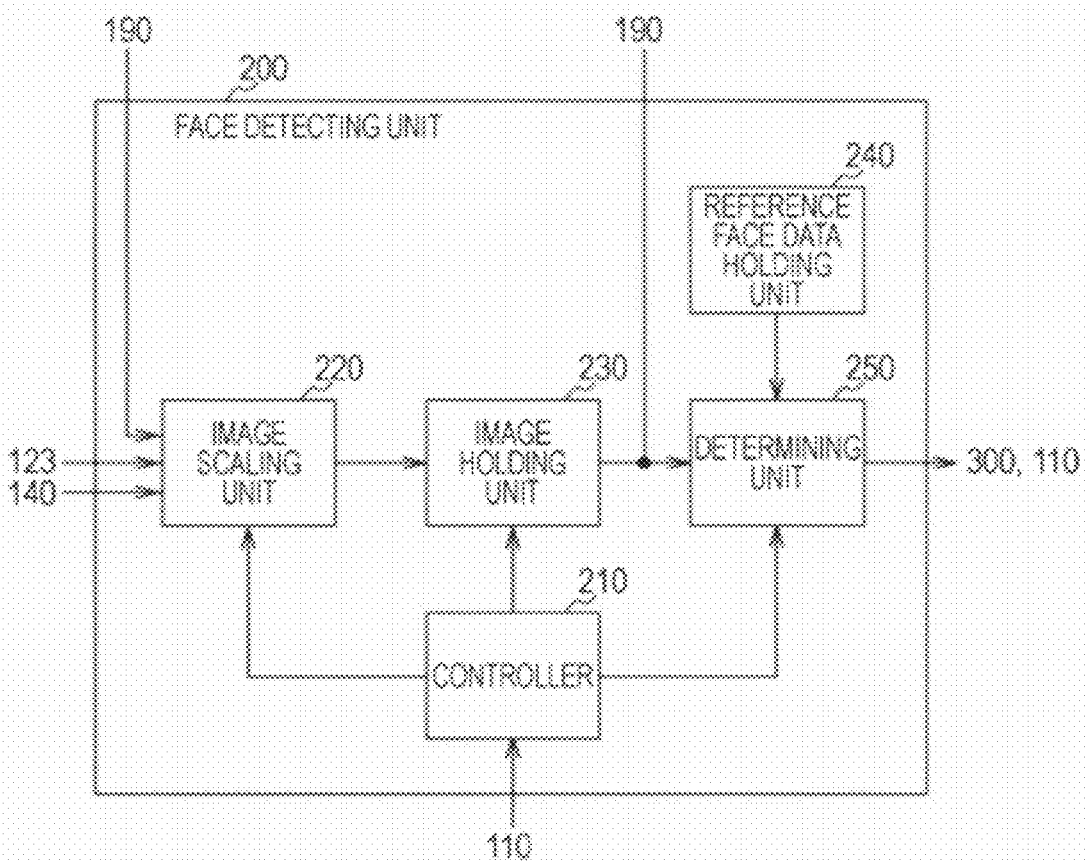
FIG. 2 is a block diagram illustrating a functional configuration example of a face detecting unit according to an embodiment of the present invention.

FIG. 2 is a block diagram illustrating a functional configuration example of the face detecting unit 200 according to en embodiment of the present invention. The face detecting unit 200 includes a controller 210, an image scaling unit 220, an image holding unit 230, a reference face data holding unit 240, and a determining unit 250.

The controller 210 controls each unit of the face detecting unit 200 in accordance with the instructions from the CPU 110.

The image scaling unit 220 subjects the image data output from the camera signal processing unit 123 or the image compressing/decompressing unit 140, or the image corresponding to the image data stored in the image RAM 130 to an enlarging or reducing process to generate an image suitable for detection of a face. Note that the enlargement ratio or reduction ratio of an image is determined based on the instructions from the CPU 110.

The image holding unit 230 is image memory that holds an image subjected to the enlarging process or reducing process by the image scaling unit 220, and outputs the held image data to the determining unit 250 directly and the image RAM 130 via the image bus 190.

The reference face data holding unit 240 holds face data serving as a reference at the time of being employed for face detection, and outputs the held face data to the determining unit 250. Examples of the face data serving as a reference include a face image itself, and a feature database relating to a person's face.

The determining unit 250 determines whether or not a face is included in an image held in the image holding unit 230, and outputs the face detection result to the CPU 110 and the individual identifying unit 300. Specifically, the determining unit 250 takes out an image held in the image holding unit 230 with a certain window size, executes a template matching process between the taken-out image and the face data held at the reference face data holding unit 240, calculates face likeness based on the height of correlativity, and determines whether or not the taken-out image is a face image based on the calculated face likeness. For example, in a case where the calculated face likeness is sufficiently high, the taken-out image is determined to be a face image. Such determinations are executed repeatedly, and consequently, faces included in an image held at the image holding unit 230 are detected.

Also, the determining unit 250 extracts various types of data relating to a face included in an image held at the image holding unit 230, based on the height of the correlativity as to the image data held at the reference face data holding unit 240, and outputs the extracted various types of data to the CPU 110 and the individual identifying unit 300 as the face detection results. The face reduction results include the coordinates of a face region, the size of the face region, facial orientation, face likeness, and so forth. These face detection results are stored in the CPU 110.

Figure 3:
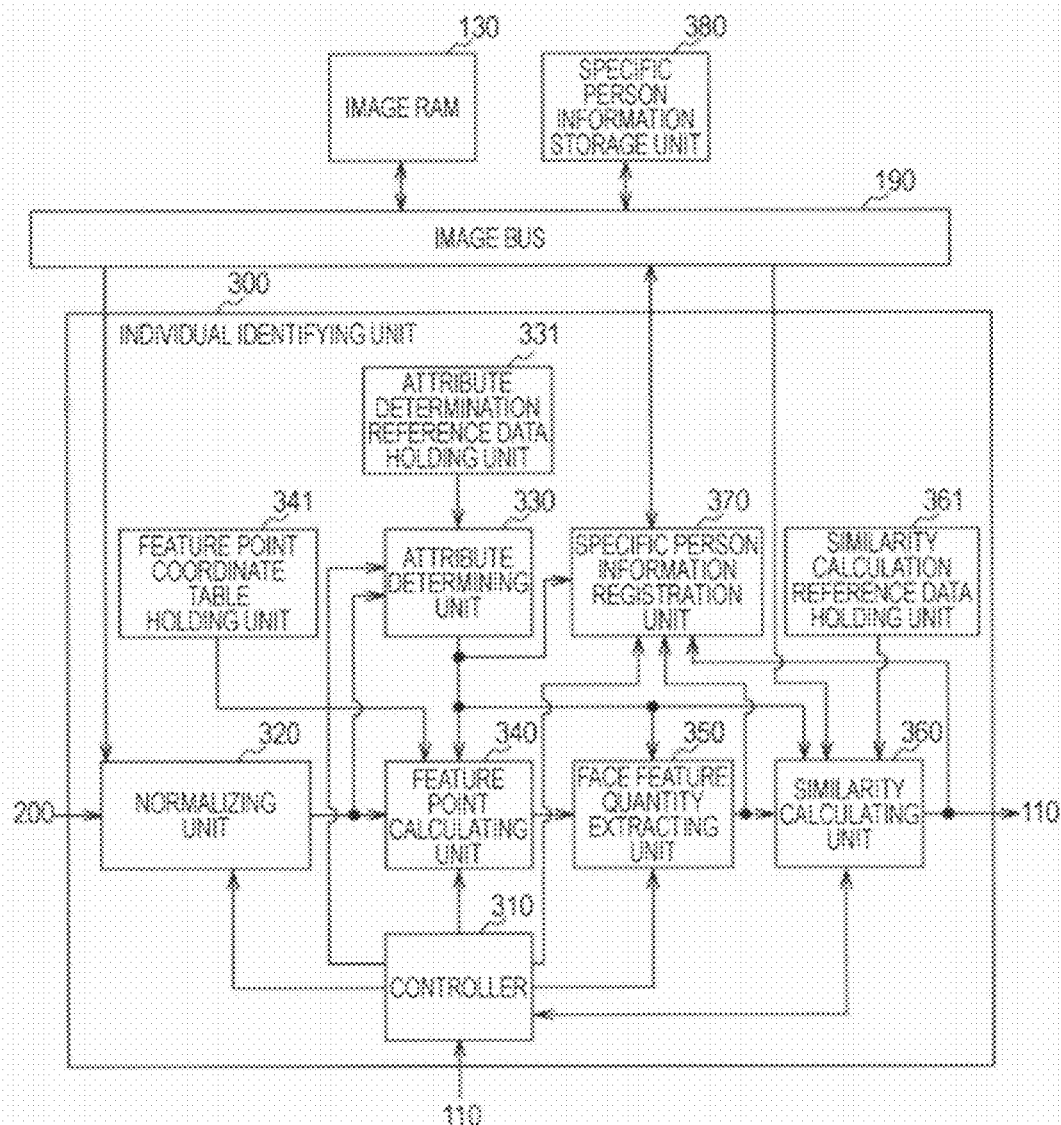
FIG. 3 is a block diagram illustrating a functional configuration example of an individual identifying unit according to an embodiment of the present invention, and schematic relationship between the individual identifying unit, image RAM, image bus, and specific individual information storage unit.

FIG. 3 is a block diagram illustrating a functional configuration example of the individual identifying unit 300 according to an embodiment of the present invention, and schematic relationship between the individual identifying unit 300, image RAM 130, image bus 190, and specific individual information storage unit 380.

The individual identifying unit 300 includes a controller 310, a normalizing unit 320, an attribute determining unit 330, an attribute determination reference data holding unit 331, a feature point calculating unit 340, and a feature point coordinate table holding unit 341. Also, the individual identifying unit 300 includes a facial feature quantity extracting unit 350, a similarity calculating unit 360, a similarity calculation reference data holding unit 361, and a specific individual information registration unit 370. Also, the individual identifying unit 300 inputs a face image including a face included in an image stored in the image RAM 130 via the image bus 190. Also, the individual identifying unit 300 obtains specific individual information stored in the specific individual information storage unit 380 to execute similarity calculation, and records specific individual information that satisfies a certain condition in the specific individual information storage unit 380.

The controller 310 controls each unit of the individual identifying unit 300 in accordance with the instructions from the CPU 110.

The normalizing unit 320 reads out a face image from an image stored in the image RAM 130 based on the coordinates and size of a face region included in the face detection results output from the face detecting unit 200 to execute normalization regarding the readout face image, and outputs the normalized face image that is the normalized face image to the attribute determining unit 330 and the feature point calculating unit 340. Specifically, for example, in order to make a face included in the face image read out from the image RAM 130 a certain size, the normalizing unit 320 subjects the face image thereof to resolution conversion (e.g., 64×64 pixels or so), and subjects the face image thereof to a rotating process to generate a normalized face image in order for both eyes included in the face thereof to be kept horizontally. Note that normalization of a face image will be described in detail with reference to FIG. 4.

The attribute determining unit 330 uses attribute determination reference data held in the attribute determination reference data holding unit 331 to determine the attributes of a face included in the normalized face image output from the normalizing unit 320, and outputs the determination results (face attribute information, integration result values, etc.) to the feature point calculating unit 340, facial feature quantity extracting unit 350, similarity calculating unit 360, and specific individual information registration unit 370. For example, a calculation is made regarding how much the attribute determination reference data held in the attribute determination reference data holding unit 331 is satisfied regarding the normalized face image output from the normalizing unit 320, whereby the integration result value regarding each of the attributes is obtained. Here, examples of the facial attributes determined by the attribute determining unit 330 include facial expression, age or age group, sex, opening/closing of eyes, race, spectacled/non-spectacled, type of spectacles, shaved/unshaved, type of facial hair, with/without headwear, type of headwear, with/without jewelry, type of jewelry, hairstyle, and facial orientation. Note that examples of the facial expression include smiling, serious, sad, and angry. Note that the determination of the facial attributes will be described in detail with reference to FIGS. 5A through 8.

The attribute determination reference data holding unit 331 holds an attribute determining dictionary made up of a plurality of attribute determination reference data used for determination by the attribute determining unit 330 for each of the facial attributes. This attribute determination reference data is reference data wherein the facial attributes determined by the attribute determining unit 330 are sufficiently learned beforehand. Note that the attribute determining dictionary will be described in detail with reference to FIG. 6.

The feature point calculating unit 340 calculates and determines the positions of feature points to be set on a face included in the normalized face image output from the normalizing unit 320, and outputs the normalized face image including the calculated positions of feature points to the facial feature quantity extracting unit 350. Specifically, the feature point calculating unit 340 executes modification or the like regarding the coordinates of a feature point included in the feature point coordinate table held in the feature point coordinate table holding unit 341 based on the determination results output from the attribute determining unit 330, and calculates and determines the position of a feature point to be set on a face included in the normalized face image output from the normalizing unit 320. Note that the calculation of the position of a feature point to be set on a face included in the normalized face image will be described in detail with reference to FIGS. 9A through 11C.

The feature point coordinate table holding unit 341 holds a feature point coordinate table used for calculation of the position of a feature point by the feature point calculating unit 340. Note that the feature point coordinate table will be described in detail with reference to FIGS. 9A through 9C.

The facial feature quantity extracting unit 350 extracts a facial feature quantity that is the feature quantity at each feature point included in the normalized face image output from the feature point calculating unit 340, and outputs the extracted facial feature quantity to the similarity calculating unit 360 and the specific individual information registration unit 370. With an embodiment of the present invention, an extracting method using the Gabor filter will be descried as a method used for extracting the feature quantity at a feature point. Note that the feature quantity extracted using the Gabor filter is referred to as Gabor jet. Also, with an embodiment of the present invention, the modification or the like of the Gabor filter will be executed based on the determination results output from the attribute determining unit 330. Note that the extracting method of a feature quantity using the Gabor filter will be described in detail with reference to FIGS. 12A through 14. Also, the facial feature quantity extracting unit is an example of the feature quantity extracting unit referred to in the Summary of the Invention.

The similarity calculating unit 360 calculates similarity between the facial feature quantity output from the facial feature quantity extracting unit 350, and the facial feature quantity read out from the specific individual information storage unit 380, and outputs the calculated similarity to the CPU 110 and the specific individual information registration unit 370. Specifically, the similarity calculating unit 360 uses the similarity calculation reference data held in the similarity calculation reference data holding unit 361 to compare the facial feature quantity output from the facial feature quantity extracting unit 350, and the facial feature quantity read out from the specific individual information storage unit 380, and based on this comparison results, calculates the similarity between these special feature quantities. This calculated similarity is similarity that indicates whether or not the face detected by the face detecting unit 200 is the face of the same person as a specific person of which the facial feature quantity is stored in the specific individual information storage unit 380. With an embodiment of the present invention, modification or the like of the similarity calculation reference data used for calculation of similarity is executed based on the determination result output from the attribute determining unit 330. Note that the calculation of similarity will be described in detail with reference to FIGS. 15 through 22.

The similarity calculation reference data holding unit 361 holds a similarity calculating dictionary made up of a plurality of similarity calculation reference data used for determination of the similarity calculating unit 360 for each facial attribute. This similarity calculation reference data is reference data wherein the facial similarity calculated by the similarity calculating unit 360 is sufficiently learned beforehand. The similarity calculating dictionary will be described in detail with reference to FIG. 17.

The specific individual information registration unit 370 registers specific individual information that satisfies a certain condition in the specific individual information storage unit 380 based on the instructions of the controller 310. Specifically, in a case where the user instructs registration of specific individual information, or in a case where determination is made within the imaging apparatus 100 that a certain condition is satisfied, a registration process is executed. This registration process will be described in detail with reference to FIGS. 23, 25A, and 25B. Note that the specific individual information registration unit 370 is an example of the subject information registration unit referred to in the Summary of the Invention.

The specific individual information storage unit 380 stores the facial feature quantity extracted regarding the face of a specific person, the face attributes determined regarding this specific person in a correlated manner for each person, and supplies the stored facial feature quantity and face attributes to the similarity calculating unit 360 via the image bus 190. Also, the specific individual information storage unit 380 overwrites or additionally records the facial feature quantity output from the specific individual information registration unit 370. Note that the storage content of the specific individual information storage unit 380 will be described in detail with reference to FIG. 15.

Figure 4:
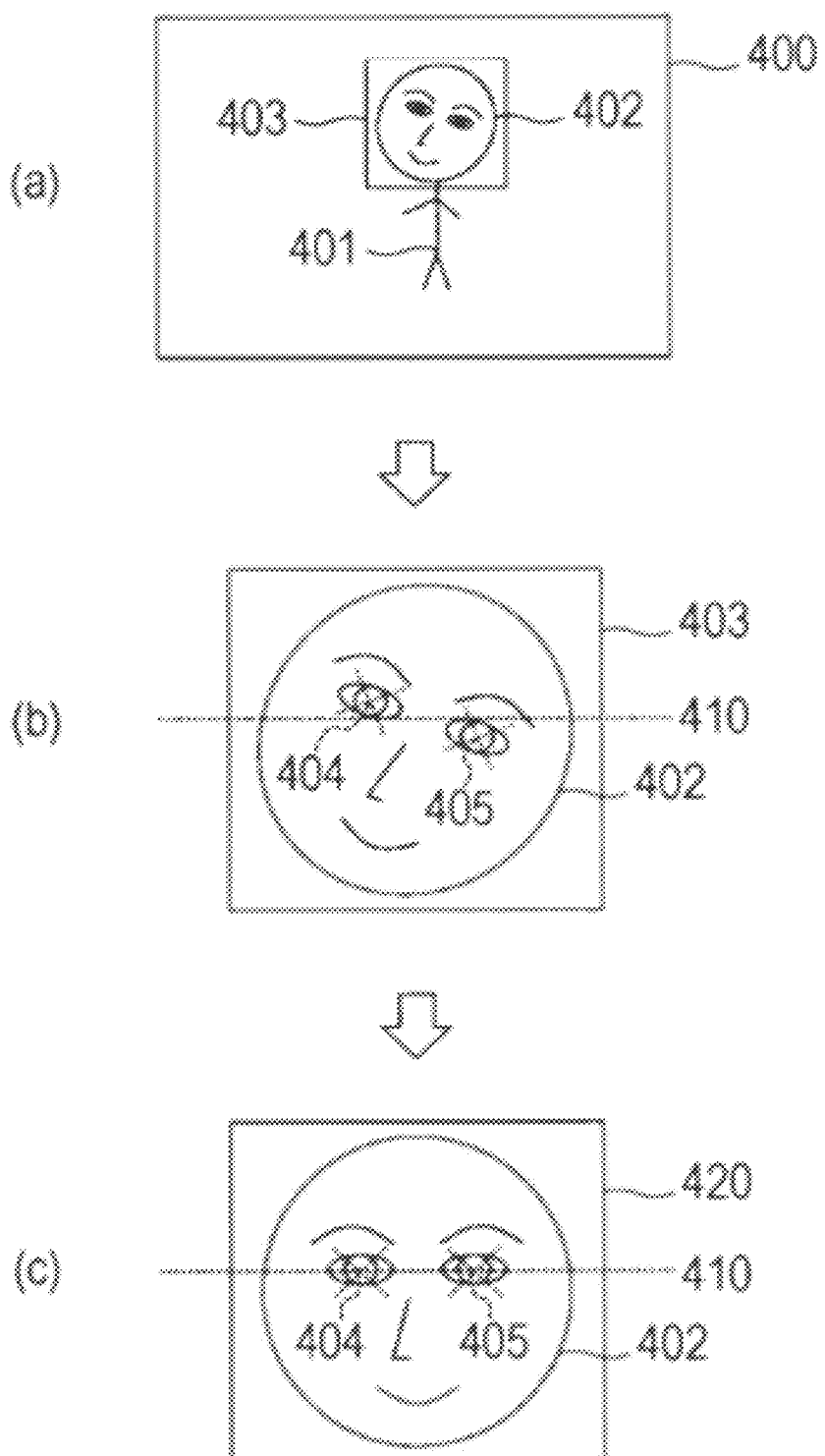
FIG. 4 is a diagram illustrating a normalization example in the case of normalizing a face image that is a peripheral image including a face detected by the face detecting unit according to an embodiment of the present invention.

Next, the case of normalizing a face image will be described in detail with reference to the drawings. FIG. 4 is a diagram illustrating a normalization example in the case of normalizing a face image that is a peripheral image including a face detected by the face detecting unit 200 according to an embodiment of the present invention.

In FIG. 4, (a) is a diagram illustrating an imaged image 400 corresponding to the image data output from the camera signal processing unit 123. Let us say that the face 402 of a person 401 is included in the imaged image 400. In this case, upon the face 402 being detected from the imaged image 400 by the face detecting unit 200, the detection result of the face 402 is output from the face detecting unit 200 to the individual identifying unit 300. Upon the individual identifying unit 300 inputting the detection result of the face 402, a face image 403 including the face 402 is read out from the image RAM 130, and the readout face image 403 is input to the normalizing unit 320.

In FIG. 4, (b) and (c) are diagrams illustrating transitions in the case of normalizing the face image 403 including the face 402 detected by the face detecting unit 200. In this example, a reference position 410 serving as a reference at the time of normalizing the face image is stipulated. The reference position 410 is a reference position used for converting the face image, for example, in order for both eyes included in the face detected by the face detecting unit 200 to be kept generally horizontally, and to be disposed in certain positions of the normalized face image. Note that, as a method for detecting both eyes, for example, similar to the face detecting method, an eye detecting method according to a template matching process may be employed.

For example, the face image 403 taken out from the imaged image 400 is subjected to resolution conversion in order for the face 402 included in the face image 403 to become a certain size. Subsequently, the face image 403 is subjected to a rotating process by affine conversion or the like in order for the center position of eyes 404 and 405 included in the face 402 to be matched with on the line of the reference position 410, and to be kept generally horizontal, whereby a normalized face image 420 is generated.

Note that with an embodiment of the present invention, a case will be described where normalization is executed with the center position of both eyes as a reference, but the position of another organ other than both eyes included in a face may be employed as a reference.

Figure 5A:
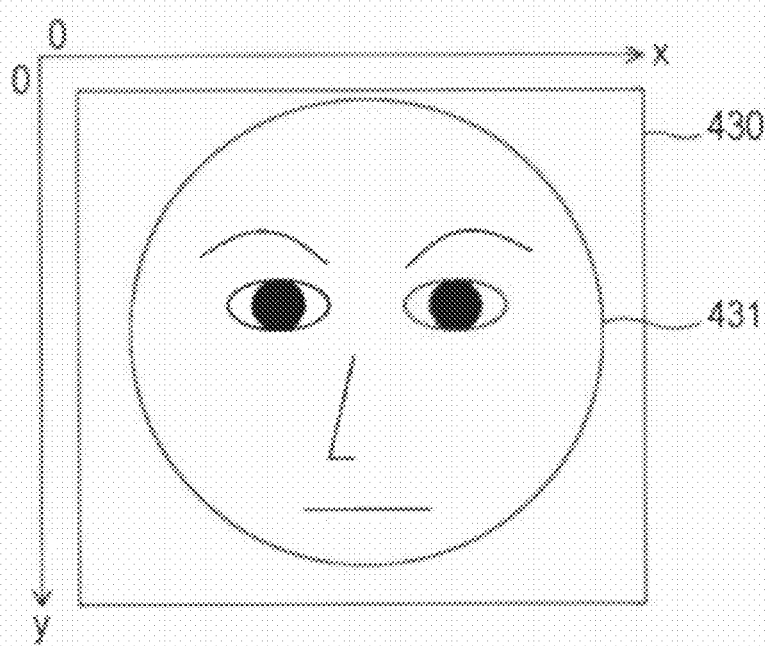
FIGS. 5A and 5B are diagrams schematically illustrating a face image serving as a face attribute determination target by an attribute determining unit according to an embodiment of the present invention.
Figure 5B:
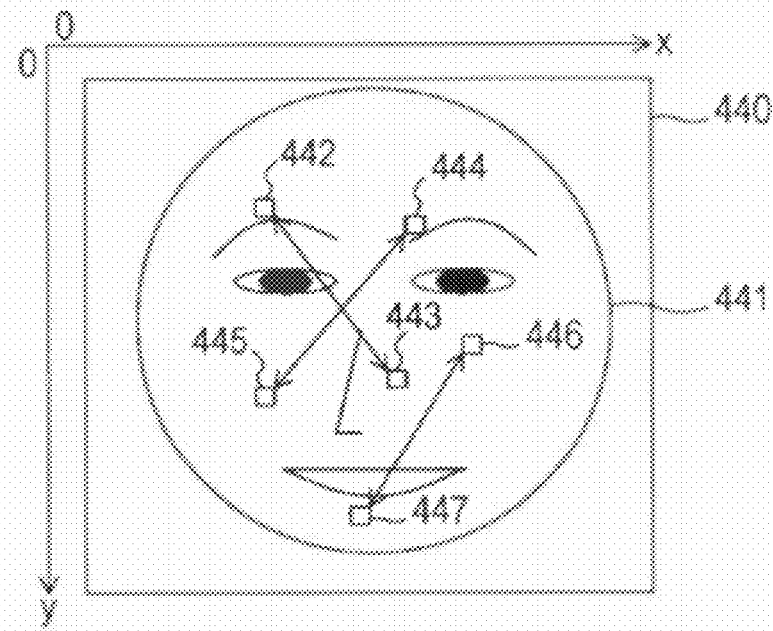

Next, determination of face attributes will be described in detail with reference to the drawings. FIGS. 5A and 5B are diagrams schematically illustrating a face image serving as a face attribute determination target by the attribute determining unit 330 according to an embodiment of the present invention. FIG. 5A illustrates a normalized face image 430 including a normal face 431, and FIG. 5B illustrates a normalized face image 440 including a smiling face 441. Here, in the case of comparing the normal face and the smiling face, in general, with the smiling face, feature points frequently occur such as the eyes narrowing, the eyebrows and the outer corners of the eyes dropping, the positions of the cheeks rising, the nose spreading sideways, the mouth spreading sideways, the mouth opening, and the corners of the mouth rising. Therefore, the attribute determination reference data corresponding to these feature states of a smiling face is held in the attribute determination reference data holding unit 331 beforehand, this attribute determination reference data is used for attribute determination of a smiling face, or degree determination of a smiling face. This determination method using this attribute determination reference data will be described in detail with reference to FIGS. 6 through 8. Also, the positions 442 through 447 shown in FIG. 5B will be described in detail with reference to FIG. 6.

FIG. 6 is a diagram illustrating a configuration example of an attribute determining dictionary used at the time of the attribute determining unit 330 according to an embodiment of the present invention executing attribute determination. With an embodiment of the present invention, description will be made regarding a case where determination of face attributes is executed using a correlativity determining method according to pixel difference of a normalized face image.

Attribute determination reference data making up an attribute determining dictionary 450 is configured of coordinates 0(x, y) 451 and coordinates 1(x, y) 452 of a normalized face image, a threshold (θ) 453 of level difference (luminance difference) between the coordinates 0 and the coordinates 1, and the weight (α) 454 of the reference data. The coordinates 0(x, y) 451 and the coordinates 1(x, y) 452 of the normalized face image are coordinates that indicate the positions of two points of the normalized face image. The threshold (θ) 453 of level difference (luminance difference) between the coordinates 0 and the coordinates 1 is a threshold as to the level difference (luminance difference) between the coordinates 0 and the coordinates 1. The weight (α) 454 of the reference data is a weight coefficient to be added based on the comparison result between the value of the level difference between the coordinates 0 and the coordinates 1, and the threshold (θ) 453 of level difference between the coordinates 0 and the coordinates 1. Also, n pieces of reference data made up of a combination of such values are stored in the attribute determining dictionary 450. Note that the reference data shown in an embodiment of the present invention is referred to as a weak discriminator (weak hypothesis).

Each value making up the attribute determination reference data is set using the most effective 300 through 1000 combinations of the sets learned by a machine learning algorithm, for example, such as AdaBoost or the like. Thus, the format of each attribute determining dictionary is the same, and accordingly, multiple determining processes can be executed by the same algorithm.

Next, description will be made in detail regarding a case where the attribute determining dictionary is used to execute determination of face attributes regarding a normalized face image, with reference to the drawings. In this example, description will be made regarding a case where an attribute determining process using the attribute determining dictionary 450 is executed with the upper left corner of the normalized face image 440 shown in FIG. 5B as the origin, the horizontal axis as the x axis, and the vertical axis as the y axis.

For example, let us say that the position of the normalized face image 440 corresponding to the value of the coordinates 0(x, y) 451 stored in the first row (reference data 0) of the attribute determining dictionary 450 is a position 442, and the position of the normalized face image 440 corresponding to the value of the coordinates 1(x, y) 452 is a position 443. Also, let us say that the position of the normalized face image 440 corresponding to the value of the coordinates 0(x, y) 451 stored in the second row (reference data 1) of the attribute determining dictionary 450 is a position 444, and the position of the normalized face image 440 corresponding to the value of the coordinates 1(x, y) 452 is a position 445. Further, let us say that the position of the normalized face image 440 corresponding to the value of the coordinates 0(x, y) 451 stored in the third row (reference data 2) of the attribute determining dictionary 450 is a position 446, and the position of the normalized face image 440 corresponding to the value of the coordinates 1(x, y) 452 is a position 447.

First, the value of a score S used for determination is set to zero, and calculation using each value included in the reference data 0 of the attribute determining dictionary 450 is executed. Specifically, the luminance value A(0) at the position 442 corresponding to the value of the coordinates 0(x, y) 451 included in the reference data 0 of the attribute determining dictionary 450, and the luminance value B(0) at the position 443 corresponding to the value of the coordinates 1(x, y) 452 are extracted. Subsequently, difference C(0) between the extracted luminance values is calculated using the following expression.

$$C(0)=A(0)-B(0)$$

Subsequently, the calculated difference value C(0) between the luminance values, and the value of the threshold (θ) 453 included in the reference data 0 of the attribute determining unit 450 are compared to determine whether or not the calculated value C(0) is greater than the threshold (θ) 453. In the case of the calculated value C(0) being equal to or smaller than the threshold (θ) 453, the value of the weight (α) 454 included in the reference data 0 of the attribute determining dictionary 450 is added to the score S. On the other hand, in the case of the calculated value C(0) being greater than the threshold (θ) 453, the value of the weight (α) 454 included in the reference data 0 of the attribute determining dictionary 450 is not added to the score S.

Subsequently, the above calculations are repeated using each value included in the reference data 1 of the attribute determining dictionary 450. Specifically, the luminance value A(1) at the position 444 corresponding to the value of the coordinates 0(x, y) 451 included in the reference data 1 of the attribute determining dictionary 450, and the luminance value B(1) at the position 445 corresponding to the value of the coordinates 1(x, y) 452 are extracted. Subsequently, difference C(1) between the extracted luminance values is calculated using the following expression.

$$C(1)=A(1)-B(1)$$

Subsequently, the calculated difference value C(1) between the luminance values, and the value of the threshold (θ) 453 included in the reference data 1 of the attribute determining unit 450 are compared to determine whether or not the calculated value C(1) is greater than the threshold (θ) 453. In the case of the calculated value C(1) being equal to or smaller than the threshold (θ) 453, the value of the weight (α) 454 included in the reference data 1 of the attribute determining dictionary 450 is added to the score S. On the other hand, in the case of the calculated value C(1) being greater than the threshold (θ) 453, the value of the weight (α) 454 included in the reference data 1 of the attribute determining dictionary 450 is not added to the score S.

Subsequently, the above calculations are repeated using each value from the reference data 2 and so on through the difference data n-1 of the attribute determining dictionary 450.

That is to say, in the case of executing a determining process using the attribute determining dictionary regarding the normalized face image 440, C(i) is calculated with Expression 1 using each value included in the reference data 0 through n-1 of the attribute determining dictionary 450 in order, and subsequently, determination is made whether or not the calculated C(i) satisfies Expression 2. Here, a variable i is an integer, and indicates the value of 0 through n-1.

$$C(i)=A(i)-B(i) \qquad \text{Expression 1}$$

$$C(i)>\theta(i) \qquad \text{Expression 2}$$

Subsequently, in the case of the calculated C(i) satisfying Expression 2, the value of α(i) is not added to the score S, and in the case of the calculated C(i) not satisfying Expression 2, the value of α(i) is added to the score S. Here, the value of luminance corresponding to the coordinates 0(x, y) 451 included in the reference data i is represented with A(i), and the value of luminance corresponding to the coordinates 1(x, y) 452 included in the reference data i is represented with B(i). Also, the value of the threshold (θ) 453 included in the reference data i is represented with θ(i), and the value of the weight (α) 454 included in the reference data i is represented with α(i).

Subsequently, after each calculation using each value included in the reference data n-1 of the attribute determining dictionary 450 ends, each attribute is determined based on the value of the score S that is an integration result value.

Now, the score $S_n(P)$ after each calculation using each value included in the reference data 0 through n-1 of the attribute determining dictionary can be represented with the following Expression 3.

$$S_n(P) = \sum_{i=0}^{n-1} \alpha_i \cdot h(P(x_{i0}, y_{i0}) - P(x_{i1}, y_{i1}) - \theta_i)$$

Expression 3

Here, $S_n(P)$ represents the integration result value of the reference data 0 through n-1, $\alpha_i$ represents the value of the weight ($\alpha$) 454 included in the reference data i, and $P(x_{i0}, y_{i0})$ represents the value of luminance corresponding to the coordinates 0(x, y) 451 included in the reference data i. Also, $P(x_{i1}, y_{i1})$ represents the value of luminance corresponding to the coordinates 1(x, y) 452 included in the reference data i, and n represents the number of reference data. Also, h(z) represents a function that becomes 0 in the case of z>0, and becomes 1 in the case of z≦0.

Next, description will be made in detail regarding a determining method wherein face attributes are determined based on the integration result value calculated using each value included in the reference data 0 through n-1 of the attribute determining dictionary, with reference to the drawings.

Figure 7A:
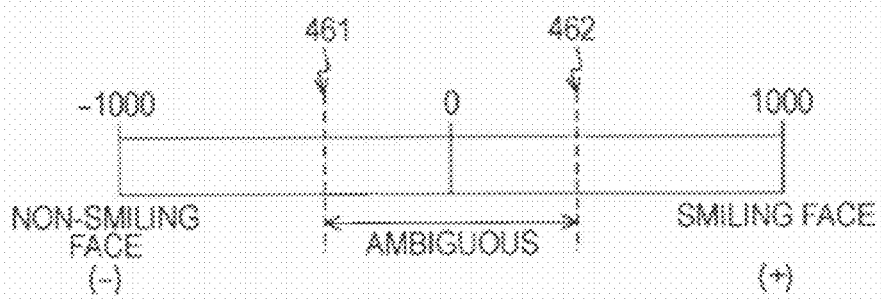
FIGS. 7A through 7C are diagrams illustrating the range of an integration result value relating to each face attribute obtained by the attribute determining unit according to an embodiment of the present invention using the attribute determining dictionary regarding a normalized face image.
Figure 7B:
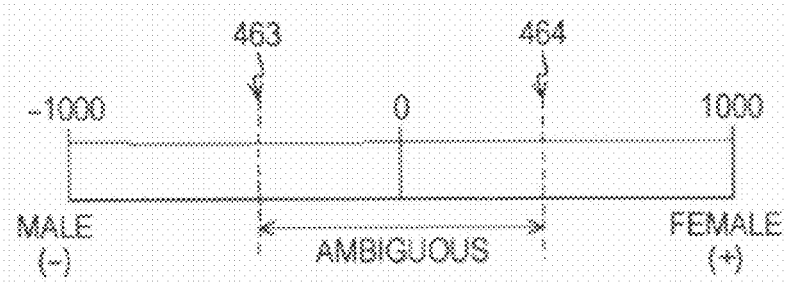
Figure 7C:
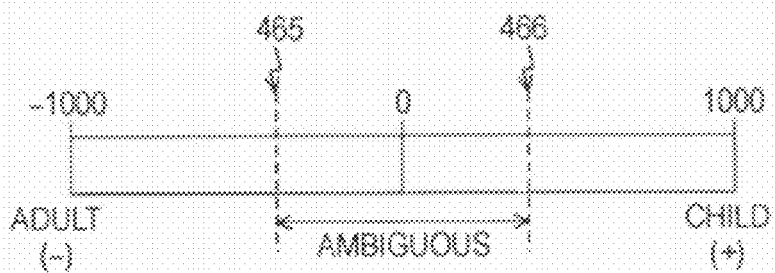

FIGS. 7A through 7C are diagrams illustrating the range of an integration result value relating to each face attribute obtained by the attribute determining unit 330 according to an embodiment of the present invention using the attribute determining dictionary regarding a normalized face image. FIG. 7A illustrates the range of an integration result value relating to a smiling face as an face attribute, FIG. 7B illustrates the range of an integration result value relating to sex as an face attribute, and FIG. 7C illustrates the range of an integration result value relating to age as an face attribute. For example, let us say that the range of an integration result value relating to each attribute shown in FIGS. 7A through 7C is in a range of −1000 through +1000.

For example, let us assume a case where a learning sample of a smiling face at the time of learning by the above-mentioned machine learning algorithm is learned as a positive side, and a learning sample of a non-smiling face is learned as a negative side. In this case, in the case of determining a smiling face as a face attribute, a smiling face/non-smiling face is determined using the thresholds 461 and 462 shown in FIG. 7A.

For example, with the range of the integration result value relating to a smiling face shown in FIG. 7A, in the case of the score $S_n(P)$ that is the integration result value calculated using each value included in the reference data 0 through n-1 of the attribute determining dictionary being less than the threshold 461, determination is made as "a non-smiling face". On the other hand, in the case of the score $S_n(P)$ being greater than the threshold 462, determination is made as "a smiling face". Also, in the case of the score $S_n(P)$ being within the range of the thresholds 461 through 462, determination is made as neither a smiling face nor a non-smiling face, but as "ambiguous". Also, each attribute shown in FIGS. 7B and 7C is also determined in the same way as with FIG. 7A. These determination results and integration result values are output from the attribute determining unit 330 to the feature point calculating unit 340, facial feature quantity extracting unit 350, and similarity calculating unit 360.

FIG. 8 is a diagram illustrating an example of the determination result and integration result value relating to each attribute output from the attribute determining unit 330 according to an embodiment of the present invention. FIG. 8 schematically illustrates the determination result and the integration result value output from the attribute determining unit 330 as a face attribute determination result 470 using a list. Note that the identification numbers 001, 002, and so on shown in FIG. 8 are numbers used for identifying a face image serving as a determination target. As shown in FIG. 8, the determination result and the integration result value are output from the attribute determining unit 330 regarding each normalized face image. For example, with regard to a smiling face/non-smiling face 471 as a face attribute, "a smiling face", "a non-smiling face", or "ambiguous" is output as the determination result, and the value of the score $S_n(P)$ is output as the integration result value. With regard to a male/female (sex) 472, and an adult/child (age) 473 as a face attribute as well, the determination result and the integration result value are output in the same way.

Next, calculation of the position of a feature point of a normalized face image will be described in detail with reference to the drawings.

Figure 9A:
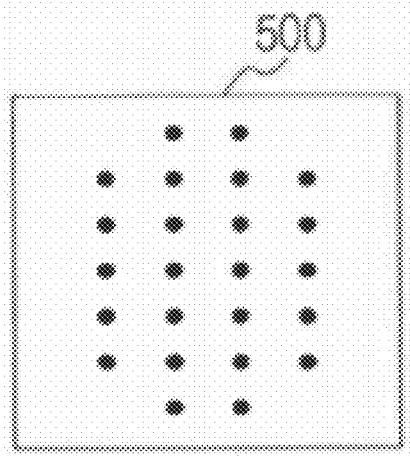
FIGS. 9A through 9C are diagrams illustrating an example of a feature-point position calculating method arranged to calculate the positions of feature points to be set to a normalized face image generated by a normalizing unit according to an embodiment of the present invention.
Figure 9B:
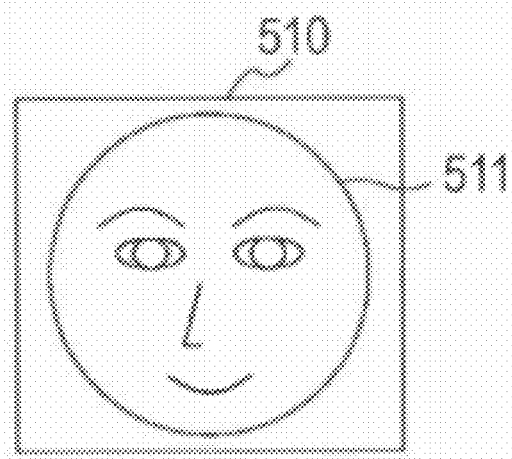
Figure 9C:
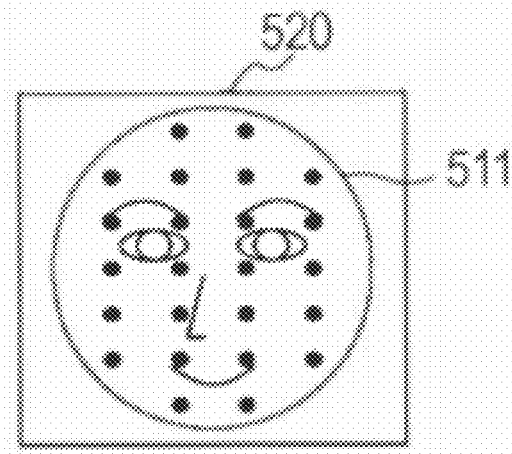

FIGS. 9A through 9C are diagrams illustrating an example of a feature-point position calculating method arranged to calculate the positions of feature points to be set to a normalized face image generated by the normalizing unit 320 according to an embodiment of the present invention. FIG. 9A is a diagram illustrating a feature point coordinate table 500 that is an example of a feature point coordinate table used in the case of calculating the position of a feature point to be set to a normalized face image. The feature point coordinate table 500 holds the coordinates of a feature point to be set to a normalized face image, and is held in the feature point coordinate table holding unit 341. In FIG. 9A, the size of a normalized face image serving as a setting target is represented with a white square, and positions corresponding to coordinates where a feature point is set are represented with black circles. Let us say that, for example, each of the coordinates is determined beforehand according to the face image of an adult as the default values of the feature point coordinates. Also, in FIGS. 9A through 11C, an example is illustrated wherein the number of feature points is somewhat reduced to facilitate explanation.

FIG. 9B is a diagram illustrating a normalized face image 510 that is an example of a normalized face image generated by the normalizing unit 320. Now, let us say that a face 511 included in the normalized face image 510 is a relatively ordinary adult's face. FIG. 9C is a diagram illustrating a case where, with the normalized face image 510 shown in FIG. 9B, feature points are set to the coordinates included in the feature point table 500 shown in FIG. 9A. Note that FIG. 9C illustrates the feature points disposed on the normalized face image 520 with black circles. Thus, in a case where a face included in the normalized face image 510 generated by the normalizing unit 320 is a relatively ordinary adult's face, feature points are set to the positions corresponding to the coordinates included in the feature point coordinate table 500, whereby the feature points can be set to a relatively suitable position.

However, a normalized face image serving as a similarity calculation target has been normalized based on the positions of both eyes, but difference between portions frequently occurs depending on the attributes of a person included in the normalized face image. Accordingly, there is a case where it is difficult to uniquely set feature point coordinates to be set to a normalized face image. Therefore, with an embodiment of the present invention, positions where that feature points are set is changed or added so as to be suitable for a face included in a normalized face image based on the face attribute determined by the attribute determining unit 330.

FIG. 10 is a diagram illustrating a layout example in the case of setting feature points on a normalized face image generated by the normalizing unit 320 according to an embodiment of the present invention. The normalized face image 520 shown in (a) in FIG. 10 is the same as the normalized face image 520 shown in FIG. 9C, (b) in FIG. 10 is a diagram illustrating a normalized face image 531 including a child's face, and (c) in FIG. 10 is a diagram illustrating a normalized face image 532 including a Westerner's face. Also, (d) in FIG. 10 is a diagram illustrating a normalized face image 533 including an Oriental's face, (e) in FIG. 10 is a diagram illustrating a normalized face image 534 including a leftward face, and (f) in FIG. 10 is a diagram illustrating a normalized face image 535 including a rightward face.

As shown in (b) in FIG. 10, in general, with a child's face, organs such as eyes, nose, mouth, and so forth are often concentrated to the center. For example, as a determination result of the face attribute relating to age, let us assume a case where a child is determined (in a case where the degree of a child is relatively high). In this case, an adult's feature points (positions corresponding to the coordinates included in the feature point coordinate table 500) wherein an adult's face length is generally longer that than a child's face length are changed so as to be reduced in the vertical direction (or enlarged in the horizontal direction) according to the degree of a child that is an integration result value.

Also, as shown in (c) in FIG. 10, in general, a Westerner's face frequently has a relatively long face length. On the other hand, as shown in (d) in FIG. 10, in general, an Oriental's face is frequently a round face. For example, in the case of comparing the horizontal width L1 of a Westerner's face included in the normalized face image 532, and the horizontal width L2 of an Oriental's face included in the normalized face image 533, the value of the horizontal width L2 of the Oriental is greater. Therefore, the positions corresponding to the coordinates included in the feature point coordinate table 500 are changed so as to be reduced or enlarged in the horizontal direction based on the determination results of the face attribute relating to race.

Also, as shown in (e) or (f) in FIG. 10, with regard to a leftward or rightward face, the organs of the face such as eyes, nose, mouth, and so forth are concentrated to the left or the right depending on the facial orientation. Therefore, the positions corresponding to the coordinates included in the feature point coordinate table 500 are changed so as to be moved in the horizontal direction based on the determination results of the face attribute relating to the facial orientation. As shown in (b) through (f) in FIG. 10, the positions of the feature points are changed based on the determination results of the face attribute, whereby optimal feature point settings can be performed as to the face serving as a similarity calculation target, and further, feature points can be calculated with further high precision. Thus, individual identifying precision can be further improved.

Figure 11A:
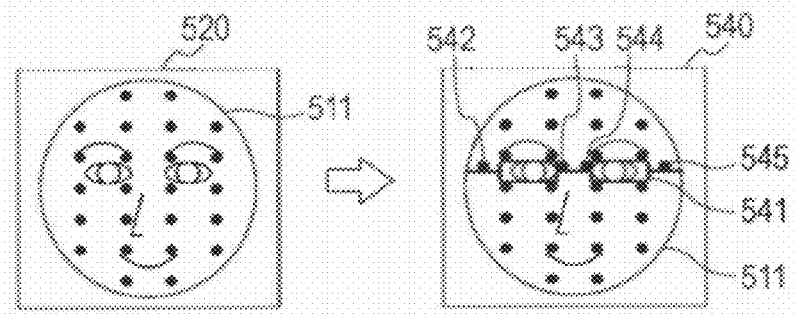
FIGS. 11A through 11C are diagrams illustrating a layout example in the case of setting feature points on a normalized face image generated by the normalizing unit according to an embodiment of the present invention.
Figure 11B:
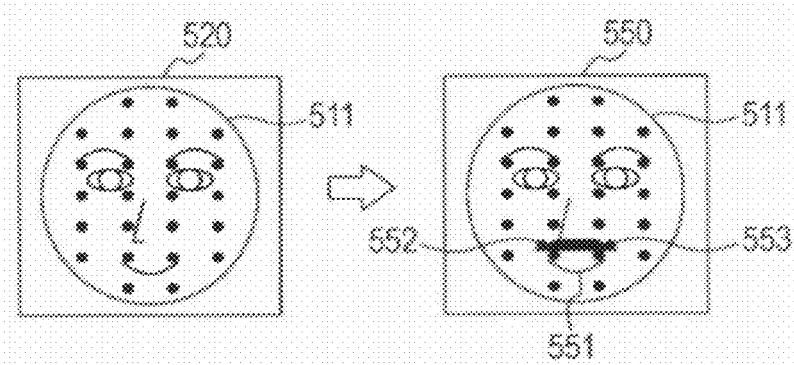
Figure 11C:
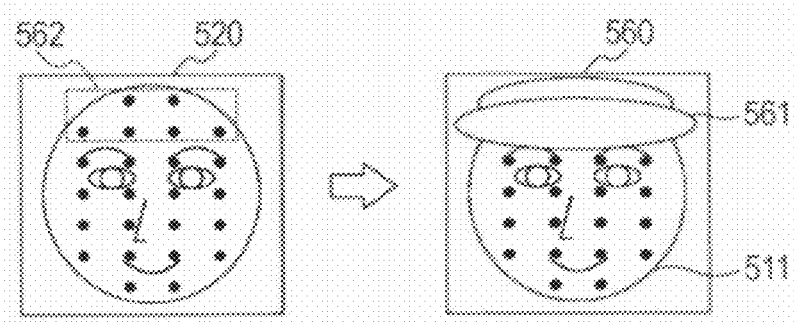

FIGS. 11A through 11C are diagrams illustrating a layout example in the case of setting feature points on a normalized face image generated by the normalizing unit 320 according to an embodiment of the present invention. The normalized face image 520 shown in FIGS. 11A through 11C is the same as the normalized face image 520 shown in FIG. 9C.

The normalized face image 540 shown in FIG. 11A is a normalized face image in a case where spectacles 541 are added to a face 511 included in the normalized face image 520. The normalized face image 550 shown in FIG. 11B is a normalized face image in a case where facial hair 551 is added to the face 511 included in the normalized face image 520. The normalized face image 560 shown in FIG. 11C is a normalized face image in a case where headwear 561 is added to the face 511 included in the normalized face image 520.

As shown in FIG. 11A, in a case where the integration result value of spectacles is high as the detected face attribute (in the case of being determined to be spectacled, or the like), feature points are added to positions conceived as surroundings of the spectacles. For example, feature points 542 through 545 are additionally disposed around the spectacles 541. Also, as shown in FIG. 11B, in a case where the integration result value of facial hair is high as the detected face attribute (in the case of being determined to be non-shaved, or the like), feature points are added to positions conceived as surroundings of the facial hair. For example, feature points 552 and 553 are additionally disposed around the facial hair 551. Note that, as shown in FIGS. 11A and 11B, other feature points may be moved around the spectacles or facial hair instead of feature points being added. In a case where the type and shape of spectacles, or the position and width of facial hair can be determined, the feature point coordinates may be switched according to these determination results.

Now, headwear has features, but is a frequently changeable attribute. Therefore, as shown in FIG. 11C, in a case where the integration result value of headwear is high as the detected face attribute (in the case of being determined to be with headwear, or the like), feature points included in a range conceived as equivalent to the position of the head are eliminated. For example, with the normalized face image 520 shown in FIG. 11C, feature points surrounded by a dotted line 562 are eliminated. Also, in a case where there are multiple attributes such as spectacles, facial hair, headwear, and so forth, the above-mentioned addition or elimination is carried out according to these. As shown in FIGS. 11A through 11C, feature points are added or eliminated based on the determination results of the face attributes, whereby optimal feature point settings can be performed as to the face serving as a similarity calculation target, and further, feature points can be calculated with further high precision. Thus, individual identifying precision can be further improved.

The calculation of these feature point coordinates is carried out by computation such as enlargement or reduction or the like based on the determination results of the face attributes with the feature point coordinate table 500 held in the feature point coordinate table holding unit 341 as default values, and with the coordinates of the default values as a reference. Also, feature point coordinates may be loaded directly from the CPU 110. Also, both may be combined. Also, multiple feature point coordinate tables corresponding to the determination results of the face attributes are held in the feature point coordinate table holding unit 341 beforehand, a feature point coordinate table may be selected according to the determination results of the face attributes. Also, calculation such as enlargement or reduction or the like of the position of the feature point coordinates may be performed according to the size of the integration result value.

Next, description will be made in detail regarding extraction of the feature quantity at a feature point set to a normalized face image, with reference to the drawings. As shown in FIGS. 9A through 11C, after each feature point is set to the normalized face image generated by the normalizing unit 320, a feature quantity extracting process is carried out regarding each feature point. Note that with an embodiment of the present invention, an extracting method using the Gabor filter will be described as a feature quantity extracting method example.

Figure 12A:
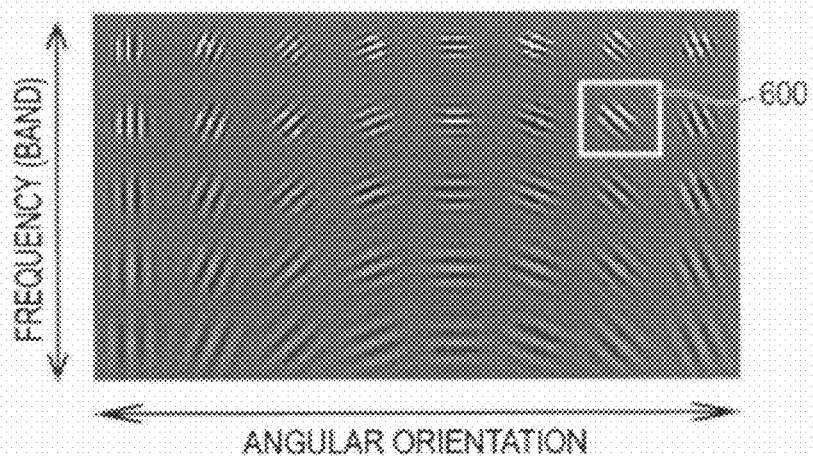
FIGS. 12A and 12B are diagrams illustrating an example of a graph that represents the Gabor filter used by a facial feature quantity extracting unit according to an embodiment of the present invention, and the coefficient of one filter of the Gabor filters.
Figure 12B:
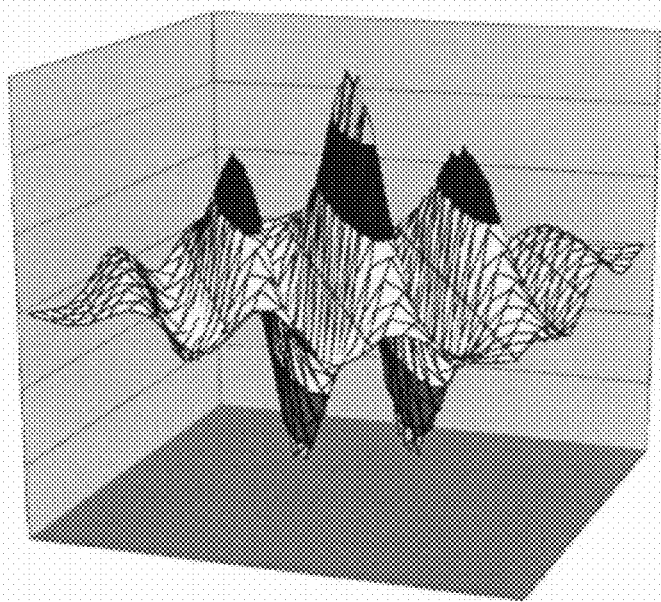

FIGS. 12A and 12B are diagrams illustrating an example of a graph that represents the Gabor filter used by the facial feature quantity extracting unit 350 according to an embodiment of the present invention, and the coefficient of one filter of the Gabor filters.

FIG. 12A illustrates an example of the Gabor filter used for extraction of the feature quantity at a feature point by the facial feature quantity extracting unit 350. With the Gabor filter, there are principally provided two parameters of a band to be extracted, and an angle on an image to which a filter is applied. With the Gabor filter shown in FIG. 12A, the horizontal direction represents the type of angle, and the vertical direction represents the type of band. With this example, the type of band is changed from a low frequency to a high frequency as the direction thereof advances from the bottom to the top. Also, the type of angle is rotated by 22.5 degrees. Specifically, the type of angle is set with an equal interval such as 0, 22.5, 45, 67.5, 90, 112.5, 135, and 157.5 degrees. Thus, with an embodiment of the present invention, description will be made, as an example, regarding 40 types of filters made up of five types of frequencies and eight types of angles serving as parameter settings so as to extract a feature quantity from faces having all kinds of attributes. Note that with an embodiment of the present invention, description will be made, as an example, regarding 40 types of filters serving as parameter settings with an average face as a target, the number of filters, or the like may be increased or decreased as appropriate. For example, angles are set further divided finely as the types of angles, whereby a high-precision feature quantity can be extracted. For example, in a case where 10 types are set as the types of angles, the angles can be set with an equal interval, such as 18, 36, 54, 72, . . . , 162 degrees. Also, in a case where 12 types are set as the types of angles, the angles can be set with an equal interval, such as 15, 30, 45, 60, . . . , 165 degrees. Here, in a case where angles are set divided finely as the types of angles, a data processed quantity increases according to increase in the types of angles. Therefore, the types of angles can be set while considering balance between the processing speed and the scale of the processing apparatus.

FIG. 12B illustrates a graph wherein the coefficient of one filter 600 of the 40 types of Gabor filters shown in FIG. 12A is represented on the three-dimensional space. The filter 600 is a filter which extracts a relatively high band as to the direction of 45 degrees on an image. Also, as shown in FIG. 12B, a Gaussian curve, where the amplitude at a feature point of the coefficient of the filter 600 peaks, serves as an envelope.

Figure 13:
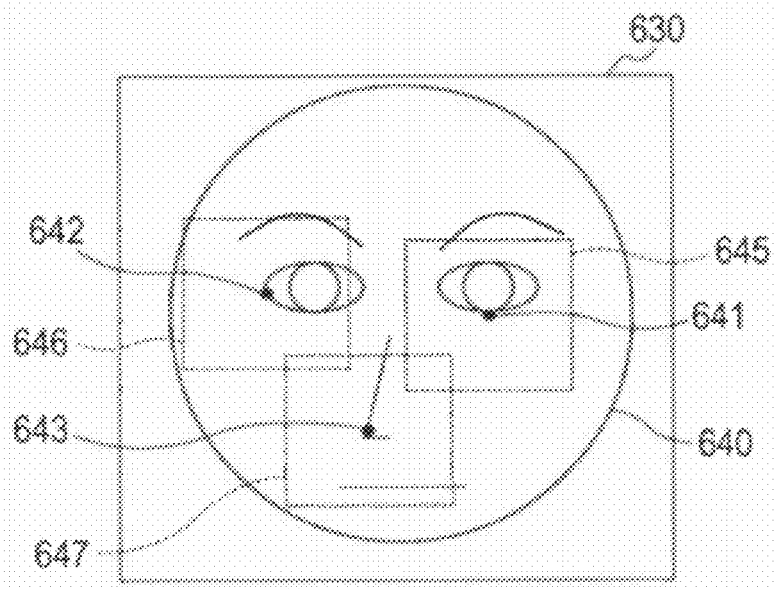
FIG. 13 is a diagram illustrating a normalized face image serving as an example of a normalized face image generated by the normalizing unit according to an embodiment of the present invention.

FIG. 13 is a diagram illustrating a normalized face image 630 serving as an example of a normalized face image generated by the normalizing unit 320 according to an embodiment of the present invention. Description will be made here regarding an example wherein, of multiple feature points set on a face 640 include in the normalized face image 630, the facial feature quantity extracting unit 350 uses three feature points 641 through 643 to extract feature quantities.

The feature points 641 through 643 are feature points set on the face 640 included in the normalized face image 630, and for example, the feature point 641 is disposed around below the left eye, the feature point 642 is disposed around the outer corner of the right eye, and the feature point 643 is disposed around the tip of the nose.

In a case where the Gabor filter is used to extract the feature quantity at a feature point, the pixel of the feature point, and adjacent pixels including pixels that exist around thereof, are used. For example, 20 pixels by 20 pixels with the feature point as the center may be used as the adjacent pixels. For example, let us say that the adjacent pixels of the feature points 641 through 643 set on the normalized face image 630 shown in FIG. 13 are indicated with a dotted-line square as adjacent pixels 645 through 647.

Subsequently, the adjacent pixels of the feature points, and each band coefficient and each angle coefficient included in the Gabor filter are used to execute computation of convolution shown in the following Expression 4. Thus, as a significant value used for identifying a specific person, a Gabor jet that is the feature quantity at a feature point is obtained. This computation of convolution is executed sequentially regarding each of the feature points, whereby the feature quantity (Gabor jet) at each feature point can be obtained.

$$c(x, y) = \sum_{y=n0}^{n} \sum_{x=m0}^{m} p(x, y) \cdot g(x, y)$$ Expression 4

Here, p(x, y) represents the luminance of an adjacent pixel, g(x, y) represents a Gabor filter coefficient, and c(x, y) represents the convolution result value.

Here, with an embodiment of the present invention, the facial feature quantity extracting unit 350 loads the default values of the parameters of the Gabor filter, and changes the default values of the parameters of the Gabor filter based on the determination results of the face attributes determined by the attribute determining unit 330. That is to say, the facial feature quantity extracting unit 350 switches the passage band and feature extracting angle that are the parameters of the Gabor filter based on the determination results of the face attributes determined by the attribute determining unit 330.

For example, as the determination results of the face attributes by the attribute determining unit 330, in the case of the integration result value of "child" or "baby" being high (in the case of being determined to be a "child" or "baby"), the parameter can be optimized by increasing the number of types of the low-frequency band filter. On the other hand, in the case of the integration result value of "adult" being high (in the case of being determined to be an "adult"), the parameter can be optimized by increasing the number of types of the high-frequency band filter. Now, in general, the face of "child" or "baby" frequently has smooth skin (skin gently gradienting in texture) as compared to "adult". Thus, in the case of the surface of a face being smooth skin, there is little change in the surface of the face. Therefore, in the case of extracting a feature quantity regarding the face of "child" or "baby", greater emphasis is placed upon a low-frequency band as compared to a high-frequency band, whereby a further high-precision feature quantity can be extracted. On the other hand, in the case of extracting a feature quantity regarding the face of "adult", greater emphasis is placed upon a high-frequency band as compared to a low-frequency band, whereby a further high-precision feature quantity can be extracted. Also, for example, in the case of the integration result value of a smiling face being high, switching to a Gabor filter band most suitable for a smiling face, or switching to a Gabor filter angle most suitable for a smiling face is carried out. Thus, a Gabor filter is changed based on the determination result of the face attribute, whereby the feature quantity at a further high-precision feature point can be extracted.

Note that the default values of the parameters of the Gabor filter may be held in the internal memory, or may be set from the CPU 110.

Figure 14:
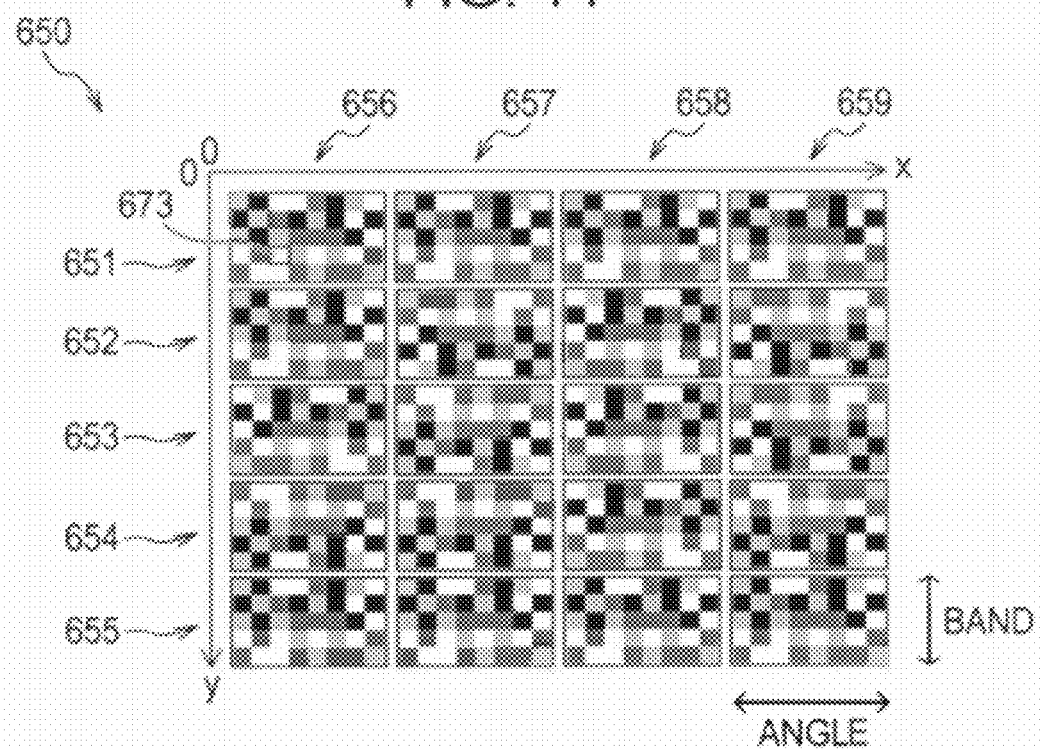
FIG. 14 is a diagram schematically illustrating facial feature quantities that are a group of feature quantities extracted by the facial feature quantity extracting unit according to an embodiment of the present invention.

FIG. 14 is a diagram schematically illustrating facial feature quantities that are a group of feature quantities extracted by the facial feature quantity extracting unit 350 according to an embodiment of the present invention. FIG. 14 schematically illustrates a facial feature quantity 650 that is a group of each feature quantity in the case of the feature quantity at a feature point set to a normalized face image being extracted using the Gabor filter shown in FIG. 12A.

The facial feature quantity 650 indicates a group of Gabor jets in the case of 20 feature points being set to the normalized face image, and in the case of the feature quantity at each feature point being extracted using the Gabor filter made up of 5 types of bands, and 8 types of angles. The facial feature quantity 650 indicates, for example, 20 Gabor jets extracted for each feature point in a manner of a matrix made up of rows 651 through 655 and columns 656 through 659. Also, the size of each feature quantity making up one Gabor jet is indicated with a monochrome level according to the size thereof. Note that the layout configuration of the Gabor jets shown in FIG. 14 is an example, and is nothing to do with a storage format. Also, calculation of similarity using a facial feature quantity will be described in detail with reference to FIG. 18.

FIG. 15 is a diagram schematically illustrating each piece of information stored in the specific individual information storage unit 380 according to an embodiment of the present invention. The specific individual information storage unit 380 stores each piece of specific individual information relating to a specific person's face. Specifically, a facial feature quantity relating to a specific person's face, face attribute information relating to the face thereof, a registered face image including the face thereof, associated information associated with these pieces of information are stored in a correlated manner. For example, smiling face/non-smiling face 382, male/female (sex) 383, adult/child (age) 384, opening/closing eyes 385, facial orientation 386, shaved/non-shaved 387, and spectacled/non-spectacled 388 are stored as face attribute information, and registered date and time 389, and registered place 390 are stored as associated information.

FIG. 15 exemplifies a case where specific individual information relating to three persons as specific persons are stored in the specific individual information storage unit 380. Also, let us say that three different pieces of specific individual information are stored as specific individual information relating to each specific person. For example, let us say that three sets of specific individual information relating to Mr. A are stored in identification number 381 "100" in a manner correlated with "101", "102", and "103", respectively. Similarly, let us say that three sets of specific individual information relating to Mr. B are stored in identification number 381 "200" in a manner correlated with "201", "202", and "203", respectively. Also, let us say that three sets of specific individual information relating to Mr. C are stored in identification number 381 "300" in a manner correlated with "301", "302", and "303", respectively.

For example, the integration result value calculated by the attribute determining unit 330 is stored as the face attribute information such as the smiling face/non-smiling face 382, male/female (sex) 383, or the like. Each face attribute can be determined by this integration result value. In FIG. 15, below each integration result value, the face attribute determined by the integration result value thereof is indicated within parentheses. Note that numeric values that indicate the facial orientation, and face likeness output from the face detecting unit 200 may be stored as face attribute information.

Date and time at the time of specific individual information being stored is stored in the registered date and time 389. This date and time is stored based on, for example, the date and time information output from the CPU 110. Also, a place at the time of specific individual information being stored is stored in the registered place 390. With regard to this place, a place (e.g., in terms of municipalities) is determined by the CPU 110 based on the position information calculated by the GPS signal processing unit 195, and this determined place is stored.

A facial feature quantity that is a group of Gabor jets extracted regarding a normalized face image is stored in the facial feature quantity 391. In FIG. 15, the face feature quantity stored in the facial feature quantity 391 is omitted.

The image data (compressed or decompressed) of a normalized face image at the time of specific individual information being stored is stored in the registered face image 392. In FIG. 15, the image data of a normalized face image stored in the registered face image 392 is figured and illustrated as a face image. Note that a normalized face image stored in the registered face image 392 can be displayed on the display unit 150, for example, by instruction operations from the user. Thus, the user can confirm a registered face as appropriate.

Thus, a different plurality of specific individual information is stored regarding one specific person, whereby individual identifying can be performed suitably even in a case where an imaging state, and a facial expression is changed. For example, in a case where from an imaged image including smiling Mr. A Mr. A's face is identified, of the three sets of specific individual information relating to Mr. A, similarity can be calculated using the identification number 381 "102". Also, for example, in a case where from an imaged image including ordinary Mr. A Mr. A's face is identified, of the three sets of specific individual information relating to Mr. A, similarity can be calculated using the identification number 381 "101". Further, for example, in a case where from an imaged image including leftward Mr. A Mr. A's face is identified, of the three sets of specific individual information relating to Mr. A, similarity can be calculated using the identification number 381 "103". Thus, the three sets of specific individual information are stored regarding Mr. A, Mr. A's face can be identified appropriately even in a case where an imaging state or a facial expression has changed. Note that with this example, an example is illustrated wherein three sets of specific individual information are stored regarding one specific person, but one, two, or four sets or more of specific individual information may be stored regarding one specific person. Alternatively, the number of specific individual information may be changed for each specific person by manual settings or the like. Further, the number of the specific individual information may be changed according to storage capacity as appropriate. Note that the registration method of the specific individual information as to the specific individual information storage unit 380 will be described in detail with reference to FIGS. 23, 25A, and 25B.

FIG. 16 is a diagram schematically illustrating a similarity calculating dictionary held at the similarity calculation reference data holding unit 361 according to an embodiment of the present invention. The similarity calculation reference data holding unit 361 is internal memory that holds the limited number of most appropriate similarity calculating dictionary in the case of calculating similarity between facial feature quantities. For example, a common dictionary 701, a child-oriented dictionary 702, an adult-oriented dictionary 703, a closed-eyes-oriented dictionary 704, and an opened-eyes-oriented dictionary 705 are held in the similarity calculation reference data holding unit 361. Also, for example, a rightward dictionary 706, a frontal dictionary 707, a leftward dictionary 708, a facial-hair-oriented dictionary 709, and a spectacles-oriented dictionary 710 are held in the similarity calculation reference data holding unit 361. The common dictionary 701 is a dictionary that averages ages and sexes to hold reference data alone most suitable for a common face.

On the other hand, the child-oriented dictionary 702 through the spectacles-oriented dictionary 710 are dictionaries that have been learned in a manner restricted to a predetermined face attribute, and hold reference data most suitable for the face corresponding to a predetermined face attribute.

FIG. 17 is a diagram illustrating a configuration example of the similarity calculating dictionary used at the time of calculating the similarity of the face to be determined by the similarity calculating unit 360 according to an embodiment of the present invention. FIG. 17 exemplifies a case where the Gabor jet extracted from each feature point set to a normalized face image is used to calculate the similarity of the face to be determined. Also, with an embodiment of the present invention, an example will be described wherein, similar to the face attribute determination, the correlative determining method according to difference is used to calculate the similarity of a face.

Similarity calculation reference data making up the similarity calculating dictionary 660 is made up of the coordinates 0(x, y) 661 and coordinates 1(x, y) 662 of a facial feature quantity, the threshold (θ) 663 of the level difference between the coordinates 0 and 1, and the weight (α) 664 of reference data. The coordinates 0(x, y) 661 and coordinates 1(x, y) 662 of a facial feature quantity are coordinates that indicate the positions of two points with the facial feature quantity. The threshold (θ) 663 of the level difference between the coordinates 0 and coordinates 1 is a threshold as to the difference value of the facial feature quantities of the coordinates 0 and 1. The weight (α) 664 of reference data is a weight coefficient to be added based on the comparison results between the difference value of the facial feature quantities of the coordinates 0 and 1, and the threshold (θ) 663 of the level difference between the coordinates 0 and coordinates 1. Also, the similarity calculating dictionary 660 stores n pieces of reference data made up of a combination of such values. Note that another position information may be used instead of the coordinates of the facial feature quantities that indicate the two points with the facial feature quantities. For example, an arrangement may be made wherein an identification number is given to each Gabor jet beforehand, the identification number of each Gabor jet, the band type and angle type of the Gabor jet thereof are used as position information.

Next, description will be made in detail regarding an example wherein the similarity calculating dictionary is used to calculate the similarity of the face to be determined, with reference to the drawings.

Figure 18:
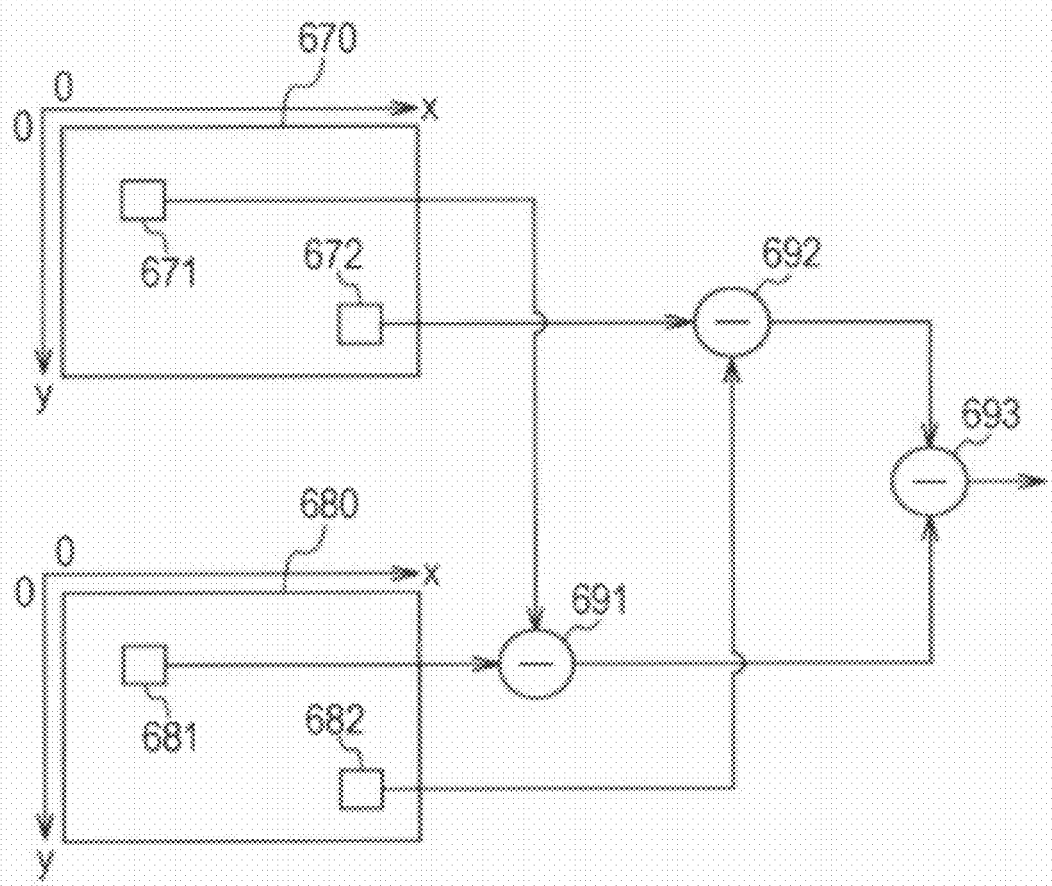
FIG. 18 is a diagram schematically illustrating a similarity calculating method used by the similarity calculating unit according to an embodiment of the present invention to calculate the similarity of the face to be determined.

FIG. 18 is a diagram schematically illustrating a similarity calculating method used by the similarity calculating unit 360 according to an embodiment of the present invention to calculate the similarity of the face to be determined. FIG. 18 exemplifies the calculating method wherein the Gabor jet extracted from each feature point set to a normalized face image is used to calculate the similarity of the face to be determined.

A facial feature quantity 670 to be determined is a facial feature quantity made up of multiple Gabor jets extracted from each feature point set to a normalized face image. Also, a registered facial feature quantity 680 is a facial feature quantity made up of multiple Gabor jets relating to a specific person's face stored in the specific individual information storage unit 380. The facial feature quantity 670 to be determined, and the registered facial feature quantity 680 correspond to, for example, the facial feature quantity 650 shown in FIG. 14, and let us say that the facial feature quantity 670 to be determined, and the registered facial feature quantity 680 have the same format, and also store the same number of Gabor jets.

With this example, description will be made regarding a case where, with the upper left corners of the facial feature quantity 670 to be determined, and the registered facial feature quantity 680 as the origin, with the horizontal axis as the x axis, and with the vertical axis as the y axis, the similarity calculating dictionary 660 is used to calculate the similarity between the facial feature quantity 670 to be determined, and the registered facial feature quantity 680.

For example, let us say that the position of the facial feature quantity 670 to be determined corresponding to the value of the coordinates 0(x, y) 661 stored in the first row (reference data 0) of the similarity calculating dictionary 660 is taken as a position 671, and the position of the registered facial feature quantity 680 corresponding to the value of the coordinates 0(x, y) 661 is taken as a position 681. Also, let us say that the position of the facial feature quantity 670 to be determined corresponding to the value of the coordinates 1(x, y) 662 is taken as a position 672, and the position of the registered facial feature quantity 680 corresponding to the value of the coordinates 1(x, y) 662 is taken as a position 682. Note that with the facial feature quantity 670 to be determined, and the registered facial feature quantity 680, the positions corresponding to the coordinates 0(x, y) 661 and the coordinates 1(x, y) 662 are the position of one feature quantity of feature quantities making up one Gabor jet. The position of this feature quantity is the position of one feature quantity (square indicated with a monochrome level) 673 of one Gabor jet (Gabor jet disposed at the upper left corner) corresponding to the row 651 and column 656 of the facial feature quantity 650 shown in FIG. 14.

First, the value of the score S1 used for calculating similarity is set to zero, and calculation using each value included in the reference data 0 of the similarity calculating dictionary 660 is carried out. Specifically, the value A0(0) of the feature quantity at the position 671 of the facial feature quantity 670 to be determined corresponding to the value of the coordinates 0(x, y) 661 included in the reference data 0 of the similarity calculating dictionary 660, and the value B0(0) of the feature quantity at the position 681 of the registered feature quantity 680, are taken out. Subsequently, the following expression is used to calculate the absolute value C0(0) of the difference between the taken-out feature quantity values (691).

$$C0(0)=|A0(0)-B0(0)|$$

Subsequently, the value A1(0) of the feature quantity at the position 672 of the facial feature quantity 670 to be determined corresponding to the value of the coordinates 1(x, y) 662 included in the reference data 0 of the similarity calculating dictionary 660, and the value B1(0) of the feature quantity at the position 682 of the registered feature quantity 680, are taken out. Subsequently, the following expression is used to calculate the absolute value C1(0) of the difference between the taken-out feature quantity values (692).

$$C1(0)=|A1(0)-B1(0)|$$

Subsequently, the next expression is used to calculate the absolute value C2(0) of the difference between the calculated absolute value C0(0) and the calculated absolute value C1(0) (693).

$$C2(0)=|C0(0)-C1(0)|$$

Subsequently, the calculated absolute value C2(0), and the threshold (θ) 663 included in the reference data 0 of the similarity calculating dictionary 660 are compared to determine whether or not the calculated absolute value C2(0) is greater than the value of the threshold (θ) 663. In the case of the calculated absolute value C2(0) being equal to or smaller than the value of the threshold (θ) 663, the value of the weight (α) 664 included in the reference data 0 of the similarity calculating dictionary 660 is added to the score S1. On the other hand, in the case of the calculated absolute value C2(0) being greater than the value of the threshold (θ) 663, the value of the weight (α) 664 included in the reference data 0 of the similarity calculating dictionary 660 is not added to the score S1.

Subsequently, the above-mentioned calculations are repeated using each value of the reference data 1 through the reference data n-1 sequentially. That is to say, in the case of executing the similarity calculating process using the similarity calculating dictionary 660 regarding the facial feature quantity 670 to be determined, and the registered facial feature quantity 680, each value included in the reference data 0 through n-1 of the similarity calculating dictionary 660 is used sequentially. Next, Expressions 5 through 7 are used to calculate C2(i), and determination is made whether or not the calculated C2(i) satisfies Expression 8. Here, variable i is an integer, and indicates the value of 0 through n-1.

$$C0(i) = |A0(i) - B0(i)| \qquad \text{Expression 5}$$

$$C1(i) = |A1(i) - B1(i)| \qquad \text{Expression 6}$$

$$C2(i) = |C0(i) - C1(i)| \qquad \text{Expression 7}$$

$$C2(i) > \theta(i) \qquad \text{Expression 8}$$

In the case of the calculated C2(i) satisfying Expression 8, the value of α(i) is not added to the score S1, and in the case of the calculated C2(i) dissatisfying Expression 8, the value of α(i) is added to the score S1. Here, the feature quantity of the facial feature quantity 670 to be determined corresponding to the coordinates 0(x, y) 661 included in the reference data i is represented with A0(i), and the feature quantity of the registered facial feature quantity 680 is represented with B0(i). Also, the feature quantity of the facial feature quantity 670 to be determined corresponding to the coordinates 1(x, y) 662 included in the reference data i is represented with A1(i), and the feature quantity of the registered facial feature quantity 680 is represented with B1(i). Also, the value of the threshold (θ) 663 included in the reference data i is represented with θ(i), and the value of the weight (α) 664 included in the reference data i is represented with α(i).

Subsequently, following each calculation using each value included in the reference data n-1 of the similarity calculating dictionary 660 being completed, the value of the score that is the integration result value is output as a value indicating similarity. Thus, similarity is calculated over two stages between the registered facial feature quantity held in a Gabor jet state and the facial feature quantity to be determined.

Here, score $S1_n(P)$ following each calculation using each value included in the reference data 0 through n-1 of the similarity calculating dictionary 660 can be represented with the following Expression 9.

$$S1_n(P) = \sum_{i=0}^{n-1} \alpha_i \cdot h(\|P_0(x_{i0}, y_{i0}) - P_1(x_{i0}, y_{i0})\| - \|P_0(x_{i1}, y_{i1}) - P_1(x_{i1}, y_{i1})\| - \theta_i) \qquad \text{Expression 9}$$

Here, $S1_n(P)$ represents the integration result values of the reference data 0 through n-1, and $\alpha_i$ represents the value of the weight (α) 664 included in the reference data i. Also, $P_0(x_{i0}, y_{i0})$ represents the value of the feature quantity of the facial feature quantity 670 to be determined corresponding to the coordinates 0(x, y) 661 included in the reference data i. Also, $P_1(x_{i0}, y_{i0})$ represents the value of the feature quantity of the registered facial feature quantity 680 corresponding to the coordinates 0(x, y) 661 included in the reference data i. Also, $P_0(x_{i1}, y_{i1})$ represents the value of the feature quantity of the facial feature quantity 670 to be determined corresponding to the coordinates 1(x, y) 662 included in the reference data i. Also, $P_1(x_{i1}, y_{i1})$ represents the value of the feature quantity of the registered facial feature quantity 680 corresponding to the coordinates 1(x, y) 662 included in the reference data i, $\theta_i$ represents the value of the threshold (θ) 663 included in the reference data i, and n represents the number of reference data. Also, h(z) represents a function that becomes 0 in the case of z>0, and becomes 1 in the case of z<0.

Note that optimization may be realized by changing the value of the weight (α) 664 or the value of the threshold (θ) 663 based on the determination result of the face attribute, or the integration result value of the face attribute. For example, the value of the weight (α) 664 or the value of the threshold (θ) 663 may be multiplied by the value corresponding to the determination result of the face attribute, or the integration result value of the face attribute.

Next, description will be made in detail regarding the similarity calculating dictionary used in the case of calculating the similarity of the face to be determined, with reference to the drawings.

Figure 19:
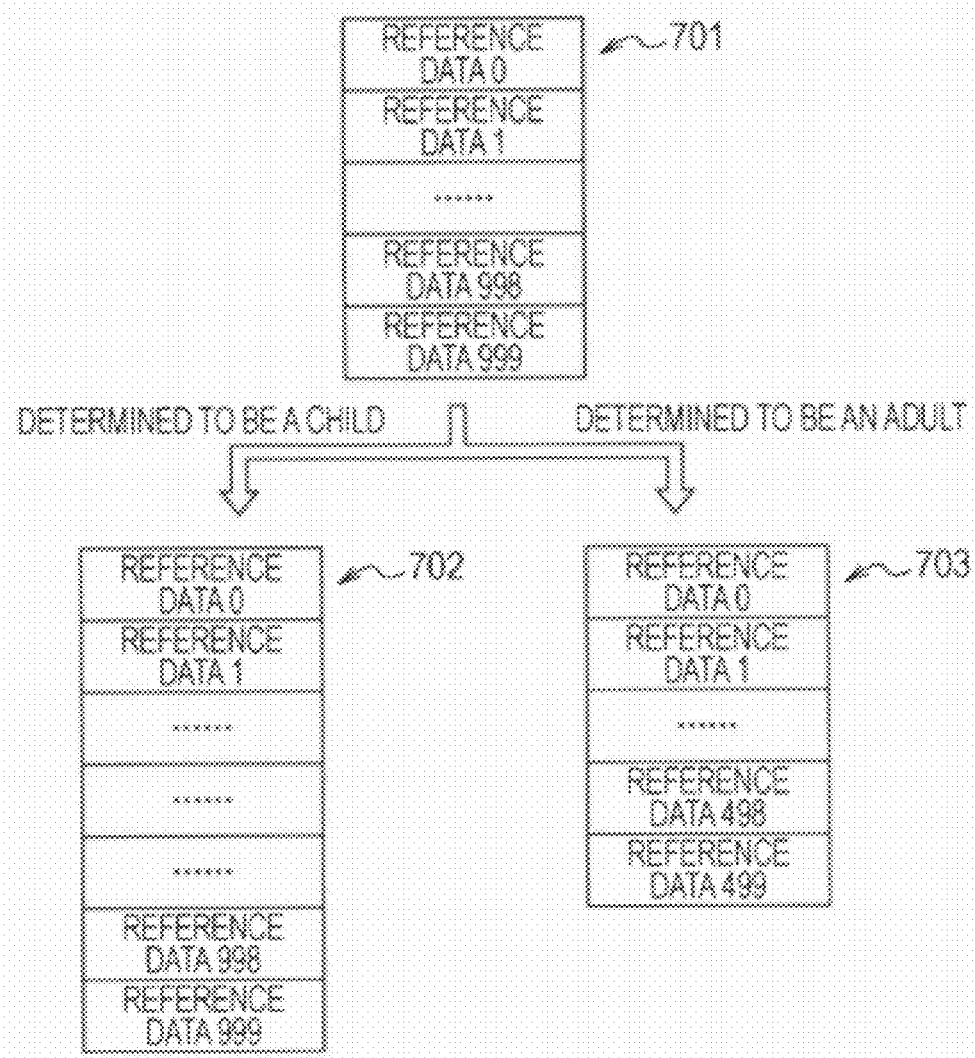
FIG. 19 is a diagram illustrating an example of the similarity calculating dictionary used for calculation of the similarity of the face to be determined by the similarity calculating unit according to an embodiment of the present invention.

FIG. 19 is a diagram illustrating an example of the similarity calculating dictionary used for calculation of the similarity of the face to be determined by the similarity calculating unit 360 according to an embodiment of the present invention. With this example, the similarity calculating dictionary is selected according to the determination result of the face attribute relating to age.

For example, as shown in FIG. 19, first, the common dictionary 701 is used regardless of the determination result of the face attribute. The common dictionary 701 is a similarity calculating dictionary made up of 1000 sets of similarity calculation reference data suitable for common similarity calculation. Following the similarity calculating process using the common dictionary 701 being completed, the similarity calculating process is carried out using the child-oriented dictionary 702 or adult-oriented dictionary 703 according to whether the determination result of the face attribute relating to age is an adult or child. The child-oriented dictionary 702 is a similarity calculating dictionary made up of 1000 sets of similarity calculation reference data suitable for common similarity calculation. Also, the adult-oriented dictionary 703 is a similarity calculating dictionary made up of 500 sets of similarity calculation reference data suitable for adult similarity calculation. Here, in general, it has been thought that a child has few individual differences than an adult, and extraction of a feature quantity is difficult, and accordingly, 500 sets of similarity calculation reference data are used with the adult-oriented dictionary 703, but on the other hand, 1000 sets of similarity calculation reference data are used with the child-oriented dictionary 702. Thus, the number of sets of similarity calculation reference data is changed according to the difficulty of extraction of a feature quantity and held, whereby the similarity calculating process can be carried out using the most appropriate number of sets of the similarity calculation reference data most suitable for the face to be determined, and high-precision individual identifying can be realized.

Figure 20:
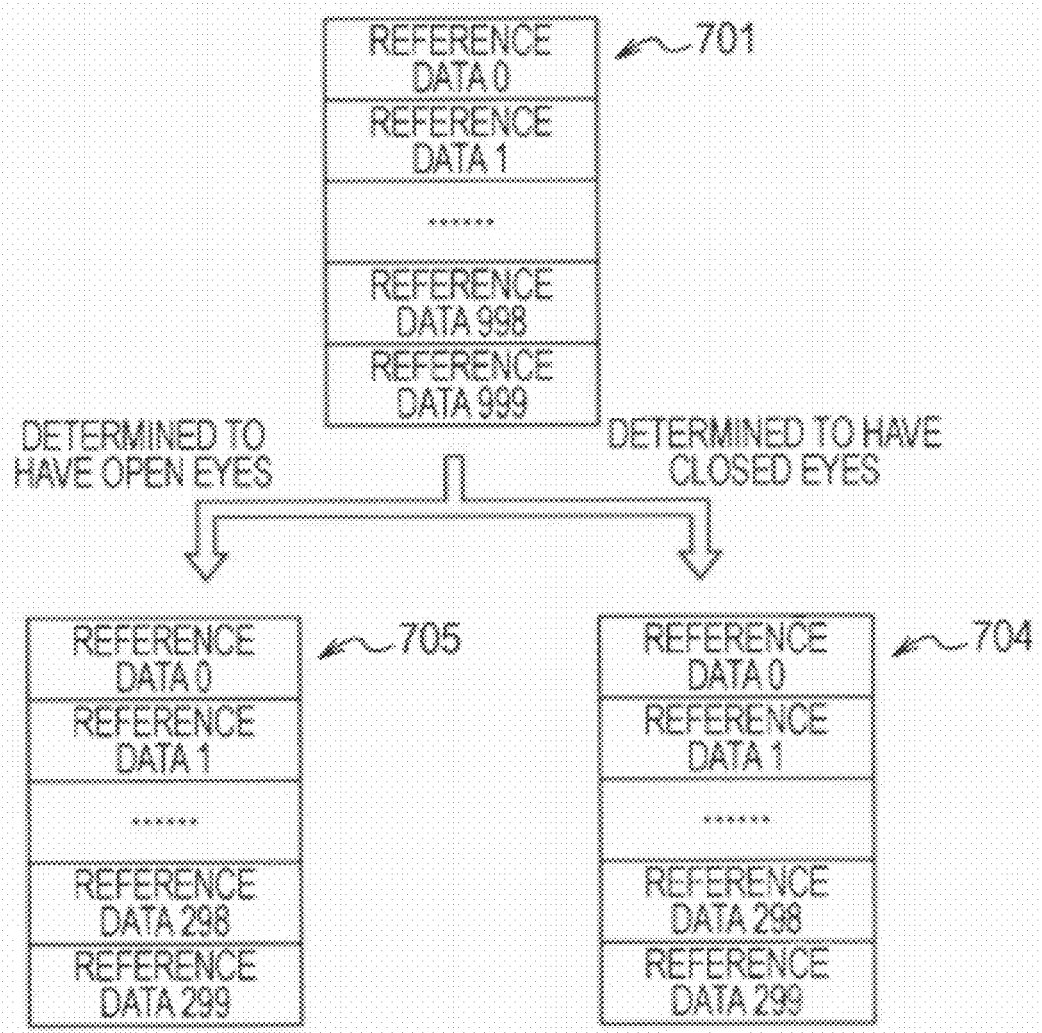
FIG. 20 is a diagram illustrating an example of the similarity calculating dictionary used for calculation of the similarity of the face to be determined by the similarity calculating unit according to an embodiment of the present invention.

FIG. 20 is a diagram illustrating an example of the similarity calculating dictionary used for calculation of the similarity of the face to be determined by the similarity calculating unit 360 according to an embodiment of the present invention. With this example, the similarity calculating dictionary is selected according to the determination result of the face attribute relating to opening/closing of eyes.

For example, as shown in FIG. 20, first, the common dictionary 701 is used regardless of the determination result of the face attribute. Subsequently, following the similarity calculating process using the common dictionary 701 being completed, the similarity calculating process is carried out using the opened-eyes-oriented dictionary 705 or closed-eyes-oriented dictionary 704 according to the determination result of the face attribute relating to closing/opening of eyes. The opened-eyes-oriented dictionary 705 is a similarity calculating dictionary made up of 300 sets of similarity calculation reference data suitable for facial similarity calculation in an opened-eyes state. Also, the closed-eyes-oriented dictionary 704 is a similarity calculating dictionary made up of 300 sets of similarity calculation reference data suitable for facial similarity calculation in a closed-eyes state.

Also, let us consider a case where similarity is calculated regarding a registered face (a registered person's face) of which the "opening" is determined by the integration result value of the opening/closing eyes 385 of the specific individual information storage unit 380. For example, in the case of the determination result of the face attribute relating to opening/closing of eyes regarding the face to be determined being "closing", following the similarity calculating process using the common dictionary 701 being completed, the similarity calculating process is carried out using the closed-eyes-oriented dictionary 704. In this case, for example, the weight of the similarity calculation reference data making up the closed-eyes-oriented dictionary 704 may be reduced. Alternatively, an arrangement may be made wherein, following the similarity calculating process using the common dictionary 701 being completed, the similarity calculating process is not carried out using the closed-eyes-oriented dictionary 704, and the process is quit. Thus, switching to the similarity calculation most suitable for the attribute of a registered face enables even more accurate similarity to be obtained.

Figure 21:
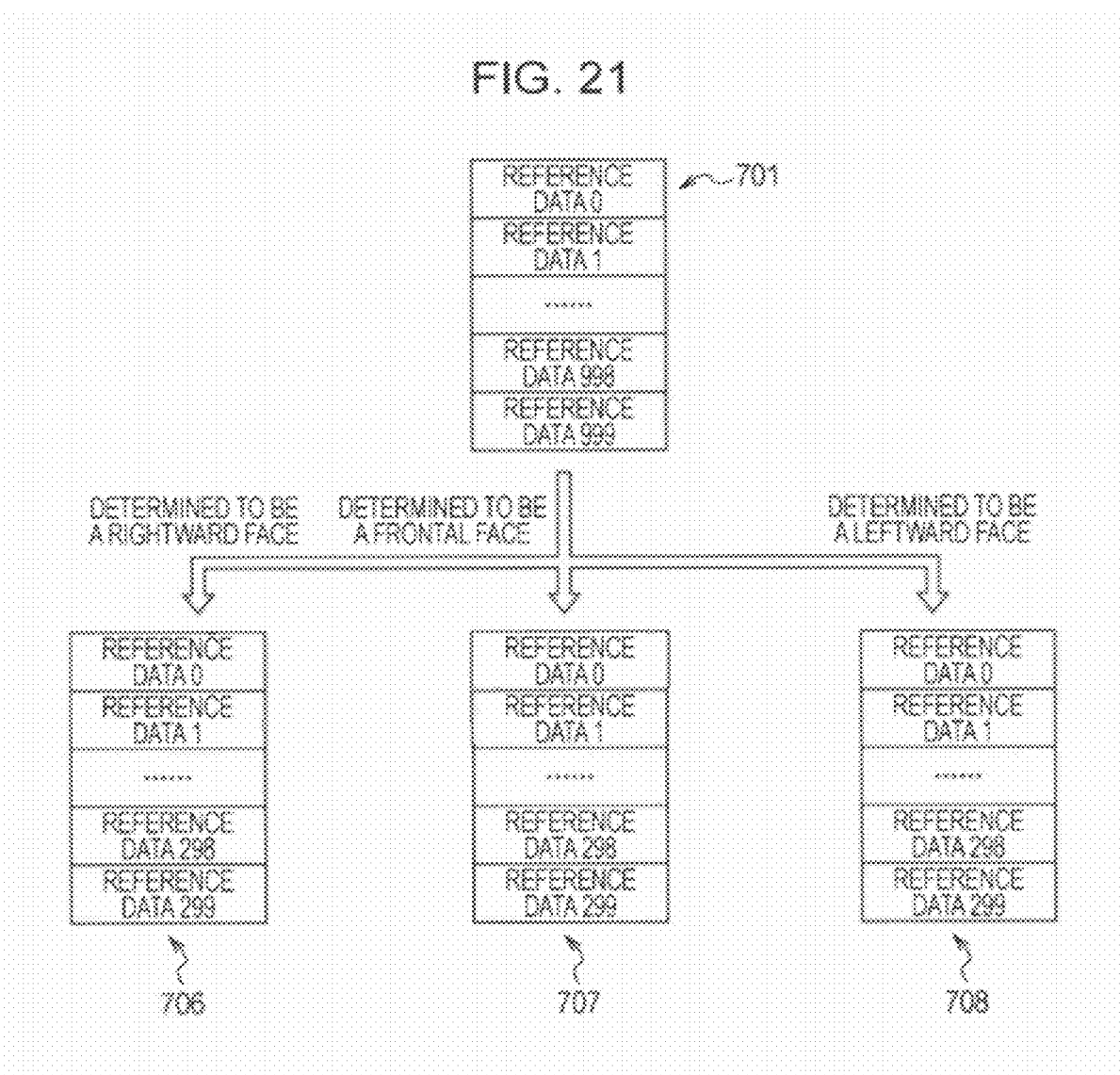
FIG. 21 is a diagram illustrating an example of the similarity calculating dictionary used for calculation of the similarity of the face to be determined by the similarity calculating unit according to an embodiment of the present invention.

FIG. 21 is a diagram illustrating an example of the similarity calculating dictionary used for calculation of the similarity of the face to be determined by the similarity calculating unit 360 according to an embodiment of the present invention. With this example, the similarity calculating dictionary is selected according to the determination result of the face attribute relating to facial orientation.

For example, as shown in FIG. 21, first, the common dictionary 701 is used regardless of the determination result of the face attribute. Subsequently, following the similarity calculating process using the common dictionary 701 being completed, the similarity calculating process is carried out using the rightward dictionary 706, frontal dictionary 707, or leftward dictionary 708 according to the determination result of the face attribute relating to facial orientation. The rightward dictionary 706 is a similarity calculating dictionary made up of 300 sets of similarity calculation reference data most suitable for facial similarity calculation in a rightward state. Also, the frontal dictionary 707 is a similarity calculating dictionary made up of 300 sets of similarity calculation reference data most suitable for facial similarity calculation in a frontal state. Also, the leftward dictionary 708 is a similarity calculating dictionary made up of 300 sets of similarity calculation reference data most suitable for facial similarity calculation in a leftward state. Thus, the similarity calculating dictionary is selected according to facial orientation, whereby the similarity calculating process can be executed with the most suitable weighting even in the event that a registered face and the face to be determined have not faced the same direction, and accordingly, even more accurate similarity can be obtained.

Figure 22:
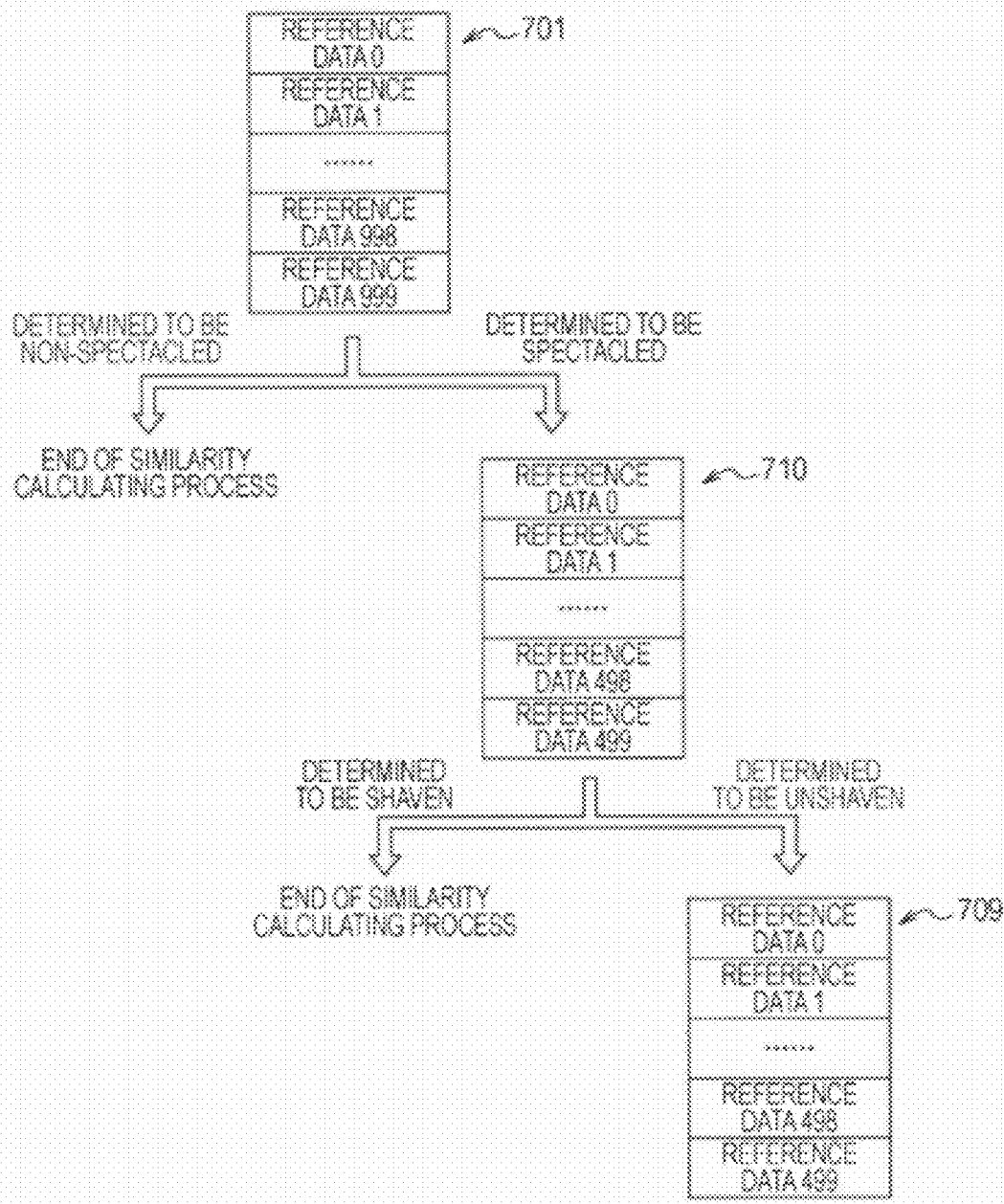
FIG. 22 is a diagram illustrating an example of the similarity calculating dictionary used for calculation of the similarity of the face to be determined by the similarity calculating unit according to an embodiment of the present invention.

FIG. 22 is a diagram illustrating an example of the similarity calculating dictionary used for calculation of the similarity of the face to be determined by the similarity calculating unit 360 according to an embodiment of the present invention. With this example, the similarity calculating dictionary is selected according to the determination results of the face attributes relating to spectacled/non-spectacled, and shaved/unshaved.

For example, as shown in FIG. 22, first, the common dictionary 701 is used regardless of the determination results of the face attributes. Subsequently, following the similarity calculating process using the common dictionary 701 being completed, selection is made whether the similarity calculating process is further carried out using the spectacles-oriented dictionary 710, or is ended according to the determination result of the face attribute relating to spectacled/non-spectacled. In this case, the similarity calculating process is further carried out using the spectacles-oriented dictionary 710 is selected, and following this similarity calculating process being completed, selection is made whether the similarity calculating process is further carried out using the facial-hair-oriented dictionary 709, or is ended according to the determination result of the face attribute relating to shaved/unshaved. The spectacles-oriented dictionary 710 is a similarity calculating dictionary made up of 500 sets of similarity calculation reference data most suitable for facial similarity calculation in a spectacled state. The facial-hair-oriented dictionary 709 is a similarity calculating dictionary made up of 500 sets of similarity calculation reference data most suitable for facial similarity calculation in an unshaved state. Thus, the similarity calculating dictionary is selected according to spectacled/non-spectacled and shaved/unshaved, whereby the similarity calculating process can be executed with the most suitable weighting according to spectacled/non-spectacled and shaved/unshaved, and accordingly, even more accurate similarity can be obtained.

Thus, the similarity calculating dictionary is selected according to the determination result of the face attribute, whereby the similarity calculating process most suitable for the face to be determined can be carried out, and accordingly, even more accurate similarity can be obtained. Also, the similarity calculating process using unnecessary similarity calculation reference data is not carried out regarding the face to be determined, and accordingly, reduction of processing time can be realized.

Also, of the face attributes, with regard to the face attributes such as hairstyle, spectacles, facial hair, and so forth, it is conceived that a factor changed depending on an imaging period and imaging place is high even with the same person. Therefore, with regard to such face attribute items, the weight of the corresponding similarity calculation reference data is set small, whereby the similarity of the same person can be prevented from being lost, according to the differences of the face attributes.

Also, the determination result of the face attribute of the face to be determined, and the face attribute stored in the specific individual information storage unit 380 are compared, and in the case of the similarity of the face attributes being clearly low, the similarity calculating process may be quit. Specifically, the similarity calculating unit 360 compares the determination result of the face attribute output from the attribute determining unit 330, and the face attribute stored in the specific individual information storage unit 380, and in the case of the similarity of the face attributes being clearly low, the similarity calculating unit 360 outputs information to the effect that the similarity calculating process is quit to the controller 310. Upon receiving this output, the controller 310 outputs an instruction to stop each process relating to the face to be determined to the feature point calculating unit 340, facial feature quantity extracting unit 350, and similarity calculating unit 360. For example, in the case of the face attributes stored in the specific individual information storage unit 380 indicating that the degree of a child is sufficiently high, in the case of the determination result of the face attribute of the face to be determined determining that the degree of a child is sufficiently low, both can be determined to be different persons. Therefore, the feature point coordinate calculating process, facial feature quantity extracting process, and similarity calculating process can be quit at an early stage. This can contribute to increase in processing speed.

Also, in a case where the number of specific individual information stored in the specific individual information storage unit 380 is great, there is a possibility that the processing time of the similarity calculating process is prolonged. Therefore, for example, a single or a plurality of specific individual information suitable for similarity calculation is selected from specific individual information stored in the specific individual information storage unit 380. The selected single or plurality of specific individual information alone can be regarded as a similarity calculation target. Thus, even in the case that there is a great amount of specific individual information, the similarity calculating process can be executed rapidly. Description will be made in detail below regarding a case where a single or a plurality of specific individual information suitable for similarity calculation is selected, and is subjected to the similarity calculating process, with reference to the drawings.

Figure 23:
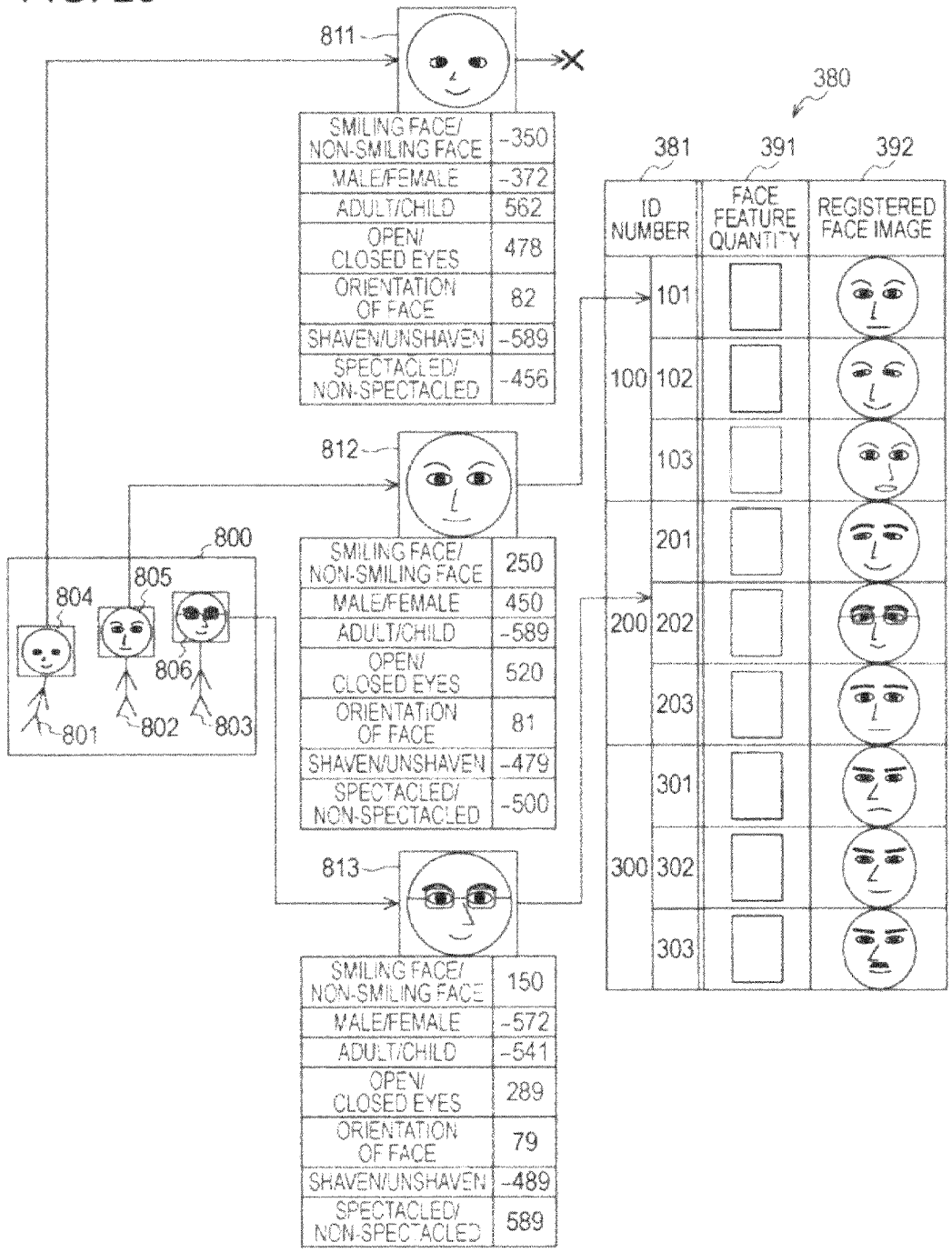
FIG. 23 is a diagram illustrating the overview of the similarity calculating method by the similarity calculating unit according to an embodiment of the present invention.

FIG. 23 is a diagram illustrating the overview of the similarity calculating method by the similarity calculating unit 360 according to an embodiment of the present invention. In FIG. 23, description will be made regarding a case where similarity calculation is carried out regarding the faces 804 through 806 of persons 801 through 803 included in an imaged image 800. Note that let us say that the person 801 is a child, and the persons 802 and 803 are adults. Also, the persons 801 and 803 are males, and the person 802 is a female. Also, let us say that the specific individual information storage unit 380 shown in FIG. 23 is the specific individual information storage unit 380 shown in FIG. 15 a portion of which has been omitted, and the omitted content is the same as the content shown in FIG. 15.

For example, faces 804 through 806 are detected from an imaged image 800 by the face detecting unit 200, normalized face images 811 through 813 are generated from these faces 804 through 806 by the normalizing unit 320. Each face attribute is determined by the attribute determining unit 330 regarding the generated normalized face images 811 through 813. In FIG. 23, a portion of the determination results output regarding the normalized face images 811 through 813 is shown in the lower portion of each normalized face image.

Subsequently, before calculating the similarity between the detected face and a registered face, the similarity calculating unit 360 compares the face attributes of the detected face and a registered face. For example, attributes having little change over time, such as sex, age (age group), or the like, are compared, and specific individual information having high similarity is selected. For example, a face included in the normalized face image 811 is a child's face, and accordingly, the value of "adult/child" (age score) is a high value. That is to say, the age score calculated regarding the face included in the normalized face image 811 is a value determined to be a child. However, each of the values stored in the adult/child (age) 384 of the specific individual information storage unit 380 is a low value, and all the values are determined to be an adult. Therefore, there is a low possibility that the normalized face image 811 is similar to the specific individual information recorded in the specific individual information storage unit 380, and accordingly, the similarity calculating process is not executed.

Also, a face included in the normalized face image 812 is an adult female's face, and accordingly, the value of "adult/child" (age score) is a low value, and the value of "male/female" (sex score) is a high value. That is to say, the age score calculated regarding the face included in the normalized face image 812 is a value determined to be an adult, and the sex score is a value determined to be a female. Therefore, the specific individual information is selected wherein the value of the adult/child (age) 384 of the specific individual information storage unit 380 is a value determined to be an adult. For example, as shown in FIG. 15, each piece of specific individual information correlated with "100" through "300" of identification number 381 is selected. Also, of these pieces of specific person information, the specific individual information wherein the value of the male/female (sex) 383 of the specific individual information 380 is a value determined to be a female, is selected. For example, as shown in FIG. 15, each piece of specific individual information correlated with "100" through "103" of the identification number 381 is selected.

Similarly, a face included in the normalized face image 813 is an adult male's face, and accordingly, the value of "adult/child" (age score) is a low value, and also the value of "male/female" (sex score) is a low value. That is to say, the age score calculated regarding the face included in the normalized face image 813 is a value determined to be an adult, and the sex score is a value determined to be a male. Therefore, the specific individual information is selected wherein the value of the adult/child (age) 384 of the specific individual information storage unit 380 is a value determined to be an adult. Also, of these pieces of specific person information, the specific individual information wherein the value of the male/female (sex) 383 of the specific individual information 380 is a value determined to be a male, is selected. For example, as shown in FIG. 15, each piece of specific individual information correlated with "200" and "300" of the identification number 381 is selected.

Thus, a face attribute having little change over time, such as sex, age, or the like, is used, whereby suitable specific individual information alone serving as a similarity calculation target can be selected. Also, suitable specific individual information serving as a similarity calculation target may be selected from the specific individual information thus selected using another face attribute. That is to say, a registered face having high similarity as to the detected face may be further selected.

For example, an arrangement may be made wherein the difference value between the integration result values calculated regarding the detected face, and the integration result value included in the specific individual information is calculated for each attribute in order, and the specific individual information whereby the difference value becomes the minimum is selected for each attribute. Alternatively, the specific individual information alone whereby the difference value is included in a certain range may be selected. Further, an arrangement may be made wherein the total of the difference values calculated for each attribute is obtained, and the specific individual information alone whereby the total value of the difference values becomes the minimum is selected.

Alternatively, an arrangement may be made wherein, of the integration result values calculated regarding the detected faces, the integration result value of which the absolute value is the maximum is extracted, the specific individual information whereby the difference value as to the extracted integration result value is the minimum is selected. In this case, for example, an attribute other than the attributes already used (e.g., the attributes of sex and age) is used. In FIG. 23, for example, of the integration result values calculated regarding the normalized face image 812, the integration result value of which the absolute value is the maximum (other than "male/female" and "adult/child") is opening/closing eyes "520". Therefore, the specific individual information (identification number 381 "101") whereby the difference value between the maximum integration result value "520 (opening/closing of eyes)", and the integration result value of the opening/closing eyes 385 of selected each piece of specific individual information (identification number 381 "101" through "103") becomes the minimum can be selected. Also, for example, of the integration result values calculated regarding the normalized face image 813, the integration result value of which the absolute value is the maximum is spectacled/non-spectacled "589". Therefore, the specific individual information (identification number 381 "202") whereby the difference value between the maximum integration result value "589 (spectacled/non-spectacled)", and the integration result value of the spectacled/non-spectacled 388 of each selected piece of specific result value (identification number 381 "200" and "300") becomes the minimum, can be selected. Note that an arrangement may be made wherein, of the integration result values calculated regarding a normalized face image, a predetermined number of integration result values of which the absolute value is great are used to select the specific individual information.

Thus, following the specific individual information serving as a similarity calculation target being narrowed down using the attribute determination result wherein the process has already been completed, the similarity calculating process can be executed. For example, with the example shown in FIG. 23, in the case of the similarity calculating unit 360 calculating similarity between the facial feature quantity calculated regarding the normalized face images 811 through 813, and all the facial feature quantities recorded in the specific individual information storage unit 380, 24 (3×8) kinds of calculations have to be executed. On the other hand, for example, in the case of the specific individual information whereby the difference value as to the integration result value of which the absolute value is the maximum becomes the minimum being selected, and similarity as to the facial feature quantity of this specific individual information being calculated, two kinds of calculation should be executed. Therefore, the number of combinations serving as calculation targets can be reduced substantially. Thus, constant updating of specific individual information can be realized.

Also, for example, weighting may be executed according to the value of similarity of the face attribute as to the detected face at the time of calculating similarity. For example, high weighting is applied to the specific individual information wherein the similarity of the face attribute as to the detected face is high. Thus, the precision of similarity calculation can be further improved.

Next, a still-image recording method will be described in detail wherein a recording operation of a still image including a smiling face is executed based on the integration result value calculated using the attribute determining dictionary, with reference to the drawings.

Figure 24A:
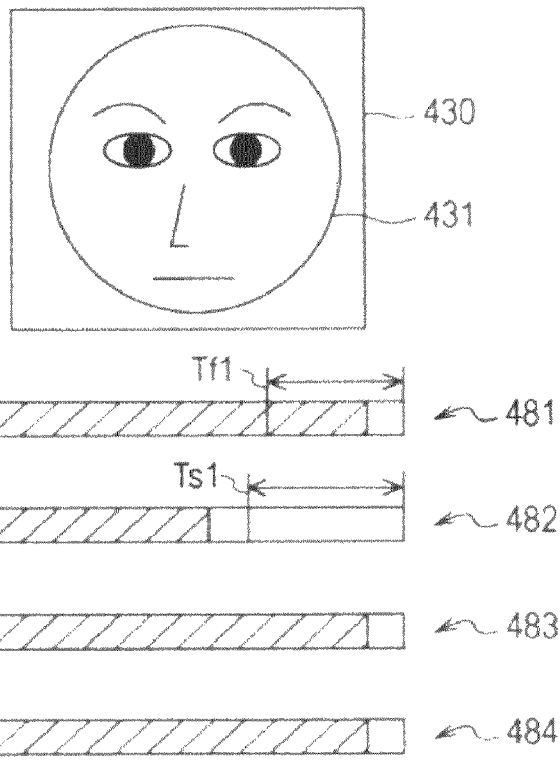
FIGS. 24A and 24B are diagrams schematically illustrating the relationship between the normalized face images generated by the normalizing unit according to an embodiment of the present invention, and the integration result values calculated by the attribute determining unit according to an embodiment of the present invention.
Figure 24B:
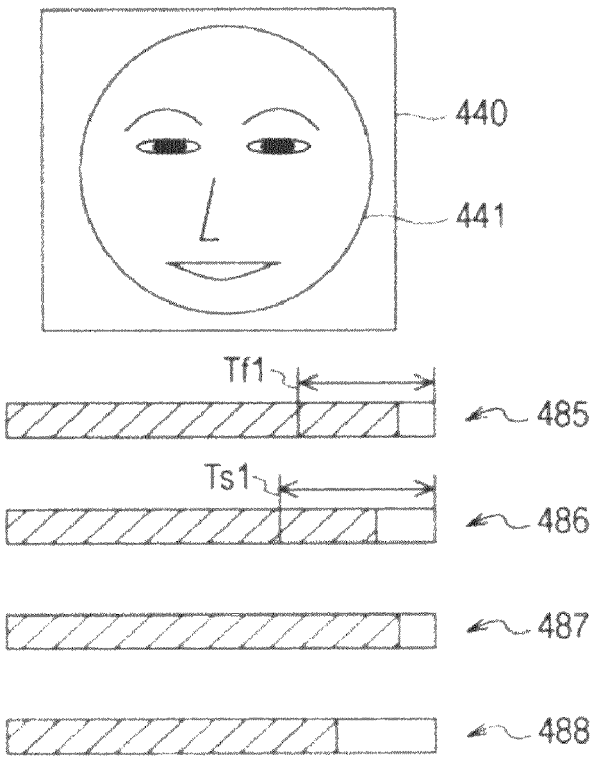

FIGS. 24A and 24B are diagrams schematically illustrating the relationship between the normalized face images generated by the normalizing unit 320 according to an embodiment of the present invention, and the integration result values calculated by the attribute determining unit 330 according to an embodiment of the present invention. Note that the normalized face image 430 shown in FIG. 24A is similar to the normalized face image 430 shown in FIG. 5A, and the normalized face image 440 shown in FIG. 24B is similar to the normalized face image 440 shown in FIG. 5B. Therefore, the same reference numerals are appended thereto, and detailed description thereof will be omitted.

FIG. 24A illustrates the integration result values calculated regarding the normalized face image 430, and FIG. 24B illustrates the integration result values calculated regarding the normalized face image 440. Note that, of rod-shaped ranges that indicate an integration result value, a range that indicates the calculated integration result value is indicated with hatched lines. Also, these rod-shaped ranges correspond to the integration result value ranges shown in FIGS. 7A through 7C.

In general, in the case of comparing a ordinary face (non-smiling face) and a smiling face, the smiling face score (the value of the smiling face/non-smiling face 382 shown in FIG. 15) is high in a smiling face as compared to an ordinary face. Therefore, the smiling face score 486 is higher than the smiling face score 482. Also, as described above, with a smiling face, a feature point, such that the eyes are narrowed, frequently occurs, and accordingly, the opened-eyes score (the value of the opening/closing of eyes shown in FIG. 15) is lower in a smiling face as compared to an ordinary face. Therefore, the opened-eyes score 488 is lower than the opened-eyes score 484. Note that all the faces included in the normalized face images 430 and 440 are directed frontally, and accordingly, the frontal scores (the value of the facial orientation 386 shown in FIG. 15) 483 and 487 become generally the same value. Also, all the faces included in the normalized face images 430 and 440 have been imaged rather finely, and accordingly, the face likeness scores 481 and 485 become generally the same value.

Now, with an embodiment of the present invention, an example will be described wherein a smiling face score and a face likeness score are used to carry out the recording operation of a still image including a smiling face. Also, with this example, let us say that the smiling face still image recording mode has been set. Specifically, in the case of the face likeness score calculated regarding a normalized face image exceeding a threshold Tf1, and also the smiling face score calculated with the normalized face image exceeding a threshold Ts1, the CPU 110 instructs starting of the recording operation of a still image. For example, in FIG. 24A, the face likeness score 481 exceeds the threshold Tf1, but the smiling face score 482 does not exceed the threshold Ts1. Therefore, in the case of the ordinary face shown in FIG. 24A having been detected, starting of the recording operation of a still image does not instructed. On the other hand, in FIG. 24B, the face likeness score 485 exceeds the threshold Tf1, and also the smiling face score 486 exceeds the threshold Ts1. Therefore, in the case of the smiling face 441 shown in FIG. 24B having been detected, starting of the recording operation of a still image is instructed.

Note that the recording operation of a still image including a smiling face may be executed using another score (face attribute information) other than the face likeness score. Also, for example, a case where determination is made that a specific person is included in an imaged image, and also determination is made that the face of this specific person is a smiling face may be taken as a condition. A determination reference in this case may differ from the determination reference at the time of registering specific individual information. For example, the determination reference of a specific person at the time of executing recording of a still image may be relaxed as compared to the determination reference at the time of registering specific individual information.

Next, a specific individual information registration method will be described in detail wherein specific individual information is registered based on the integration result value calculated using the attribute determining dictionary, with reference to the drawings.

Figure 25A:
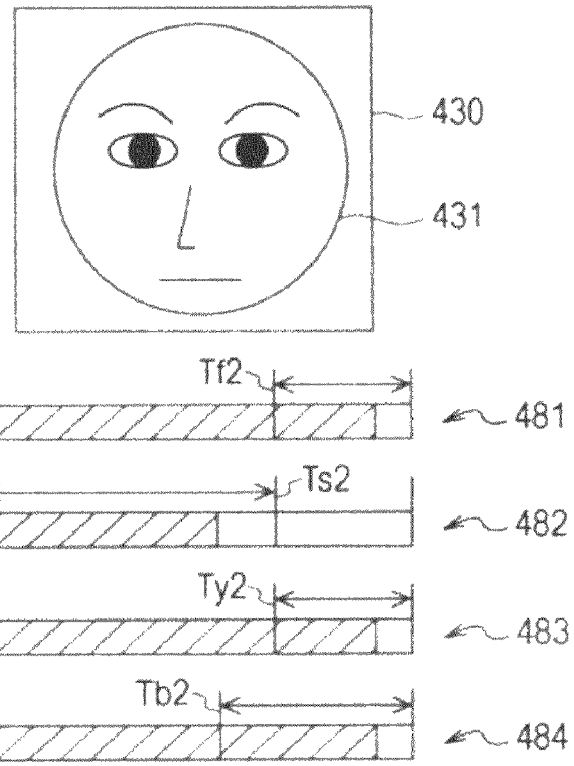
FIGS. 25A and 25B are diagrams schematically illustrating the relationship between the normalized face images generated by the normalizing unit according to an embodiment of the present invention, and the integration result values calculated by the attribute determining unit according to an embodiment of the present invention.
Figure 25B:
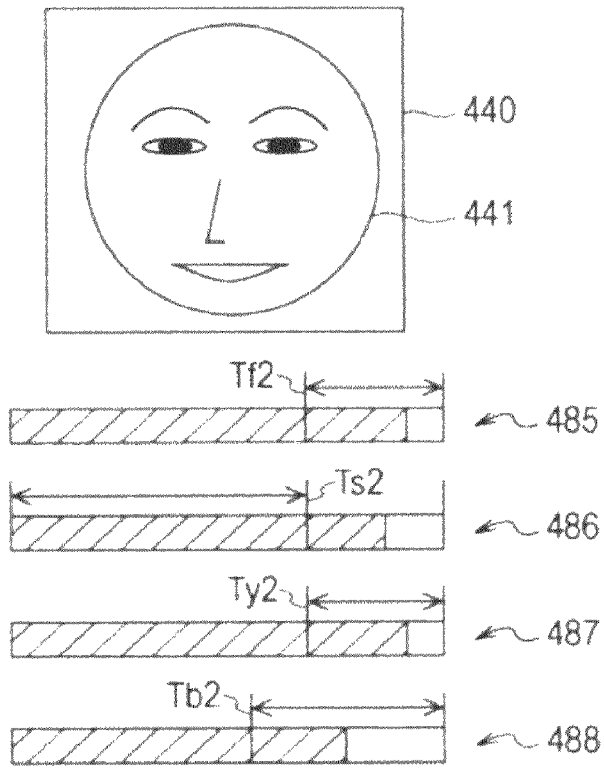

FIGS. 25A and 25B are diagrams schematically illustrating the relationship between the normalized face images generated by the normalizing unit 320 according to an embodiment of the present invention, and the integration result values calculated by the attribute determining unit 330 according to an embodiment of the present invention. Note that the normalized face images and the integration result values shown in FIGS. 25A and 25B are the same as those shown in FIGS. 24A and 24B, but only the thresholds differ. Therefore, the same portions as those in FIGS. 24A and 24B are denoted with the same reference numerals, and detailed description thereof will be omitted.

With this example, description will be made regarding a case where determination is made whether to update specific individual information using the face likeness score, smiling face score, frontal score, and opened-eyes score. Also, with this example, a case where the specific individual information automatic updating mode has been set will be described as an example. Specifically, the specific individual information registration unit 370 determines whether or not the similarity between the facial feature quantity input from the facial feature quantity extracting unit 350, and the facial feature quantity stored in the specific individual information storage unit 380 is extremely high based on the similarity output from the similarity calculating unit 360. For example, it can be taken as a condition that the similarity is equal to or greater than a certain value (e.g., greater value than similarity determination). Subsequently, in the case of determining that the similarity thereof is extremely high, the specific individual information registration unit 370 determines whether or not the registered date and time stored in a manner correlated with the specific individual information determined that the similarity is extremely high (the registered date and time 389 shown in FIG. 15) is date and time before a certain period of time or more. That is to say, determination is made whether or not a certain period of time has elapsed since the last registration or updating. As for this certain period of time, for example, one-year increments, one-month increments, one-day increments, or increments under one second (e.g., increments of several frames of an image) may be set. For example, in the case of longer time being set as a certain period of time, change over time of a specific person (aging or change in appearance) can be handled. Also, for example, in the case of shorter time being set as a certain period of time, a face suitable for the principal authentication of a specific person can be searched constantly periodically.

Subsequently, in the case of determining that a certain period of time has elapsed since the last registration or updating, the specific individual information registration unit 370 determines whether or not a condition for updating of the specific individual information is satisfied. This condition for updating of the specific individual information can be set, for example, such that the face likeness score, frontal score, and opened-eyes score exceed the thresholds Tf2, Ty2, and Tb2 respectively, and also the smiling face score is less than the threshold Ts2. Subsequently, in the case of determining that the condition for updating of the specific individual information is satisfied, the specific individual information registration unit 370 starts the updating operation of the specific individual information determined that the similarity is extremely high. That is to say, the specific individual information registration unit 370 overwrites each item of the specific individual information of the specific individual information storage unit 380 determined that the similarity is extremely high, with each piece of information to be compared. For example, the facial feature quantity 391 is overwritten with the facial feature quantity input from the facial feature quantity extracting unit 350, and the face attribute information such as the smiling face/non-smiling face 382 or the like is overwritten with each integration result value calculated by the attribute determining unit 330. Also, the registered face image 392 is overwritten with the normalized face image generated by the normalizing unit 320, the date and time at the time of this updating is recorded in the registered date and time 389, and the place determined with the position information calculated at the time of this updating is recorded in the registered place 390. Note that in the case of the storage region including a space region regarding the specific person to be updated, the specific individual information to be updated may be registered additionally. Also, in the case of there being multiple sets of specific individual information regarding the specific person to be updated, of these, one set of the specific individual information may be updated wherein each value of the face likeness score, smiling face score, frontal score, and opened-eyes score is the lowest as to the corresponding threshold. Alternatively, one set of the specific individual information may be updated wherein the registered date and time is the oldest.

Alternatively, for example, the specific individual information in which the same place as the current place (or the closest place of the current place) is stored may be updated with reference to the registered place 390 shown in FIG. 15. For example, it can be conceived that facial expressions differ greatly between the case of imaging operation being executed at the user's working place, and the case of imaging operation being executed around the user's home. Therefore, the updating process can be executed while taking such a psychological factor into consideration. Thus, for example, individual identifying precision can be improved in the case of imaging operation being executed at the user's working place, and the case of imaging operation being executed around the user's home. Thus, the updating process may be executed with reference to the associated information such as a registered place or the like.

Thus, in the case of updating (or additionally adding) the specific individual information, for example, determination is made whether or not the face to be determined is not close to an extreme smiling face but an ordinary face. In the case of determining that the face to be determined is close to an ordinary face, and is suitable for individual identifying, updating of the specific individual information thereof is executed. That is to say, there may be employed a condition different from the condition at the time of automatically recording the still image of a smiling face.

For example, in FIG. 25A, the face likeness score 481 exceeds the threshold Tf2, the frontal score 483 exceeds the threshold Ty2, the opened-eyes score 484 exceeds the threshold Tb2, and also the smiling face score 482 is less than the threshold Ts2. Therefore, the ordinary face 431 shown in FIG.

25A is detected, and in the case of the similarity calculated regarding the ordinary face 431 satisfying a certain condition, updating of the specific individual information is executed. On the other hand, in FIG. 25B, the face likeness score 485 exceeds the threshold Tf2, the frontal score 487 exceeds the threshold Ty2, and the opened-eyes score 488 exceeds the threshold Tb2, but the smiling face score 482 is not less than the threshold Ts2. Therefore, the smiling face 441 shown in FIG. 25B is detected, and even in the case of the similarity calculated regarding the smiling face 441 satisfying a certain condition, updating of the specific individual information is not executed.

Note that the thresholds shown in FIGS. 24A, 24B, 25A, and 25B are an example, and accordingly, the thresholds may be changed, for example, according to the user's preferences. Alternatively, another score (face attribute information) other than the face likeness score, smiling face score, frontal score, and opened-eyes score may be used to execute updating of the specific individual information. Alternatively, determination may be made whether to execute updating by comparing each value of multiple sets of specific individual information regarding a specific person to be updated, and each value of the face likeness score, smiling face score, frontal score, and opened-eyes score instead of determining whether to execute updating using each threshold.

Thus, the specific individual information can be updated automatically, and accordingly, the user does not have to instruct registration or updating manually. Also, the specific individual information can be updated automatically, whereby the newest and optimal specific individual information can be stored. Thus, individual identifying precision can be improved. Also, individual identifying precision can be further improved by executing the imaging operation repeatedly.

Next, the operation of the imaging apparatus 100 according to an embodiment of the present invention will be described with reference to the drawings.

Figure 26:
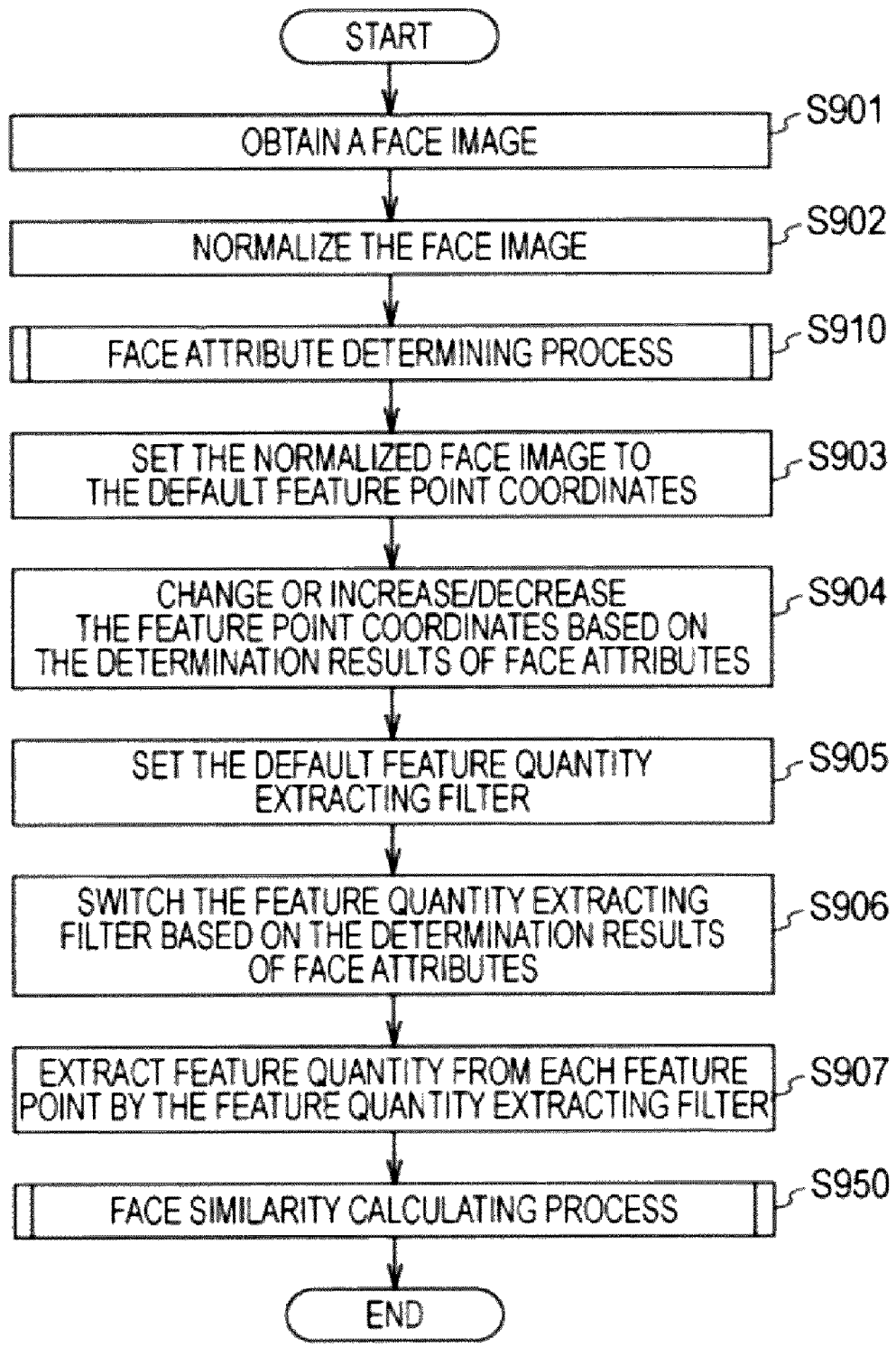
FIG. 26 is a flowchart illustrating the procedures of an individual identifying process by the imaging apparatus according to an embodiment of the present invention.

FIG. 26 is a flowchart illustrating the procedures of a individual identifying process by the imaging apparatus 100 according to an embodiment of the present invention. With this individual identifying process, the whole flow can roughly be classified into four processes of a face attribute determining process, a feature point coordinate calculating process, a facial feature quantity extracting process, and a similarity calculating process.

First, the individual identifying unit 300 obtains the face detection result output from the face detecting unit 200, and reads out a face image from an image stored in the image RAM 130 based on the coordinates and size of a face region included in this face detection result (step S901). Note that the individual identifying unit 300 may obtain the face detection result output from the face detecting unit 200 via the CPU 110.

Next, the normalizing unit 320 executes normalization by adjusting the readout face image such that the size of a face has a certain size, and both eyes are generally level (step S902). Subsequently, the attribute determining unit 330 executes the face attribute determining process regarding the normalized face image (step S910). This face attribute determining process will be described in detail with reference to FIGS. 27 and 28. Note that step S910 is an example of the attribute determining procedure referred to in the Summary of the Invention.

Next, the feature point calculating unit 340 loads the default values of the feature point coordinates included in the feature point coordinate table held in the feature point coordinate table holding unit 341, and disposes the default values of the feature point coordinates as the positions of feature points to be set to the normalized face image (step S903). Note that the feature point coordinates may be set from the CPU 110. Subsequently, the feature point calculating unit 340 changes or adjusts the feature point coordinates of the default values based on the determination results of the face attributes output from the attribute determining unit 330, thereby calculating feature point coordinates (step S904).

Next, the facial feature quantity extracting unit 350 loads the default values of parameters regarding the Gabor filter (step S905). Note that the parameters of the Gabor filter may be set from the CPU 110. Subsequently, the facial feature quantity extracting unit 350 changes the passage band and feature quantity extracting angle that are the parameters of the Gabor filter based on the determination results of the face attributes output from the attribute determining unit 330 (step S906). Subsequently, the facial feature quantity extracting unit 350 uses the Gabor filter to extract the feature quantity at each feature point calculated by the feature calculating unit 340 (step S907). Note that step S907 is an example of extracting referred to in the Summary of the Invention.

Next, the similarity calculating unit 360 executes the similarity calculating process (step S950). This similarity calculating process will be described in detail with reference to FIGS. 29 and 30. Note that step S950 is an example of calculating referred to in the Summary of the Invention.

Figure 27:
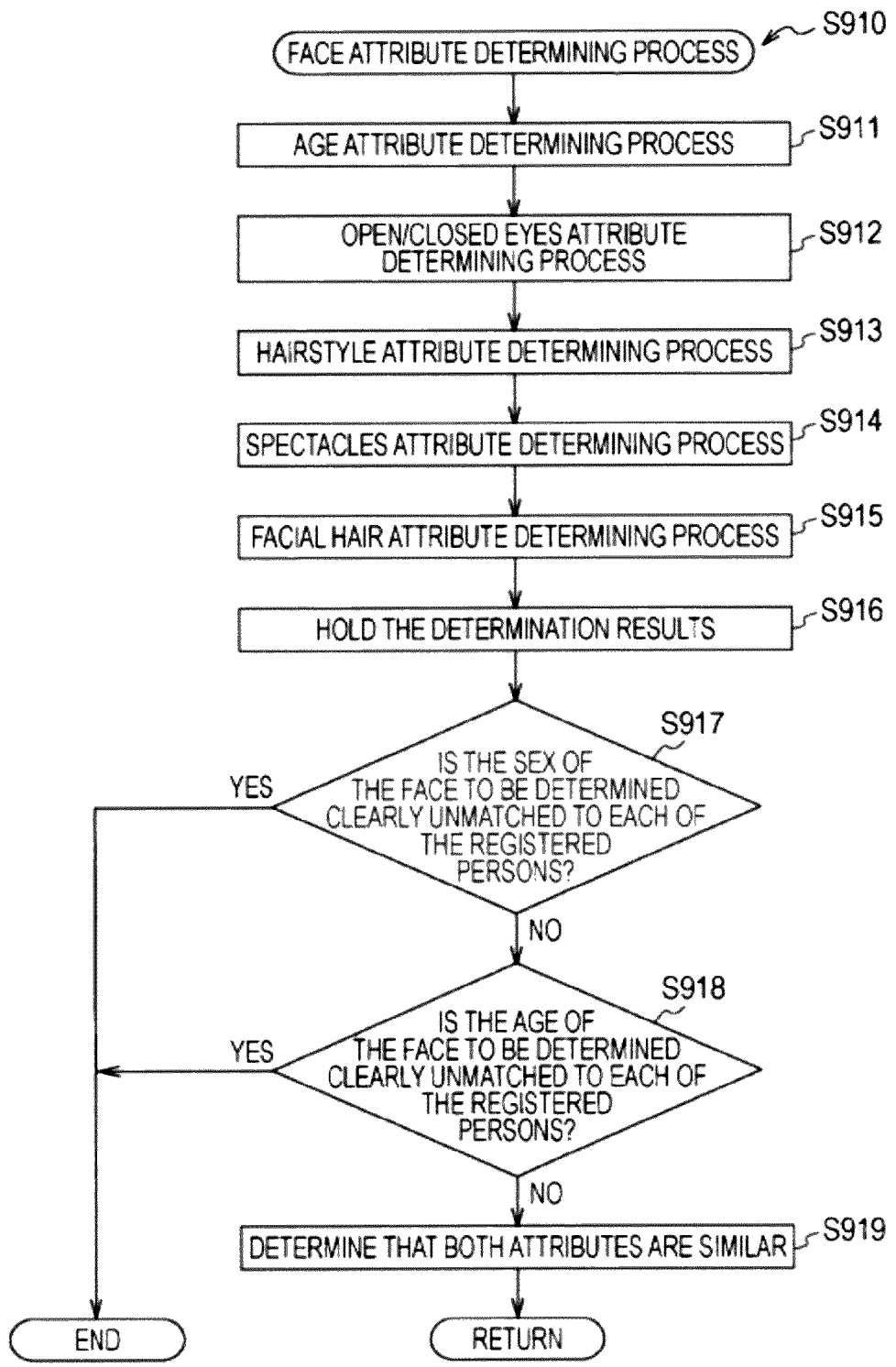
FIG. 27 is a flowchart illustrating a face attribute determining procedure of the procedures of the individual identifying process by the imaging apparatus according to an embodiment of the present invention.

FIG. 27 is a flowchart illustrating the face attribute determining procedure (procedure in step S910 shown in FIG. 26) of the procedures of the individual identifying process by the imaging apparatus 100 according to an embodiment of the present invention. Now, an example will be described wherein the face attributes relating to age, opening/closing of eyes, hairstyle, spectacled/non-spectacled, and shaved/unshaved are determined. Note that the determining process of each face attribute will be described in detail with reference to FIG. 28.

First, the attribute determining unit 330 executes the age attribute determining process using the age determining dictionary (step S911). Subsequently, the attribute determining unit 330 uses the opening/closing eyes determining dictionary to execute the opening/closing eyes attribute determining process using the opening/closing eyes determining dictionary (step S912). The attribute determining unit 330 uses the hairstyle determining dictionary to execute the hairstyle attribute determining process (step S913). The attribute determining unit 330 uses the spectacles determining dictionary to execute the spectacles attribute determining process (step S914). The attribute determining unit 330 uses the facial hair determining dictionary to execute the facial hair attribute determining process (step S915). Subsequently, the attribute determining unit 330 holds the determination results of these face attributes (step S916). Note that the determination results of these face attributes are also output to the CPU 110.

Next, the similarity of the face attribute is determined between the determination result of the face attribute of the face to be determined, and the determination result of each face attribute stored in the specific individual information storage unit 380 (steps S917 and S918). Specifically, determination is made whether or not the determination result of the face attribute relating to the sex of the face to be determined, and the determination result of each face attribute relating to sex stored in the specific individual information storage unit 380 clearly differ (step S917). Here, the case of the determination results of the face attribute relating to sex clearly differing means a case other than the case of being matched completely, and the case of being ambiguous. Also, determination is made whether or not the determination result of the face attribute relating to the age of the face to be determined, and the determination result of each face attribute relating to age stored in the specific individual information storage unit 380 clearly differ (step S918).

In the case of the determination results of the face attribute relating to sex clearly differing (step S917), or in the case of the determination results of the face attribute relating to age clearly differing (step S918), the operation of the individual identifying process is ended. On the other hand, in the case that the determination results of the face attribute relating to sex do not clearly differ (step S917), or in the case that the determination results of the face attribute relating to age do not clearly differ (step S918), the flow proceeds to step S919. Subsequently, determination is made that the face attribute to be determined is similar to the determination result of each face attribute stored in the specific individual information storage unit 380 (step S919).

Note that with this example, description has been made regarding a case where the similarity of the face attribute is determined regarding sex or age as the face attribute, but similarity may be determined regarding another face attribute.

For example, let us assume a case where all the determination results of the face attribute relating to sex stored in the specific individual information storage unit 380 are determined to be a female. In this case, in the event of the determination result of the face attribute relating to the sex of the face to be determined is determined to be a male, there is a high possibility that the face to be determined is not the same person as the registered face. Similarly, in the case that all the determination results of the face attribute relating to age stored in the specific individual information storage unit 380 are determined to be an adult, in the case that the determination result of the face attribute relating to the age of the face to be determined is determined to be a child, there is a high possibility that the face to be determined is not the same person as the registered face. Thus, in the case that the face attribute of the registered face, and the face attribute of the face to be determined have an opposite attribute, there is a high possibility that the face to be determined is not the same person as the registered face, and accordingly, the executing the facial feature point coordinate calculating process, facial feature quantity extracting process, and similarity calculating process have not to be executed. Thus, in the case that the similarity between both attributes is extremely low, all the subsequent processes are quit, whereby increase in speed of the individual identifying process can be realized.

Figure 28:
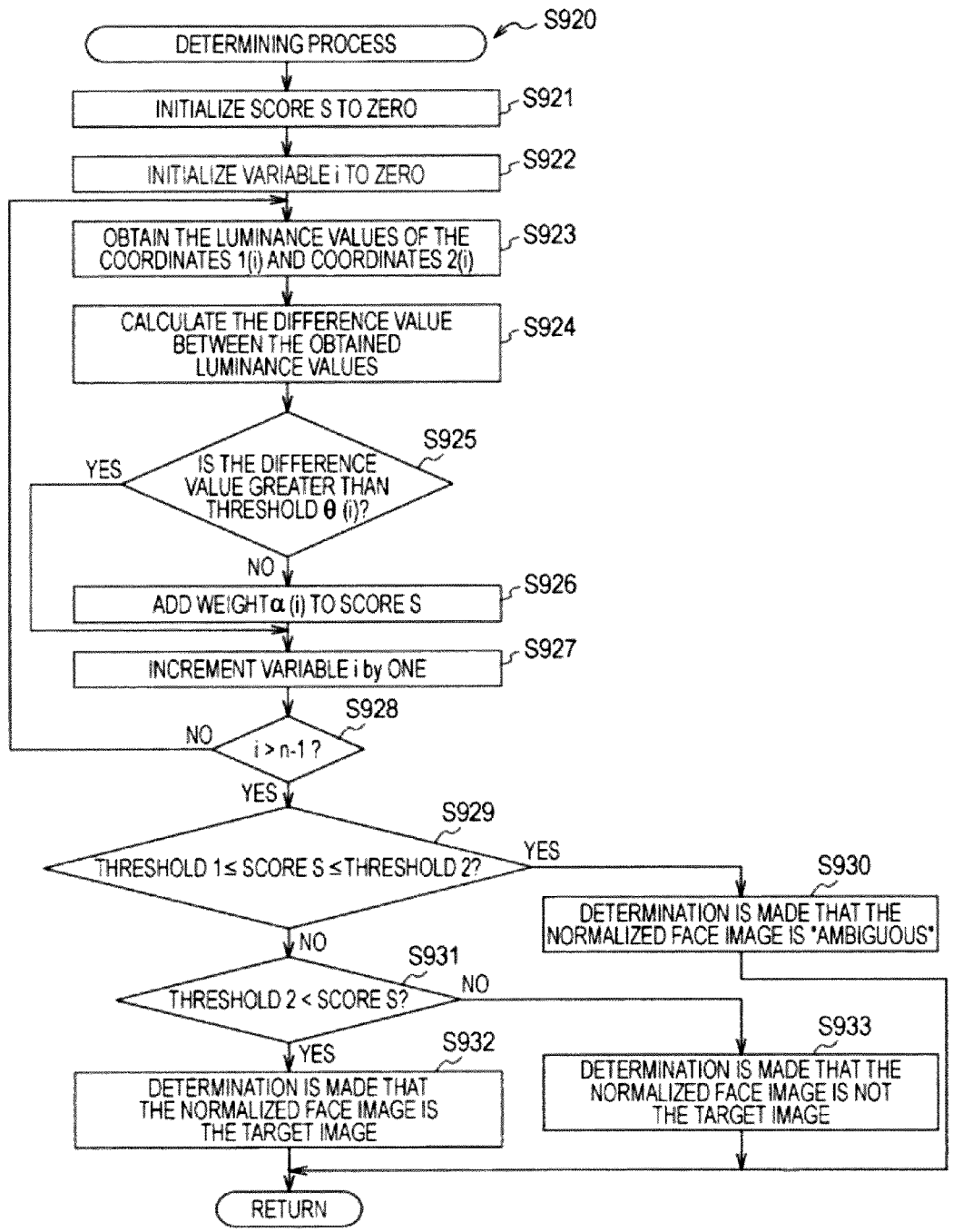
FIG. 28 is a flowchart illustrating the procedure of a face attribute determining process by the imaging apparatus according to an embodiment of the present invention.

FIG. 28 is a flowchart illustrating the procedure of the face attribute determining process by the imaging apparatus 100 according to an embodiment of the present invention. This face attribute determining process is a process corresponding to each face attribute determining process shown in steps S911 through S915 in FIG. 27. Now, an example will be described wherein the attribute determining dictionary 450 shown in FIG. 6 is used to determine a face attribute.

First, a score S is initialized to "0" (step S921), and a variable i is initialized to "0" (step S922). Subsequently, of the luminance values extracted from a normalized face image, the value A(i) of luminance corresponding to the value of the coordinates 0(x, y) 451 included in the reference data i of the attribute determining dictionary 450, and the value B(i) of luminance corresponding to the value of the coordinates 1(x, y) 452 are obtained (step S923). Subsequently, the following expression is used to calculate the difference C(i) of the obtained luminance values (step S924).

$$C(i) = A(i) - B(i)$$

Next, the calculated difference value C(i) of the luminance values, and the value of the threshold (θ) 453 included in the reference data i of the attribute determining dictionary 450 are compared to determine whether or not the calculated value C(i) is greater than the value of the threshold (θ) 453 (step S925). In the case that the calculated value C(i) is equal to or smaller than the value of the threshold (θ) 453 (step S925), the value of weight (α) 454 included in the reference data i of the attribute determining dictionary 450 is added to the score S (step S926). On the other hand, in the case that the calculated value C(i) is greater than the value of the threshold (θ) 453 (step S925), the flow proceeds to step S927 without adding the value of weight (α) 454 included in the reference data i of the attribute determining dictionary 450 to the score S.

Next, "1" is added to the variable i (step S927), and determination is made whether or not the variable i is greater than n-1 (step S928). In the case that the variable i is not greater than n-1 (step S928), the determining process regarding each piece of reference data of the attribute determining dictionary 450 has not been ended, and accordingly, the flow returns to step S923, where the determining process is repeated (steps S923 through S927). On the other hand, in the case that the variable i is greater than n-1 (step S928), determination is made whether or not the value of the score S is included in the range between a threshold 1 and a threshold 2 (step S929). Note that the threshold 1 corresponds to the thresholds 461, 463, and 465 shown in FIGS. 7A through 7C, and the threshold 2 corresponds to the thresholds 462, 464, and 466 shown in FIGS. 7A through 7C.

In the case that the value of the score S is included in the range between the threshold 1 and the threshold 2 (step S929), the normalized face image is determined to be "ambiguous" regarding the face attribute corresponding to the attribute determining dictionary 450 (step S930).

In the case that the value of the score S is not included in the range between the threshold 1 and the threshold 2 (step S929), determination is made whether or not the value of the score S is greater than the threshold 2 (step S931). In the case that the value of the score S is greater than the threshold 2 (step S931), the normalized face image is determined to be a target image regarding the face attribute corresponding to the attribute determining dictionary 450 (step S932). On the other hand, in the case that the value of the score S is smaller than the threshold 2 (step S931), the normalized face image is determined not to be a target image regarding the face attribute corresponding to the attribute determining dictionary 450 (step S933).

Figure 29:
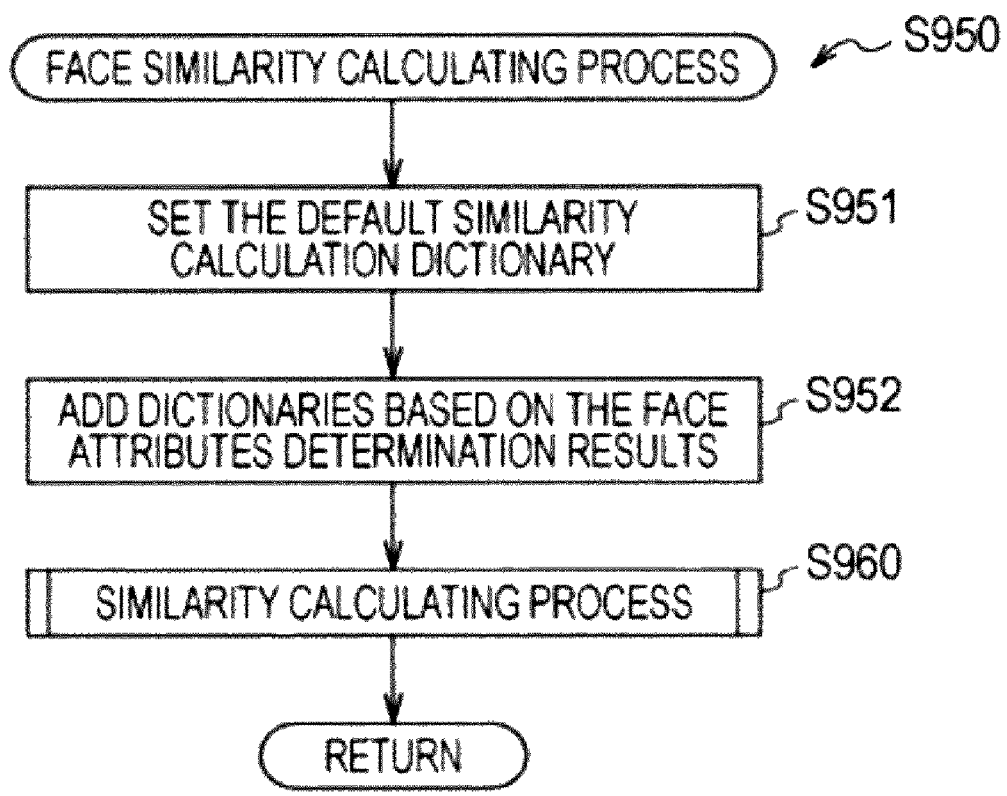
FIG. 29 is a flowchart illustrating face similarity calculating procedures of the procedures of the individual identifying process by the imaging apparatus according to an embodiment of the present invention.

FIG. 29 is a flowchart illustrating face similarity calculating procedures (the procedures in step S950 shown in FIG. 26) of the procedures of the individual identifying process by the imaging apparatus 100 according to an embodiment of the present invention.

First, the similarity calculating unit 360 obtains the similarity calculating dictionary for the default from the similarity calculating dictionaries held in the similarity calculation reference data holding unit 361 (step S951). For example, the common dictionary 701 is obtained from the similarity calculation reference data holding unit 361 shown in FIG. 16. Subsequently, the similarity calculating unit 360 selects the similarity calculating dictionary from the similarity calculating dictionaries held in the similarity calculation reference data holding unit 361 based on the determination result of the face attribute output from the attribute determining unit 330 (step S952). Subsequently, the similarity calculating unit 360 uses the similarity calculating dictionary for the default, and the selected similarity calculating dictionary to execute the similarity calculating process (step S960). This similarity calculating process will be described in detail with reference to FIG. 30.

Figure 30:
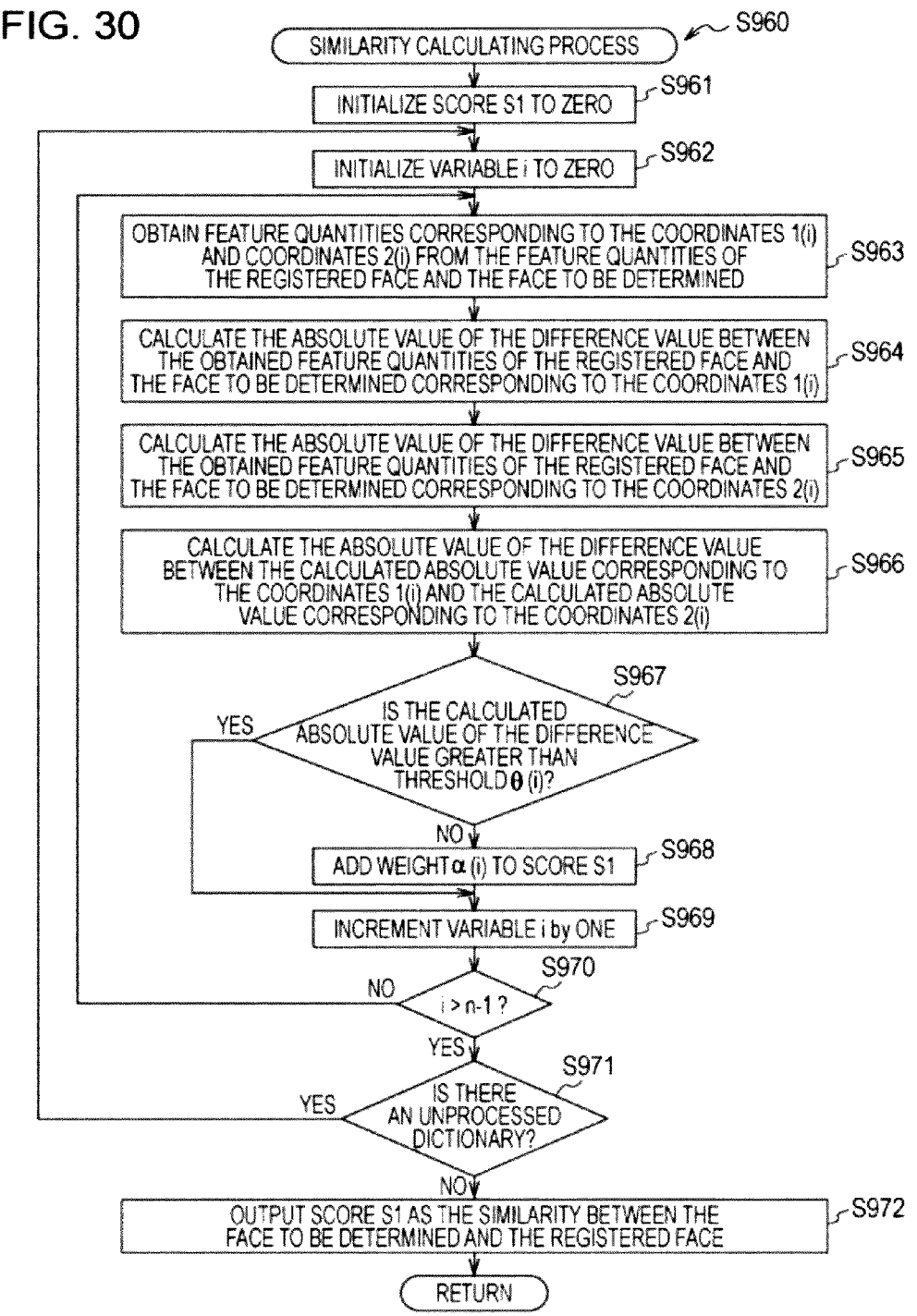
FIG. 30 is a flowchart illustrating a similarity calculating procedure of the procedures of the face similarity calculating process by the imaging apparatus according to an embodiment of the present invention.

FIG. 30 is a flowchart illustrating a similarity calculating procedure (procedure in step S960 shown in FIG. 29) of the procedures of the face similarity calculating process by the imaging apparatus 100 according to an embodiment of the present invention. Now, an example will be described wherein the similarity calculating dictionary 660 shown in FIG. 17 is used to calculate similarity.

First, a score S1 is initialized to "0" (step S961), and a variable i is initialized to "0" (step S962). Subsequently, the value A0(i) of a feature quantity included in a facial feature quantity to be determined corresponding to the value of the coordinates 0(x, y) 661 included in the reference data i of the similarity calculating dictionary 660, and the value B0(i) of a feature quantity included in a registered facial feature quantity are obtained. Also, the value A1(i) of a feature quantity included in a facial feature quantity to be determined corresponding to the value of the coordinates 1(x, y) 662 included in the reference data i of the similarity calculating dictionary 660, and the value B1(i) of a feature quantity included in the registered facial feature quantity are obtained (step S963).

Next, the following expression is used to calculate the absolute value C0(i) of the difference between the values of the obtained feature quantities (step S964).

$$C0(i)=|A0(i)-B0(i)|$$

Next, the following expression is used to calculate the absolute value C1(i) of the difference between the values of the obtained feature quantities (step S965).

$$C1(i)=|A1(i)-B1(i)|$$

Next, the following expression is used to calculate the absolute value C2(i) of the difference between the calculated absolute values C0(i) and C1(i) (step S966).

$$C2(i)=|C0(i)-C1(i)|$$

Next, the calculated absolute value C2(i), and the value of the threshold ($\theta$) 663 included in the reference data i of the similarity calculating dictionary 660 are compared to determine whether or not the calculated absolute value C2(i) is greater than the value of the threshold ($\theta$) 663 (step S967). In the case that the calculated absolute value C2(i) is equal to or smaller than the value of the threshold ($\theta$) 663 (step S967), the value of the weight ($\alpha$) 664 included in the reference data i of the similarity calculating dictionary 660 is added to the score S1 (step S968). On the other hand, in the case that the calculated absolute value C2(i) is greater than the value of the threshold ($\theta$) 663 (step S967), the flow proceeds to step S969 without adding the value of the weight ($\alpha$) 664 included in the reference data i of the similarity calculating dictionary 660 to the score S1.

Next, "1" is added to the variable i (step S969), and determination is made whether or not the variable i is greater than n-1 (step S970). In the case that the variable i is not greater than n-1 (step S970), the determining process regarding each piece of reference data of the similarity calculating dictionary 660 has not been ended, and accordingly, the flow returns to step S963, where the similarity calculating process is repeated (steps S963 through S969). On the other hand, in the case that the variable i is greater than n-1 (step S970), determination is made whether or not there is a similarity calculating dictionary not subjected to the similarity calculating process (step S971). In the case that there is a similarity calculating dictionary not subjected to the similarity calculating process (step S971), the flow returns to step S962, where the similarity calculating process using other similarity calculating dictionary is executed repeatedly (steps S962 through S969). For example, as shown in FIG. 19, with the case of the determination result of the face attribute being determined to be a child, following the similarity calculating process of the common dictionary 701 being completed, there is the child-oriented dictionary 702, so the similarity calculating process using the child-oriented dictionary 702 is executed.

On the other hand, in the case that there is no similarity calculating dictionary not subjected to the similarity calculating process (step S971), the value of the score S1 is output to the CPU 110 as the value that indicates the similarity between the face corresponding to the facial feature quantity to be determined, and the face corresponding to a registered facial feature quantity (step S972)

Figure 31:
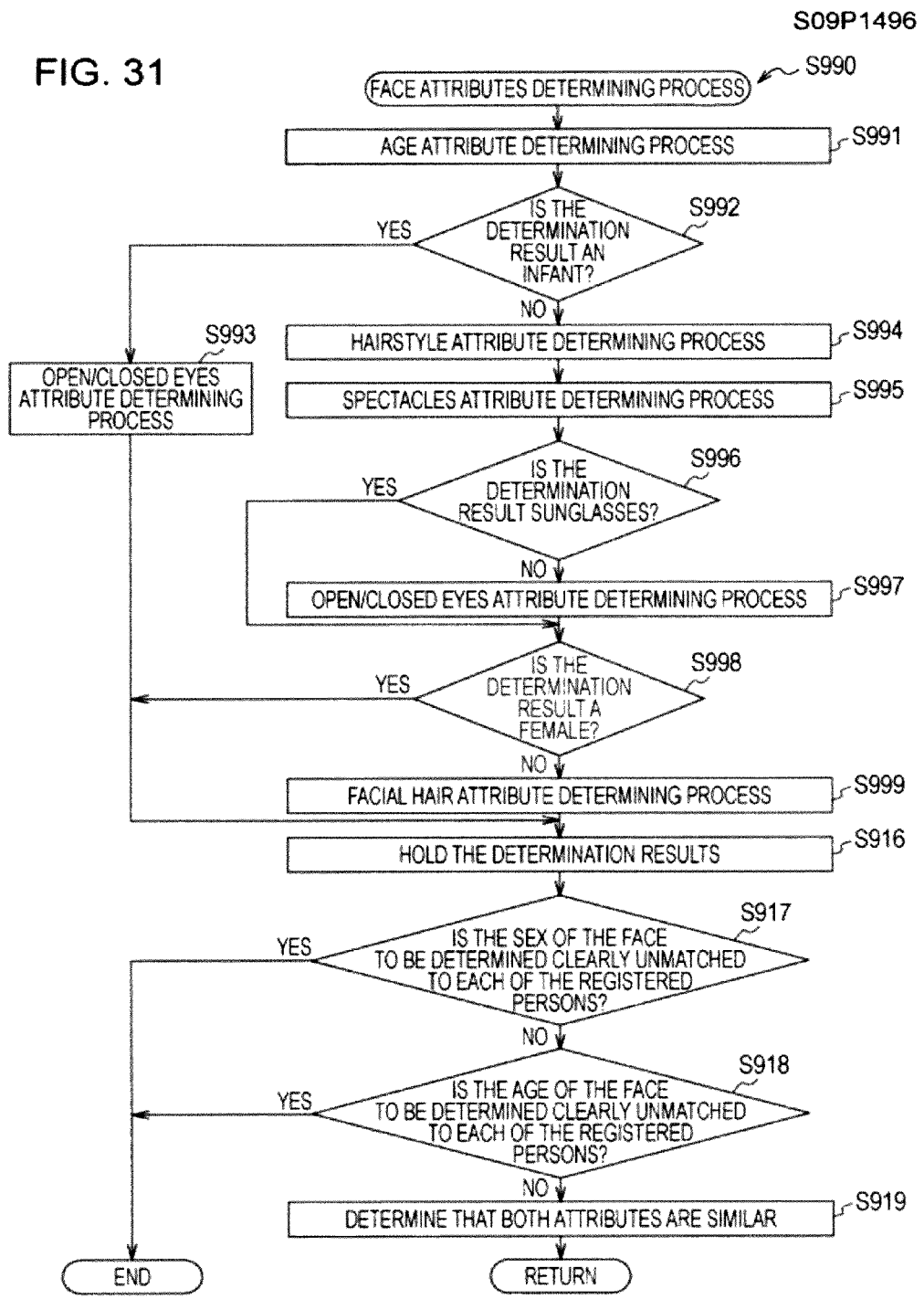
FIG. 31 is a flowchart illustrating a face attribute determining procedure of the procedures of the individual identifying process by the imaging apparatus according to an embodiment of the present invention.

FIG. 31 is a flowchart illustrating a face attribute determining procedure of the procedures of the individual identifying process by the imaging apparatus 100 according to an embodiment of the present invention. This face attribute determining procedure is a partial modification of the face attribute determining procedure shown in FIG. 27. Note that steps S916 through S919 are the same procedure as steps S916 through S919 shown in FIG. 27, and accordingly, description thereof will be omitted here. Now, an example will be described wherein the face attributes relating to age, opening/closing eyes, hairstyle, spectacled/non-spectacled, and shaved/unshaved are executed selectively. Let us say that, with the determination of the face attribute relating to age, determination is made whether or not the face to be determined is an infant or other than infants. Also, let us say that, with the determination of the face attribute relating to spectacles, determination is made whether or not the face to be determined has sunglasses (spectacles having low transparency).

First, the attribute determining unit 330 executes the age attribute determining process using the age determining dictionary (step S991). Next, determination is made whether or not an infant is determined to be the determination result of the face attribute relating to age (step S992). In the case that an infant is determined to be the determination result of the face attribute relating to age (step S992), only the determining process of the face attribute relating to opening/closing eyes is executed (step S993), and the determining processes of the other face attributes are not executed. That is to say, with regard to infants, "few features regarding hairstyle", "no spectacles", "sex is indefinite", and "no facial hair" are assumed.

On the other hand, in the case that other than an infant is determined to be the determination result of the face attribute relating to age (step S992), the attribute determining unit 330 uses the hairstyle determining dictionary to execute the hairstyle attribute determining process (step S994), and uses the spectacles determining dictionary to execute the spectacles attribute determining process (step S995).

Next, determination is made whether or not sunglasses are determined to be the determination result of the face attribute relating to spectacles (step S996). In the case that sunglasses are determined to be the determination result of the face attribute relating to spectacles (step S996), it is difficult to determine opening/closing of eyes regarding a face that wears sunglasses, and accordingly, the flow proceeds to step S998 without executing the determining process of the face attribute relating to opening/closing eyes. On the other hand, in the case that sunglasses are not determined to be the determination result of the face attribute relating to spectacles (step S996), the determining process of the face attribute relating to opening/closing eyes is executed (step S997).

Next, in the case that a female is determined to be the determination result of the face attribute relating to sex (step S998), females have an premise that there is no facial hair, and accordingly, the determining process relating to facial hair is not executed, the flow proceeds to step S916. On the other hand, in the case that a female is not determined to be the determination result of the face attribute relating to sex (step S998), the determining process relating to facial hair is executed (step S999).

Thus, of various types of face attributes, such as facial hair as to a child or female, there are conflicting content, and the content of a very rare combination in some cases. Therefore, the determining process is not executed regarding a conflicting face attribute based on the determination results of the face attributes already determined, whereby the determining process time of the face attributes can be reduced, and precision can be improved.

FIG. 32 is a flowchart illustrating the procedures of a specific individual information registration process by the imaging apparatus 100 according to an embodiment of the present invention. With this example, the specific individual information registration process is executed for each frame. Also, this example will be described assuming a case where the specific individual information automatic updating mode has been set.

First, the similarity calculating unit 360 inputs the face attribute determination result (face attribute information) from the attribute determining unit 330 (step S1001), and inputs the facial feature quantity from the facial feature quantity extracting unit 350 (step S1002). Subsequently, determination is made whether or not operating input for a registration instruction from the user has been accepted by the operation accepting unit 160 (step S1003). In the case that operating input for a registration instruction from the user has not been accepted (step S1003), the variable i is initialized to "0" (step S1004), and "1" is added to the variable i (step S1005). Here, the variable i is a value used for referring to a specific person whose specific individual information is stored in the specific individual information storage unit 380. For example, let us say that in the case of i=1, "100" of the identification number 381 is referred to, in the case of i=2, "200" of the identification number 381 is referred to, and in the case of i=3, "300" of the identification number 381 is referred to. Also, hereinafter, a specific person's face corresponding to the variable i will be referred to as a registered face i.

Next, the similarity calculating unit 360 determines whether or not the face attributes "sex" of the detected face and the registered face i are the same (step S1006). In the case that the face attributes "sex" of the detected face and the registered face i are not the same (step S1006) determination is made whether or not the variable i is equal to or greater than a constant N (step S1012). Here, the constant N is a value that indicates the number of specific persons whose specific individual information is stored in the specific individual information storage unit 380. For example, with the example shown in FIG. 15, N=3. In the case that the variable i is less than the constant N (step S1012), the flow returns to step S1005, and "1" is added to the variable i. On the other hand, in the case that the variable i is equal to or greater than the constant N (step S1012), the flow proceeds to step S1013.

Also, in the case that the face attributes "sex" of the detected face and the registered face i are the same (step S1006), the similarity calculating unit 360 determines whether or not the face attributes "age" of the detected face and the registered face i are the same (step S1007). In the case that the face attributes "age" of the detected face and the registered face i are not the same (step S1007), the flow proceeds to step S1012. On the other hand, in the case that the face attributes "age" of the detected face and the registered face i are the same (step S1007), the similarity calculating unit 360 uses another face attribute to select a single or plurality of specific individual information from the specific individual information of the registered face i (step S1008). For example, of the integration result values calculated regarding the detected face, the integration result value of which the absolute value is the maximum is extracted, and the specific individual information of the registered face i wherein the difference value as to the extracted integration value is the minimum, is selected.

Next, the similarity calculating unit 360 uses the facial feature quantity of the selected specific individual information to execute the similarity calculating process (step S1009). This similarity calculating process is generally the same process as that in step S950 shown in FIG. 29, and accordingly, description thereof will be omitted here. Note that step S1009 is an example of calculating referred to in the Summary of the Invention. Subsequently, the specific individual information registration unit 370 determines whether or not the similarity between the facial feature quantity from the facial feature quantity extracting unit 350, and the facial feature quantity stored in the specific individual information storage unit 380 is extremely high based on the similarity calculated by the similarity calculating unit 360 (step S1010). That is to say, determination is made whether or not the detected face is similar to the registered face i. In the case that the similarity between the facial feature quantity from the facial feature quantity extracting unit 350, and the facial feature quantity stored in the specific individual information storage unit 380 is not extremely high (step S1010), the flow proceeds to step S1012.

Also, in the case that the similarity between the facial feature quantity from the facial feature quantity extracting unit 350, and the facial feature quantity stored in the specific individual information storage unit 380 is extremely high (step S1010), the flow proceeds to step S1011. Subsequently, the specific individual information registration unit 370 determines whether or not the registered date and time 389 of the registered face i is date and time before a certain period of time or more (step S1011). In the case that the registered date and time 389 of the registered face i is not date and time before a certain period of time or more (step S1011), determination is made whether or not there is any other face detected within the current frame (step S1013). In the case that there is not any other face detected within the current frame (step S1013), the operation of the specific individual information registration process is ended. On the other hand, in the case that there is any other face detected within the current frame (step S1013), the flow returns to step S1001.

On the other hand, in the case that the registered date and time 389 of the registered face i is date and time before a certain period of time or more (step S1011), the specific individual information registration unit 370 executes the specific individual information registration process (step S1020). This specific individual information registration process will be described in detail with reference to FIG. 33.

Note that with this example, in step S1008, the integration result value of which the absolute value is the maximum is extracted, and the specific individual information of the registered face i is selected, but for example, another specific individual information selecting method shown in FIG. 23 may be executed in step S1008.

FIG. 33 is a flowchart illustrating a specific individual information registration determining procedure (procedure in step S1020 shown in FIG. 32) of the procedures of the specific individual information registration process by the imaging apparatus 100 according to an embodiment of the present invention. This example will be described wherein the face likeness, smiling face score, frontal score, and opened-eyes score are used to determine the necessity of specific individual information registration.

First, the specific individual information registration unit 370 determines whether or not the face likeness score calculated regarding the detected face is higher than the corresponding threshold (step S1021), determines whether or not the frontal score calculated regarding the detected face is higher than the corresponding threshold (step S1022), determines whether or not the opened-eyes score calculated regarding the detected face is higher than the corresponding threshold (step S1023), and subsequently determines whether or not the smiling face score calculated regarding the detected face is lower than the corresponding threshold (step S1024). Subsequently, in the case that the face likeness score, frontal score, and opened-eyes score of the detected face are higher than the corresponding threshold, and the smiling face score is lower than the corresponding threshold (steps S1021 through S1024), the specific individual information registration unit 370 executes the registration process of the specific individual information (step S1025). That is to say, the facial feature quantity input from the facial feature quantity extracting unit 350, the face attribute information input from the attribute determining unit 330, and so forth are additionally written or overwritten to the specific individual information storage unit 380.

On the other hand, in the case that at least one of the face likeness score, frontal score, and opened-eyes score of the detected face is not higher than the corresponding threshold, or in the case that the smiling face score is not lower than the corresponding threshold (steps S1021 through S1024), the flow proceeds to step S1013.

FIG. 34 is a flowchart illustrating the procedure of the still image recording process by the imaging apparatus 100 according to an embodiment of the present invention. This still image recording process is executed by the CPU 110. Also, description will be made regarding a case where it is taken as a condition at the time of executing still image recording operation that the detected face is similar to the registered face.

First, the face attribute determination result (face attribute information) from the attribute determining unit 330 is input (step S1031), and subsequently, determination is made whether or not the pressing operation of the shutter button by the user has been accepted by the operation accepting unit 160 (step S1032). In the case that the pressing operation of the shutter button by the user has been accepted (step S1032), recording operation used for recording an imaged image at the time of this pressing operation having been accepted is executed (step S1036). On the other hand, in the case that the pressing operation of the shutter button by the user has not been accepted (step S1032), determination is made whether or not the smiling face still image recording mode has been set (step S1033). In the case that the smiling face still image recording mode has not been set (step S1033), the operation of the still image recording process is ended.

On the other hand, in the case that the smiling face still image recording mode has been set (step S1033), determination is made whether or not the detected face is similar to the registered face (step S1034). In this case, in the case that multiple faces are included in the imaged image, it can be taken as a condition that any one face is determined to be a specific face. In the case that the detected face is not similar to the registered face (step S1034), the operation of the still image recording process is ended.

On the other hand, in the case that the detected face is similar to the registered face (step S1034), determination is made whether or not the face likeness score exceeds the threshold Tf1 (step S1035), and determination is made whether or not the smiling face score exceeds the threshold Ts1 (step S1036). In the case that the face likeness score exceeds the threshold Tf1 (step S1035), and also the smiling face score exceeds the threshold Ts1 (step S1036), recording operation used for recording an imaged image is executed (step S1037). On the other hand, in the case that the face likeness does not exceed the threshold Tf1 (step S1035), or in the case that the smiling face score does not exceed the threshold Ts1 (step S1036), the operation of the still image recording process is ended.

Note that this example shows an example wherein a still image is recorded, but for example, in the case of the conditions of steps S1034 through S1036 are satisfied, recording operation of a moving image may be started in step S1037.

Note that with the above embodiment of the present invention, description has been made regarding the imaging apparatus including the imaging unit, such as the lens, image sensor, and so forth, as an example, but an embodiment of the present invention may also be applied to an image processing apparatus including no imaging unit. For example, such an image processing apparatus can execute the above-mentioned face detecting process, and face identifying process regarding the image data input from an external image recording medium, or the image data input from an external apparatus via an input/output terminal. Also, the determination results of the face attributes determined by the attribute determining unit 330, the facial feature quantity extracted from the facial feature quantity extracting unit 350, the similarity calculated by the similarity calculating unit 360, and so forth may be output to the external apparatus via the input/output terminal.

Also, with the above embodiment of the present invention, description has been made regarding the case where a face is detected as a subject target to execute individual identifying, but an embodiment of the present invention may also be applied to a case where other subjects are detected to execute object recognition. For example, an embodiment of the present invention may be applied to pets such as cats, dogs, and so forth, and various objects such as animals, houses, vehicles, and so forth. For example, individual identifying can be readily executed according to the differences such as color, pattern, ear shape, and so forth as compared to the case of individual identifying.

Also, with the above embodiment of the present invention, an example has been described wherein a feature quantity is extracted using the Gabor filter serving as a feature quantity extracting filter, and this feature quantity is used to execute individual identifying, but an embodiment of the present invention may be applied to the case of executing individual identifying without using a feature quantity. For example, Gaussian Markov Random Field (GMRF), Local Binary Pattern (LBP) features, Eigenface method, or the like may be employed.

As described above, according to an embodiment of the present invention, the registration information of specific individuals (specific individual information) can be updated continuously while improving precision automatically within the imaging apparatus 100. That is to say, even if the user does not perform registration operations, the imaging apparatus 100 can determine the state of specific individual information automatically to update the specific individual information to the newest state with high precision periodically. In this case, the more the user frequently uses the imaging apparatus 100, the higher the precision of the specific individual information improves, whereby even smarter individual identifying can be executed. Also, the precision for personal identifying can be improved, and accordingly, control such as focusing or exposure doubling or skin color adjustment or the like of a camera most suitable for a specific person, and control of various camera functions such as shaking correction, stroboscope modulated light, and so forth can be realized. Thus, a specific person can be imaged attractively.

Also, with regard to an image to be recorded automatically as a still image or moving image, a face suitable for imaging can be selected automatically, such as a smiling face, a frontal face, an unblinking face, or the like. On the other hand, with regard to data to be recorded automatically as specific individual information for individual identifying, a face suitable for registration can be selected automatically, for example, such as a straight face that avoids an extreme smiling face, a frontal face, an unblinking face, or the like. Also, the difference between conditions for the face attributes most suitable for starting of automatic still image recording or automatic moving image recording, and conditions for the face attributes most suitable for individual identifying is clarified, and conditions are provided to both individually, whereby precision can be improved regarding both.

Also, a face attribute (e.g., the expression of a target person, age and age group, sex, opening/closing eyes, race, spectacled/non-spectacled, type of spectacles, shaved/unshaved, type of facial hair, with/without headwear, type of headwear, with/without jewelry, type of jewelry, hairstyle, and a facial orientation) can be determined to be to the region of a person's face include in an image. Also, with regard to a face attribute opposite to the face attribute already determined with the face attribute determining process, the determining process is not executed, whereby the determination result of an effective face attribute can be obtained efficiently. Also, with the individual identifying process as well, the already determined face attributes are used, whereby the precision of individual identifying can be improved, the processing speed can be improved, and the effective individual identifying process can be executed effectively.

Also, the feature point coordinates at the time of executing individual identifying are switched according to the determination results of the face attributes, whereby the most suitable feature quantity according to a face to be determined can be extracted. Also, the feature quantity extracting filter at the time of executing individual identifying is switched according to the determination results of the face attributes, whereby the most suitable feature quantity according to a face to be determined can be extracted. Also, the similarity calculation reference data used for similarity calculation at the time of executing individual identifying is switched according to the determination results of the face attributes, whereby the most suitable similarity calculation according to a face to be determined can be executed, and individual identifying with high precision can be realized.

Also, the similarity calculation at the time of executing individual identifying is quit in the middle of the calculation according to the determination results of the face attributes, whereby the processing time can be reduced, and speeding up can be realized. Particularly, in the case that there is conflicting content at the time of focusing on the similarity between attributes, it can be found at an early stage that the registered face and the face to be determined are not the same person, whereby the processing time can be reduced substantially.

Also, the similarity calculation at the time of executing individual identifying is further prolonged according to the determination results of the face attributes, whereby a further high-precision process can also be executed as to a face having difficulty in similarity calculation.

Also, individual identifying with high precision at high speed can be realized, and with real-time image processing such as an imaging apparatus as well, the user can be informed of the face of a specific person. Further, even if a small-type imaging apparatus such as a digital still camera, or a cellular phone with a camera does not include a sufficient-sized image display apparatus (liquid crystal panel or the like), the imaging apparatus can display the face of a specific person as to the user. Thus, the user can readily visually confirm the face of the specific person.

Also, an embodiment of the present invention can be applied to an image processing apparatus other than an imaging apparatus, whereby the face attribute determining process and the individual identifying process can also be executed as to a person's face image input from an external apparatus. Also, various face attributes, facial feature point coordinates, and facial similarity can be generated as image associated data, whereby further rich information can be provided to the user automatically. Also, a specific person's image can be searched rapidly from a massive moving-image or still-image database using various face attributes, facial feature point coordinates, and facial similarity.

Also, the procedures described with the above embodiment may be viewed as being a method including the series of procedures, or may be viewed as being a program to cause a computer to execute the series of procedures, and a recording medium which stores the program thereof. Examples of this recording medium include a CD (Compact Disc), MD (Mini-Disc), DVD (Digital Versatile Disk), memory card, and Blu-ray Disc (registered trademark).

The present application contains subject matter related to that disclosed in Japanese Priority Patent Application JP 2008-227340 filed in the Japan Patent Office on Sep. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a subject information storage unit configured to store feature quantities and attributes relating to a plurality of subjects;
   a subject detecting unit configured to detect a subject included in an image;
   a scaling unit configured to scale the subject detected in the image to a scale of an image corresponding to the feature quantities and attributes stored in the subject information storage unit;
   an attribute determining unit configured to determine the attributes of said detected subject;
   a feature quantity extracting unit configured to extract a feature quantity relating to said detected subject; and
   a similarity calculating unit configured to select one or a plurality of feature quantities from feature quantities relating to a plurality of subjects stored in said subject information storage unit based on said determined attributes to calculate similarity between a subject according to said selected feature quantities, and said detected subject, based on said selected feature quantities and said extracted feature quantity.

2. The image processing apparatus according to claim 1, wherein said subject detecting unit detects a face of a person included in said image as said subject;
and wherein said attribute determining unit determines at least either age or sex as the attribute of said face of said detected person;
and wherein said similarity calculating unit selects a face having the same age and sex as said determined age and sex from a plurality of faces stored in said subject information storage unit, and selects one or a plurality of feature quantities from feature quantities according to said selected face.

3. An image processing apparatus comprising:
a subject information storage unit configured to store feature quantities and attributes relating to a plurality of subjects;
a subject detecting unit configured to detect a subject included in an image;
an attribute determining unit configured to determine the attributes of said detected subject;
a feature quantity extracting unit configured to extract a feature quantity relating to said detected subject;
a similarity calculating unit configured to select one or a plurality of feature quantities from feature quantities relating to a plurality of subjects stored in said subject information storage unit based on said determined attributes to calculate similarity between a subject according to said selected feature quantities, and said detected subject, based on said selected feature quantities and said extracted feature quantity; and
a subject information registration unit configured to determine whether said calculated similarity and said determined attributes satisfy registration conditions, and in a case where determination is made that said registration conditions are satisfied, store said extracted feature quantity and said determined attributes in said subject information storage unit.

4. The image processing apparatus according to claim 3, wherein said subject detecting unit detects a face of a person included in said image as said subject;
and wherein said attribute determining unit determines at least one of the degree of face likeness, the frontal degree of facial orientation, the degree to which the eyes are open, and the degree of a smiling face as the attributes of said detected face;
and wherein said subject information registration unit takes conditions as said registration conditions where said calculated similarity exceeds a threshold, and at least one of the degree of face likeness, the frontal degree of facial orientation, and the degree to which the eyes are open exceeds a threshold, and said determined degree of a smiling face does not exceed a threshold, and in a case where determination is made that said registration conditions are satisfied, stores said extracted feature quantity and said determined attributes in said subject information storage unit.

5. The image processing apparatus according to claim 3, wherein said subject information storage unit stores date and time when the feature quantities and attributes relating to said subject were stored, for each of said subjects;
and wherein said subject information registration unit determines whether or not date and time according to said selected feature quantities stored in said subject information storage unit have elapsed for a certain period of time or more in a case where determination is made that said registration conditions are satisfied, and in a case where determination is made that the date and time according to said selected feature quantities has elapsed for a certain period of time or more, stores said extracted feature quantity and said determined attributes in said subject information storage unit.

6. The image processing apparatus according to claim 3, wherein said subject information registration unit writes and stores said extracted feature quantity and said determined attributes over the feature quantities stored in said subject information storage unit, serving as a similarity calculation target determined to be said registration being satisfied, and the attributes according thereto.

7. An imaging apparatus comprising:
a subject information storage unit configured to store feature quantities and attributes relating to a plurality of subjects;
an imaging unit configured to image a subject to generate an imaged image;
a subject detecting unit configured to detect a subject included in said imaged image;
an attribute determining unit configured to determine the attributes of said detected subject;
a feature quantity extracting unit configured to extract a feature quantity relating to said detected subject;
a recording instructing unit configured to determine whether or not said determined attributes satisfy recording operation conditions used for recording operations of said imaged image, and in a case where determination is made that said recording operation conditions are satisfied, instructs recording of said imaged image;
a similarity calculating unit configured to select one or a plurality of feature quantities from feature quantities relating to a plurality of subjects stored in said subject information storage unit based on said determined attributes to calculate similarity between a subject according to said selected feature quantities, and said detected subject, based on said selected feature quantities and said extracted feature quantity; and
a subject information registration unit configured to determine whether said calculated similarity and said determined attributes satisfy registration conditions, and in a case where determination is made that said registration conditions are satisfied, store said extracted feature quantity and said determined attributes in said subject information storage unit.

8. The imaging apparatus according to claim 7, wherein said recording operation conditions relating to said determined attributes and the setting content of said registration conditions differ.

9. The imaging apparatus according to claim 7, wherein said subject detecting unit detects a face of a person included in said image as said subject;
and wherein said attribute determining unit determines at least one of the degree of face likeness, and the degree of smiling as the attribute of said face of said detected person face;
and wherein said recording instructing unit takes conditions as said recording operation conditions where said calculated similarity exceeds a threshold, and said determined degree of face likeness, and degree of smiling exceed a threshold, and in a case where said recording operation conditions are satisfied, instructs recording of said imaged image.

10. An image processing method comprising:
detecting of a subject included in an image;
determining of the attributes of said detected subject;

scaling the subject detected in the image to a scale of an image corresponding to feature quantities and attributes stored in a subject information storage unit;

extracting of a feature quantity relating to said detected subject; and selecting of one or a plurality of feature quantities from feature quantities relating to a plurality of subjects stored in said subject information storage unit based on said determined attributes to calculate similarity between a subject according to said selected feature quantities, and said detected subject, based on said selected feature quantities and said extracted feature quantity.

11. A non-transitory computer-readable medium encoded with computer-readable instructions that when executed by a computer cause the computer to perform a method comprising:

detecting of a subject included in an image;

determining of the attributes of said detected subject;

scaling the subject detected in the image to a scale of an image corresponding to feature quantities and attributes stored in a subject information storage unit;

extracting of a feature quantity relating to said detected subject; and selecting of one or a plurality of feature quantities from feature quantities relating to a plurality of subjects stored in said subject information storage unit based on said determined attributes to calculate similarity between a subject according to said selected feature quantities, and said detected subject, based on said selected feature quantities and said extracted feature quantity.

* * * * *